US010560798B2

(12) United States Patent
Kerr et al.

(10) Patent No.: US 10,560,798 B2
(45) Date of Patent: *Feb. 11, 2020

(54) TARGETED CONTENT DELIVERY

(71) Applicant: NEXRF Corp., Reno, NV (US)

(72) Inventors: Michael Anthony Kerr, Reno, NV (US); David Stewart, Stateline, NV (US)

(73) Assignee: NEXRF, CORP., Reno, NV (US)

( * ) Notice: Subject to any disclaimer, the term of this patent is extended or adjusted under 35 U.S.C. 154(b) by 432 days.

This patent is subject to a terminal disclaimer.

(21) Appl. No.: 15/099,855

(22) Filed: Apr. 15, 2016

(65) Prior Publication Data

US 2016/0309292 A1  Oct. 20, 2016

Related U.S. Application Data

(63) Continuation of application No. 13/252,160, filed on Oct. 3, 2011, now Pat. No. 9,349,128, which is a (Continued)

(51) Int. Cl.
*G06Q 20/00* (2012.01)
*H04W 4/021* (2018.01)
(Continued)

(52) U.S. Cl.
CPC ............ *H04W 4/021* (2013.01); *G06Q 30/02* (2013.01); *G06Q 30/0261* (2013.01);
(Continued)

(58) Field of Classification Search
CPC .................................................. G06Q 30/0267
(Continued)

(56) References Cited

U.S. PATENT DOCUMENTS 4,339,798 A  7/1982  Hedges et al.
4,856,787 A  8/1989  Itkis
(Continued)

FOREIGN PATENT DOCUMENTS

EP     245714 A2 *  11/1987  ............... G01S 5/02
JP   2006166314 A *   6/2006  ............... H04Q 7/34
(Continued)

OTHER PUBLICATIONS

Jansen et al. Proximity Beacons and Mobile Device Authentication: An Overview and Implementation. (Jun. 2005). Retrieved online Sep. 19, 2019. https://www.govinfo.gov/content/pkg/GOVPUB-C13-8d288730b8487cc65c6abd91bfc811da/pdf/GOVPUB-C13-8d288730b8487cc65c6abd91bfc811da.pdf (Year: 2005).*
(Continued)

*Primary Examiner* — James A Reagan
(74) *Attorney, Agent, or Firm* — Kerr IP Group, LLC

(57) ABSTRACT

A system for delivering targeted content to a wireless handset is described. The system comprises a wireless handset communicatively coupled to a network. A user profile associated with the wireless handset comprises at least one user attribute. The system further comprises a content administration interface configured to store an association between a content item and a user attribute. The system further comprises a content delivery module configured to filter stored content items to retrieve content items associated with a user attribute. The content delivery module transmits at least one retrieved content item to the wireless handset via the network. A handset content interface displays the at least one transmitted content item on the wireless handset.

16 Claims, 35 Drawing Sheets

Related U.S. Application Data continuation-in-part of application No. 13/218,256, filed on Aug. 25, 2011, now Pat. No. 10,430,492, said application No. 13/252,160 is a continuation-in-part of application No. 13/153,214, filed on Jun. 3, 2011, now Pat. No. 9,507,494, said application No. 13/252,160 is a continuation-in-part of application No. 13/153,238, filed on Jun. 3, 2011, now Pat. No. 9,408,032, said application No. 13/252,160 is a continuation-in-part of application No. 13/153,248, filed on Jun. 3, 2011, now Pat. No. 9,615,347, said application No. 13/252,160 is a continuation-in-part of application No. 12/821,852, filed on Jun. 23, 2010, now Pat. No. 8,738,024, said application No. 13/252,160 is a continuation-in-part of application No. 12/413,547, filed on Mar. 28, 2009, now Pat. No. 8,942,995.

(60) Provisional application No. 61/482,834, filed on May 5, 2011, provisional application No. 61/427,753, filed on Dec. 28, 2010, provisional application No. 61/427,755, filed on Dec. 28, 2010, provisional application No. 61/454,664, filed on Mar. 21, 2011, provisional application No. 61/472,054, filed on Apr. 5, 2011, provisional application No. 61/376,936, filed on Aug. 25, 2010, provisional application No. 61/351,770, filed on Jun. 4, 2010, provisional application No. 61/352,242, filed on Jun. 7, 2010, provisional application No. 61/351,677, filed on Jun. 4, 2010, provisional application No. 61/223,565, filed on Jul. 7, 2009, provisional application No. 61/040,661, filed on Mar. 29, 2008.

(51) Int. Cl.
*G06Q 30/02* (2012.01)
*H04W 4/18* (2009.01)
*H04W 8/18* (2009.01)

(52) U.S. Cl.
CPC .......... *G06Q 30/0269* (2013.01); *H04W 4/18* (2013.01); *H04W 8/18* (2013.01)

(58) Field of Classification Search
USPC .................. 463/20, 30, 40, 42; 705/14.064
See application file for complete search history.

(56) References Cited

U.S. PATENT DOCUMENTS

| | | |
|---|---|---|
| 5,586,937 A | 12/1996 | Menashe |
| 5,594,491 A | 1/1997 | Hodge et al. |
| 5,630,757 A | 5/1997 | Gagin et al. |
| 5,643,086 A | 7/1997 | Alcorn et al. |
| 5,738,583 A | 4/1998 | Comas et al. |
| 5,761,416 A | 6/1998 | Mandal et al. |
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |
| 5,795,228 A | 8/1998 | Trumbull et al. |
| 5,800,268 A | 9/1998 | Molnick |
| 5,851,149 A | 12/1998 | Xidos et al. |
| 5,871,398 A | 2/1999 | Schneier et al. |
| 5,902,983 A | 5/1999 | Crevelt et al. |
| 5,947,821 A | 9/1999 | Stone |
| 5,970,143 A | 10/1999 | Schneier et al. |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |
| 6,159,095 A | 12/2000 | Frohm et al. |
| 6,178,510 B1 | 1/2001 | O'Connor et al. |
| 6,203,428 B1 | 3/2001 | Giobbi et al. |
| 6,217,447 B1 | 4/2001 | Lofink et al. |
| 6,220,961 B1 | 4/2001 | Keane et al. |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 | 8/2003 | Arpee et al. |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 | 10/2003 | Golding et al. |
| 6,676,522 B2 | 1/2004 | Rowe |
| 6,682,421 B1 | 1/2004 | Rowe et al. |
| 6,702,672 B1 | 3/2004 | Angell et al. |
| 6,709,333 B1 | 3/2004 | Bradford et al. |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Kikta et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 8,002,617 B1 | 8/2011 | Uskela et al. |
| 8,029,349 B2 | 10/2011 | Lind |
| 8,172,684 B2 | 5/2012 | Adiraju et al. |
| 8,403,755 B2 | 3/2013 | Kerr |
| 8,492,995 B2 | 7/2013 | Maxik et al. |
| 8,506,406 B2 | 8/2013 | Kerr |
| 8,506,407 B2 | 8/2013 | Kerr |
| 8,523,679 B2 | 9/2013 | Kerr |
| 8,738,024 B1 * | 5/2014 | Kerr ...................... G01S 5/0252 455/456.5 |
| 8,747,229 B2 | 6/2014 | Kerr |
| 8,942,995 B1 | 1/2015 | Kerr |
| 9,043,222 B1 | 5/2015 | Kerr et al. |
| 9,349,128 B1 * | 5/2016 | Kerr ................... G06Q 30/0261 |
| 2001/0004768 A1 | 6/2001 | Hodge et al. |
| 2001/0005908 A1 | 6/2001 | Hodge et al. |
| 2001/0031654 A1 | 10/2001 | Walker et al. |
| 2001/0031656 A1 | 10/2001 | Marshall et al. |
| 2001/0036224 A1 | 11/2001 | Demello et al. |
| 2001/0039210 A1 | 11/2001 | ST-Denis |
| 2001/0044337 A1 | 11/2001 | Rowe et al. |
| 2002/0002073 A1 | 1/2002 | Montgomery et al. |
| 2002/0007494 A1 | 1/2002 | Hodge |
| 2002/0056125 A1 | 5/2002 | Hodge et al. |
| 2002/0056143 A1 | 5/2002 | Hodge et al. |

(56) References Cited

U.S. PATENT DOCUMENTS

| | | |
|---|---|---|
| 2002/0061778 A1 | 5/2002 | Acres |
| 2002/0069105 A1 | 6/2002 | Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1* | 12/2002 | Ryan ............... G06Q 30/02 705/14.1 |
| 2003/0009385 A1 | 1/2003 | Tucciarone et al. |
| 2003/0030666 A1 | 2/2003 | Najmi et al. |
| 2003/0032409 A1 | 2/2003 | Hutcheson et al. |
| 2003/0064805 A1 | 4/2003 | Wells |
| 2003/0119578 A1 | 6/2003 | Newson |
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 | 11/2004 | Yamamura et al. |
| 2005/0046608 A1 | 3/2005 | Schantz et al. |
| 2005/0048990 A1 | 3/2005 | Lauriol |
| 2005/0085257 A1 | 4/2005 | Laird et al. |
| 2005/0114212 A1 | 5/2005 | Carrez et al. |
| 2005/0136949 A1 | 6/2005 | Barnes |
| 2005/0154646 A1 | 7/2005 | Chermesino |
| 2005/0159883 A1* | 7/2005 | Humphries ............ B60R 25/00 701/517 |
| 2005/0181804 A1 | 8/2005 | Misikangas et al. |
| 2005/0246334 A1 | 11/2005 | Tao et al. |
| 2005/0261063 A1* | 11/2005 | Boyd ................ G07F 17/32 463/42 |
| 2006/0003830 A1 | 1/2006 | Walker et al. |
| 2006/0004627 A1 | 1/2006 | Baluja |
| 2006/0058102 A1 | 3/2006 | Nguyen et al. |
| 2006/0063575 A1 | 3/2006 | Gatto et al. |
| 2006/0125693 A1 | 6/2006 | Recker |
| 2006/0181411 A1 | 8/2006 | Fast et al. |
| 2006/0189382 A1 | 8/2006 | Muir et al. |
| 2006/0194633 A1 | 8/2006 | Paulsen |
| 2006/0238382 A1 | 10/2006 | Kimchi et al. |
| 2006/0240891 A1 | 10/2006 | Klinkhammer et al. |
| 2006/0287810 A1 | 12/2006 | Sadri et al. |
| 2007/0008108 A1 | 1/2007 | Schurig et al. |
| 2007/0024580 A1 | 2/2007 | Sands et al. |
| 2007/0025265 A1 | 2/2007 | Porras et al. |
| 2007/0060306 A1 | 3/2007 | Amaitis et al. |
| 2007/0061229 A1 | 3/2007 | Ramer et al. |
| 2007/0087834 A1 | 4/2007 | Moser et al. |
| 2007/0100963 A1* | 5/2007 | Ban ................... H04L 67/303 709/217 |
| 2007/0136132 A1 | 6/2007 | Weiser et al. |
| 2007/0149215 A1 | 6/2007 | Misikangas |
| 2007/0149216 A1 | 6/2007 | Misikangas |
| 2007/0167210 A1 | 7/2007 | Kelly et al. |
| 2007/0168127 A1 | 7/2007 | Zaruba et al. |
| 2007/0184852 A1 | 8/2007 | Johnson et al. |
| 2007/0218975 A1 | 9/2007 | Iddings et al. |
| 2007/0243925 A1 | 10/2007 | LeMay et al. |
| 2007/0244633 A1 | 10/2007 | Phillips et al. |
| 2007/0257831 A1 | 11/2007 | Mathews et al. |
| 2007/0270212 A1 | 11/2007 | Cockerille et al. |
| 2007/0281692 A1 | 12/2007 | Bucher et al. |
| 2008/0026844 A1 | 1/2008 | Wells |
| 2008/0032705 A1 | 2/2008 | Patel et al. |
| 2008/0039192 A1 | 2/2008 | Laut |
| 2008/0057894 A1 | 3/2008 | Aleksic et al. |
| 2008/0076572 A1 | 3/2008 | Nguyen et al. |
| 2008/0085692 A1 | 4/2008 | Hart et al. |
| 2008/0096659 A1 | 4/2008 | Kreloff et al. |
| 2008/0097858 A1 | 4/2008 | Vucina et al. |
| 2008/0102947 A1 | 5/2008 | Hays et al. |
| 2008/0108430 A1 | 5/2008 | Evans |
| 2008/0113785 A1 | 5/2008 | Alderucci et al. |
| 2008/0153515 A1 | 6/2008 | Mock et al. |
| 2008/0162037 A1 | 7/2008 | Mahmoud |
| 2008/0166973 A1 | 7/2008 | Hart et al. |
| 2008/0167106 A1 | 7/2008 | Lutnick et al. |
| 2008/0186234 A1 | 8/2008 | Alles et al. |
| 2008/0189360 A1 | 8/2008 | Kiley et al. |
| 2008/0207296 A1 | 8/2008 | Lutnick et al. |
| 2008/0227473 A1 | 9/2008 | Haney |
| 2008/0249833 A1 | 10/2008 | Ali et al. |
| 2008/0252527 A1 | 10/2008 | Garcia |
| 2008/0281668 A1 | 11/2008 | Nurminen |
| 2009/0018929 A1 | 1/2009 | Weathers |
| 2009/0150217 A1 | 6/2009 | Luff |
| 2009/0197684 A1* | 8/2009 | Arezina ............ G07F 17/3216 463/42 |
| 2009/0213771 A1 | 8/2009 | Celentano et al. |
| 2009/0214036 A1 | 8/2009 | Shen et al. |
| 2009/0298513 A1 | 12/2009 | Hampel et al. |
| 2010/0022308 A1 | 1/2010 | Hartmann et al. |
| 2010/0027521 A1 | 2/2010 | Huber et al. |
| 2010/0039929 A1 | 2/2010 | Cho et al. |
| 2010/0048242 A1 | 2/2010 | Rhoads et al. |
| 2010/0063854 A1 | 3/2010 | Purvis et al. |
| 2010/0121567 A1 | 5/2010 | Mendelson |
| 2010/0167771 A1 | 7/2010 | Raghothaman et al. |
| 2010/0179885 A1 | 7/2010 | Fiorentino |
| 2010/0280960 A1 | 11/2010 | Ziotopoulos et al. |
| 2010/0287033 A1 | 11/2010 | Mathur |
| 2010/0302056 A1 | 12/2010 | Dutton et al. |
| 2010/0305855 A1 | 12/2010 | Dutton et al. |
| 2010/0331016 A1 | 12/2010 | Dutton et al. |
| 2011/0078167 A1 | 3/2011 | Sundaresan et al. |
| 2011/0103360 A1 | 5/2011 | Ku et al. |
| 2012/0115512 A1 | 5/2012 | Grainger et al. |
| 2012/0122476 A1 | 5/2012 | Lee et al. |
| 2013/0003572 A1 | 1/2013 | Kim et al. |

FOREIGN PATENT DOCUMENTS

| | | |
|---|---|---|
| JP | 2009025019 A | 2/2009 |
| WO | 2008065257 A1 | 6/2008 |

OTHER PUBLICATIONS

Steinfield, Charles. The Development of Location Based Services in Mobile Commerce. (Aug. 10, 2003). Retrieved online Sep. 19, 2019. https://msu.edu/~steinfie/elifelbschap.pdf (Year: 2003).*

"Ekahau Positioning Engine 4.2." 2008. http://www.nowire.se/images/produktblad/ekahau/datasheet.sub.--epe.sub.--- 42.sub.--en.sub.--11022008.sub.--lo.pdf. Sep. 29, 2008.

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.

"Location in SIP/IP Core Architecture." Open Mobile Alliance. Sep. 4, 2008. Accessed Dec. 2008, http://www.openmobilealliance.org/technical/release.sub.--program/locsip.sub.--archive.aspx.

"The New Normal of Retailing: The Rise of the Mobile Shopper." Next Generation Retail Summit. 2010. http://www.ngrsummit.com/media/whitepapers/Microsoft.sub.--NGRUS.pdf.

"Tracking Cookie." Wikipedia. http://en.wikipedia.org/wiki/Tracking.sub.--cookie. May 24, 2009.

"Wi-Fi Location-Based Services—Design and Deployment Considerations." 2006 Cisco Systems. Accessed Dec. 2008. https://learningnetwork.cisco.com/docs/DOC-3418.

"Wireless Network." Wikipedia. http://en.wikipedia.org/wiki/Wireless.sub.--network. Nov. 17, 2008.

Balakrishnan et al. "Lessons from Developing and Deploying the Cricket Indoor Location System." Nov. 7, 2003. http://www.sds.lcs.mit.edu/projects/cricket/V1Exp.pdf.

Blom et al. "Transmission Power Measurements for Wireless Sensor Nodes and their Relationship to Battery Level." Symposium on Wireless Communication Systems. pp. 342-345, Sep. 7, 2005.

(56) References Cited

OTHER PUBLICATIONS

Borriello et al. "Delivering Real-World Ubiquitous Location Systems." Communications of the ACM. pp. 36-41, vol. 48, Issue 3, Mar. 2005.

Capkun et al. "Mobility Helps Peer-to-Peer Security," IEEE Transactions on Mobile Computing. vol. 5, Issue 1, pp. 43-51, Jan. 2006.

Chawathe et al. "A Case Study in Building Layered DHT Applications." Proceedings of the 2005 conference on Applications, technologies, architectures, and protocols for computer communications. vol. 35, Issue 4, Oct. 2005.

Chen et al. "Practical Metropolitan-Scale Positioning for GSM Phone." UbiComp 2006: Ubiquitous Computing Lecture Notes in Computer Science, 2006, vol. 4206/2006, pp. 225-242.

Cheng et al. "Accuracy Characterization for Metropolitan-scale Wi-Fi Localization." Proceedings of the 3rd international conference on Mobile systems, applications, and services. 2005.

Heidari, Mohannad, "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/mas- sad.pdf.

Hightower et al. "Practical Lessons from the Place Lab." IEEE Pervasive Computing, pp. 32-39, vol. 5, Issue 3, Jul.-Sep. 2006.

Hile et al. "Indoor Location Estimation with Placelab." http://www.cs.washington.edu/education/courses/cse590gb/04wi/projects/hil-e-liu/. Jan. 8, 2004. Accessed on Sep. 25, 2008.

Interactive Gambling Industry Code, Dec. 2001, 7 pages.

Kang "Extracting Places from Traces of Locations." ACM SIGMOBILE Mobile Computing and Communications Review. vol. 9, Issue 3, Jul. 2005.

Kitasuka et al. "Positioning Technique of Wireless LAN Terminal Using RSSI between Terminals", Jun. 2005. Accessed Dec. 2008. http://www.techrepublic.com/whitepapers/positioning-technique-of-wireless- -lan-terminals-using-rssi-between-terminals/330959.

Ladd et al. "On the Feasibility of Using Wireless Ethernet for Indoor Localization." IEEE Transactions on Robotics and Automation, pp. 555-559, vol. 20, Issue 3, No. 3, Jun. 2004.

Ladd et al. "Using Wireless Ethernet for Localization," IEEE/RJS International Conference on Intelligent Robots and Systems. 2002.

Lafargue, Edouard. "Wireless Network Audits using Open Source Tools". SANS Institute 2003. Accessed Dec. 2008. http://www.sans.org/reading.sub.--room/whitepapers/auditing/wireless-netw- ork-audits-open-source-tools.sub.--1235.

Lamarca et al. "Finding Yourself: Experimental location technology relies on Wi-Fi and cellphone signals instead of orbiting satellites," Dec. 2004. http//spectrum.ieee.org/computing/networks/finding-yourself.

Lamarca et al. "Place Lab: Positioning Using Radio Beacons in the Wild." Pervasive 2005, LNCS 3468, pp. 116-133, 2005.

Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201.sub.--6.

Letchner et al. "Large-Scale Localization from Wireless Signal Strength." In Proceedings of the National Conference on Artificial Intelligence (AAAI), 2005.

Li et al. "A New Method for Yielding a Database of Location Fingerprints in WLAN" IEE Communications Proceedings, pp. 580-586, vol. 152, Issue 5, Oct. 7, 2005.

Milojicic et al. "Peer-to-Peer Computing" Jul. 10, 2002. https://www.hpl.hp.com/techreports/2002/HPL-2002-57R1.pdf.

Muthukrishnan, et al. "Sensing motion using spectral and spatial analysis of WLAN RSSI." Proceedings of the 2nd European conference on Smart sensing and context. 2007. pp. 62-76.

Otsason et al. "Accurate GSM Indoor Localization." Ubiquitous Computing 2005, LNCS 3660, pp. 141-158, 2005.

Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.

Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.

Varshaysky et al. "Are GSM Phones the Solution for Localization?" 7th IEEE Workshop on Mobile Computing Systems and Applications, 2006. pp. 34-42, Aug. 1, 2005.

Vegni et al. "Local Positioning Services on IEEE 802.11 Networks." Radio Engineering, pp. 42-47, vol. 17, No. 2, Jun. 2008.

Want et al. "The Active Badge Location System," ACM Transactions on Office Information Systems (TOIS) vol. 10, No. 1, pp. 91-102, Jan. 1992.

Welbourne et al. "Mobile Context Inference Using Low-Cost Sensors." Location and Context-Awareness Lecture Notes in Computer Science, 2005, vol. 3479/2005, pp. 95-127.

Youssef et al. "Location-Clustering Techniques for WLAN Location Determination Systems." 2006. http://wrc.ejust.eu.eg/papers/ijca.pdf.

\* cited by examiner

| Position Determination by Maximum Received Signal Strength Example 1 ||
|---|---|
| Beacon | Signal Strength |
| Beacon 1 | -50 dB |
| Beacon 2 | -60 dB |
| Beacon 3 | -40 dB |
| Beacon 4 | -55 dB |

Figure 11A

| Position Determination by Maximum Received Signal Strength Example 2 ||
|---|---|
| Beacon | Signal Strength |
| Beacon 1 | -45 dB |
| Beacon 2 | -55 dB |
| Beacon 3 | -45 dB |
| Beacon 4 | -60 dB |

Figure 11B

| Position Determination by Threshold Signal Strength Example 1 ||
|---|---|
| Beacon | Signal Strength |
| Beacon 1 | -45 dB |
| Beacon 2 | -60 dB |
| Beacon 3 | -55 dB |
| Beacon 4 | -65 dB |

Figure 11C

| Position Determination by Threshold Signal Strength Example 2 ||
|---|---|
| Beacon | Signal Strength |
| Beacon 1 | -55 dB |
| Beacon 2 | -55 dB |
| Beacon 3 | -60 dB |
| Beacon 4 | -55 dB |

| Virtual Reference Point ||
|---|---|
| Longitude | 39.967960 |
| Latitude | -128.884100 |
| Beacon 1 | -33 dB |
| Beacon 2 | - 37 dB |

| Group_Content_Association ||
|---|---|
| Content_ID | 00000001 |
| Attribute_ID | 11111111 |
| Relevance_Weight | 105 |

| Location_Content_Association ||
|---|---|
| Content_ID | 00000001 |
| Location_ID | 22222222 |
| Relevance_ Weight | 500 |

| Content_Rating_Time | |
|---|---|
| Content_ID | 00000001 |
| Time | 2011-03-28 11:01 |
| Relevance_Weight | 95 |

TARGETED CONTENT DELIVERY

CROSS-REFERENCE

This patent application claims the benefit of provisional patent application 61/482,834 entitled CONTENT RELEVANCE WEIGHTING SYSTEM filed on May 5, 2011;

This patent application claims the benefit of provisional patent application 61/427,753 entitled INTERACTIVE DISPLAY SYSTEM filed on Dec. 28, 2010;

This patent application claims the benefit of provisional patent application 61/427,755 entitled INTERACTIVE DISPLAY SYSTEM filed on Dec. 28, 2010;

This patent application claims the benefit of provisional patent application 61/454,664 entitled USER INTERFACE FOR GEOFENCE-ASSOCIATED CONTENT filed on Mar. 21, 2011;

This patent application claims the benefit of provisional patent application 61/472,054 entitled CONTENT RELEVANCE WEIGHTING SYSTEM filed on Apr. 5, 2011;

This patent application is a continuation-in-part of patent application Ser. No. 13/218,256 entitled SYSTEM AND METHOD FOR HANDSET POSITIONING WITH DYNAMICALLY UPDATED WI-FI FINGERPRINTING filed on Aug. 25, 2011 that claims the benefit of provisional patent application 61/376,936 filed on Aug. 25, 2010, provisional patent application 61/351,770 filed on Jun. 4, 2010, and provisional patent application 61/352,242 filed on Jun. 7, 2010;

This patent application is a continuation-in-part of patent application Ser. No. 13/153,214 entitled MERCHANT CONTROLLED PLATFORM SYSTEM AND METHOD filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

This patent application is a continuation-in-part of patent application Ser. No. 13/153,238 entitled MERCHANT CONTROL PLATFORM SYSTEM AND METHOD WITH LOCATION-BASED CONTENT DELIVERY filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

This patent application is a continuation-in-part of patent application of patent application Ser. No. 13/153,248 entitled LOCATION POSITIONING ENGINE SYSTEM AND METHOD filed on Jun. 3, 2011 that claims the benefit of the benefit of provisional patent application 61/351,677 filed on Jun. 4, 2010, provisional patent application 61/351,770 filed on Jun. 4, 2010, and provisional patent application 61/352,242 filed on Jun. 7, 2010;

This patent application is a continuation-in-part of patent application Ser. No. 12/821,852 entitled MOBILE AUTONOMOUS DYNAMIC GRAPHICAL USER INTERFACE APPLICATION FRAMEWORK filed on Jun. 23, 2010 that claims the benefit of provisional patent application 61/223,565 filed on Jul. 7, 2009;

This patent application is a continuation-in-part of patent application Ser. No. 12/413,547 entitled MOBILE AUTONOMOUS DYNAMIC GRAPHICAL USER INTERFACE filed on Mar. 28, 2009 that claims the benefit of provisional patent application 61/040,661 filed on Mar. 29, 2008; and The above patent applications are hereby incorporated by reference in this patent application.

FIELD

The present invention relates to a system and method for delivering targeted content to a wireless handset. More particularly, the present invention relates to an interface to associate parameters with content, such that wireless handsets that satisfy the parameters receive the content.

BACKGROUND

Systems that send content to a user based on information stored in a user profile are well known. For example, online music delivery services determine which music content to deliver to a user based on information provided by the user indicating musical preferences and information generated about the user based on user response to music delivered to the user. In another example, current content delivery systems restrict content delivered to a wireless handset based on rules and interests established in a user profile.

Existing systems for targeted content delivery lack an interface to allow a content administrator to define associations between user attributes, defined in user profiles to direct how content is to be targeted. Moreover, an interface that allows content administrators to create hierarchical relationships between content items.

Further, many existing content delivery systems require a user to enter a search term or otherwise make a request for information to receive targeted content. In other systems, the targeted content made available to the user is static. Accordingly, there is a need for a content delivery system that automatically determines how to target content based on one or more of user profile information, time, and user location and sends new content based on user response to the content, changes in user location and changes in available content.

SUMMARY

A system for delivering targeted content to a wireless handset is described. The system comprises a wireless handset communicatively coupled to a network and a user profile associated with the wireless handset. The user profile comprises at least one user attribute. The system further comprises a content administration interface. The content administration interface is configured to receive an entry of a content item, receive an association between a user attribute and the content item, and store the association between the content item and the user attribute in computer memory. The content administration interface is further configured to receive an association between a parent content item and the content item and store the content item as a child content item of the parent content item in computer memory. The system further comprises a content delivery module. The content delivery module is configured to filter stored content items to retrieve content items associated with a user attribute. The content delivery module transmits at least one retrieved content item to the wireless handset via the network. The system further comprises a handset content interface configured to display the at least one transmitted content item on the wireless handset. The handset content interface is further configured to receive a selection input of a displayed content content item. When the selected displayed content item is a parent content item, the handset content interface is configured to display one or more child content items associated with the parent content item.

In another embodiment, a system for delivering targeted content comprises a wireless handset communicatively coupled to a network. A user profile associated with the wireless handset comprises at least one user attribute. A content administration interface of the system is configured to receive an entry of a content item, receive an association between a user attribute and the content item, and store the association between the content item and the user attribute in computer memory. A content delivery module of the system is configured to periodically filter stored content items to retrieve content items associated with a user attribute and periodically transmit at least one retrieved content item to the wireless handset via the network. A handset content interface of the system is configured to display the at least one transmitted content item on the wireless handset.

A method for delivering targeted content to a wireless handset is also described. The method comprises receiving an entry of a content item with a content administration interface. The method further comprises receiving an association between the content item and a user attribute of a user profile with a content administration interface and storing the association between the content item and the user attribute in computer memory. The method also comprises receiving an association between a parent content item and the content item with the content administration interface and storing the content item as a child content item of the parent content item in computer memory. The stored content items are filtered to retrieve content items associated with a user attribute. A content delivery module transmits at least one retrieve content item to a wireless handset via a network. At least one of the transmitted content items is displayed on the wireless handset. A handset content interface receives a selection input of a displayed content item. When a parent content item is selected, one or more of the child content items associated with the parent content item is displayed.

FIGURES

The present invention will be more fully understood by reference to the following drawings which are for illustrative, not limiting, purposes.

FIGS. 11A-11D show illustrative examples of wireless handset location as determined from beacon signals received by the wireless handset.

FIG. 16 shows an illustrative virtual reference point.

FIG. 23 shows an illustrative database table entry associating a content item with an attribute group and storing a relevance weight value for the association.

FIG. 24 shows an illustrative database table entry associating a content item with a location identifier and storing a relevance weight value for the association.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

The graphical user interface descriptions herein are merely illustrative. Where "button," "drop down menu," "text box," "input box" and similar interface controls are described herein, it will be realized by those skilled in the art that other interface control elements may be used.

Figure 1A:
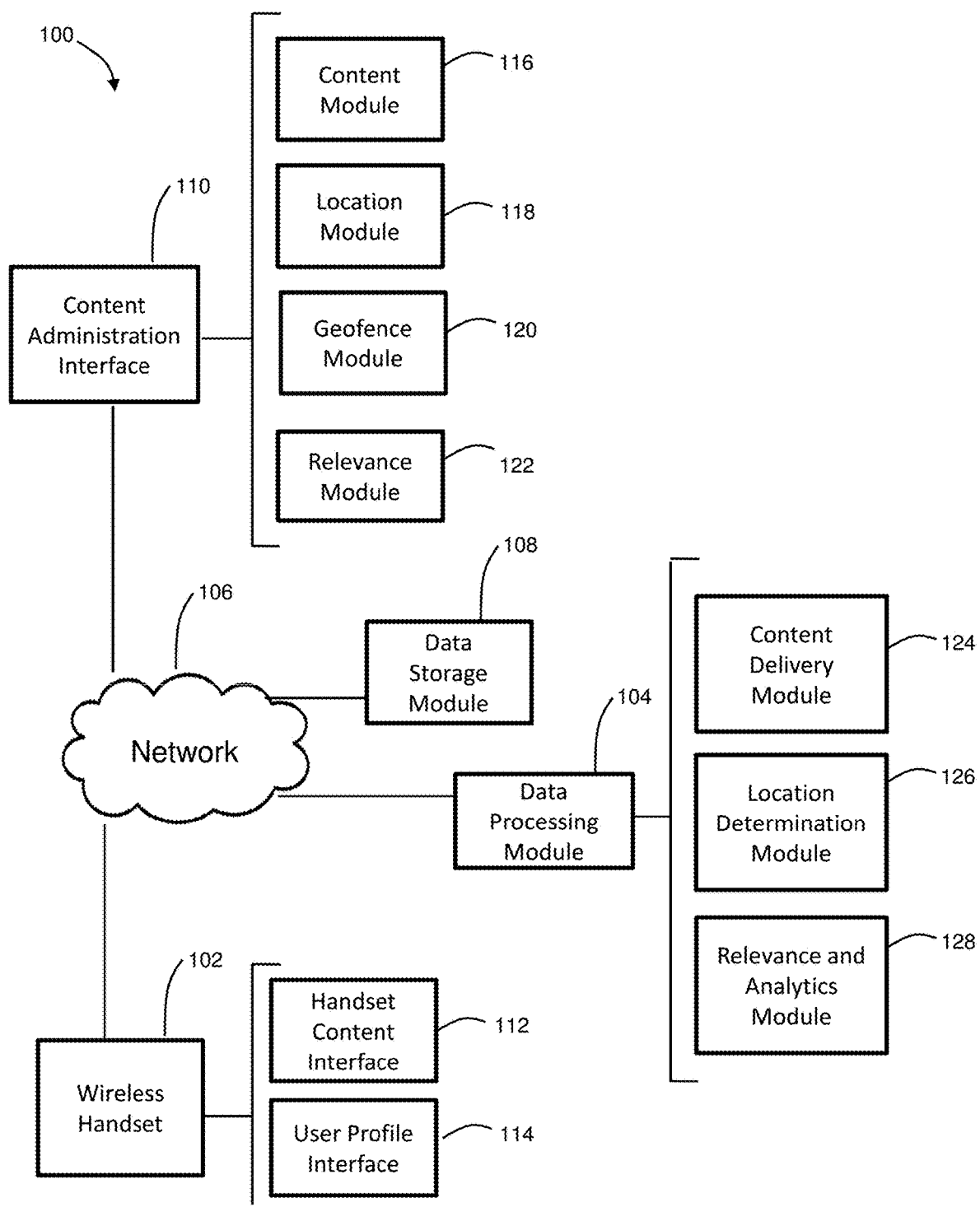
FIG. 1A shows a diagram of an illustrative targeted content delivery system according to a first embodiment

Referring to FIG. 1A, a diagram of an illustrative targeted content delivery system according to a first embodiment 100 is shown. Wireless handset 102 receives content transmitted from data processing module 104 via network 106. The content is stored in data storage module 108. A content administration interface 110 allows a content administrator to create content and content associations to define how the content will be targeted.

Wireless handset 102 may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network (WLAN), Wi-Fi or WiMAX. The wireless handset comprises a handset content interface 112. The handset content interface is a graphical user interface that displays content on a display of the wireless handset. The handset content interface may also be configured to receive user input, such as feedback pertaining to the displayed content and user-created content. The handset content interface may be an application running on a processor of the wireless handset. In other embodiments, the handset content interface is accessed via network 106, for example, using an internet browser application running on a processor of the wireless handset.

In some embodiments, wireless handset 102 comprises user profile interface 114. The user profile interface allows the user of the wireless handset to input user profile information comprising one or more user attributes. The user profile interface and the content interface may be components of a single application or may be separate applications.

Network 106 may be a local area network ("LAN"), wide area network ("WAN"), or any other network to facilitate communication among computers and wireless communication devices.

Content administration interface 110 is an application used by a content administrator to manage content. Typically, a content administrator is affiliated with a premises or service for which the content is generated. In some embodiments, the content administration interface application is run on a processor of a computer or other computing device located on or affiliated with the premises. The content administration interface application may also be run on a processor of a computer or other computing device that is remote from the premises and accessed over network 106, for example, via an internet browser. Content items generated with the content administration interface are stored in memory. Typically, content items are stored in a data storage module 108. In some embodiments, the content administration interface 110 and content data storage module 108 reside on a single computing device, in which case it is not necessary for the content administration interface and content database to communicate via network 106.

Figure 2:
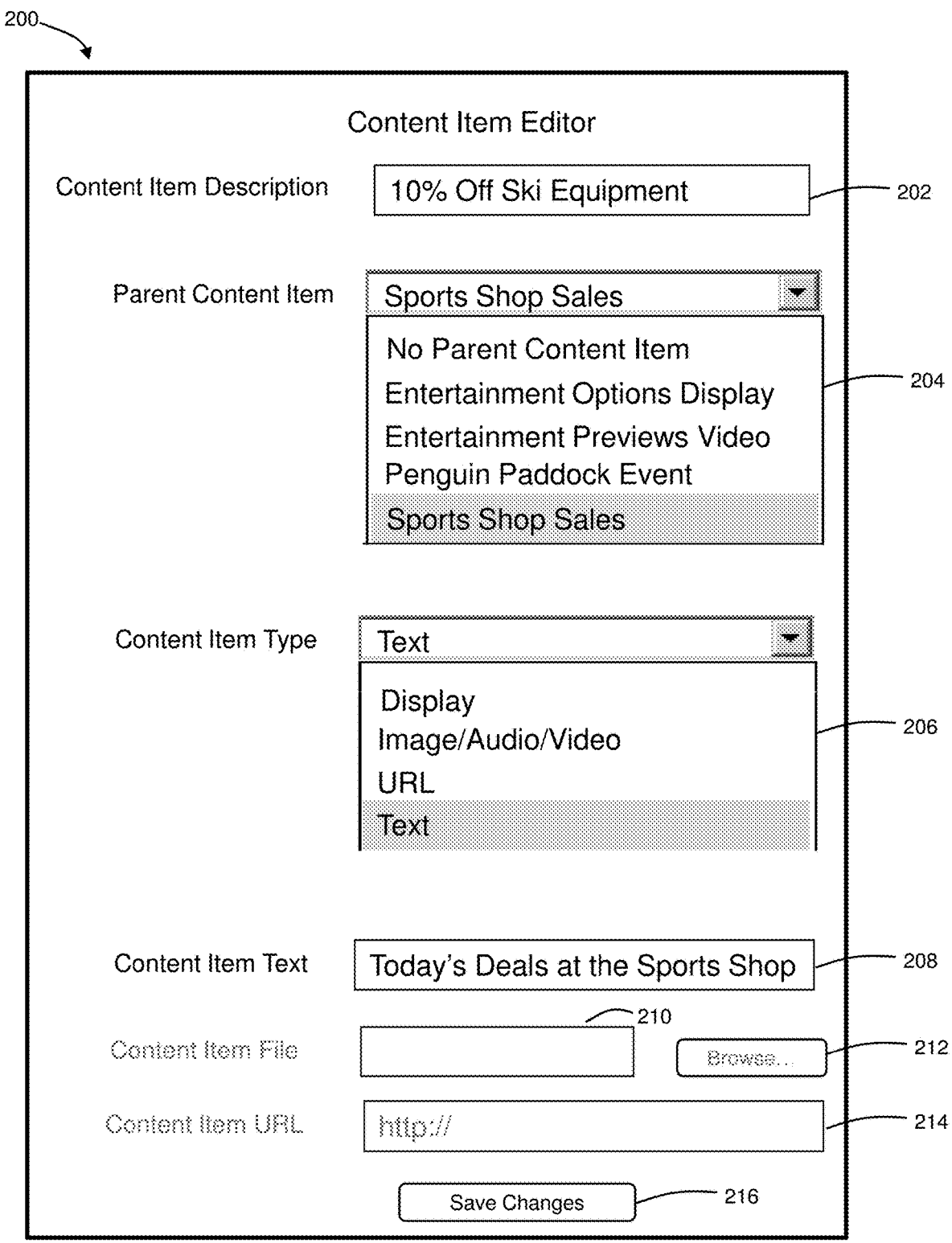
FIG. 2 shows an illustrative content item editor of the content administration interface.
Figure 3:
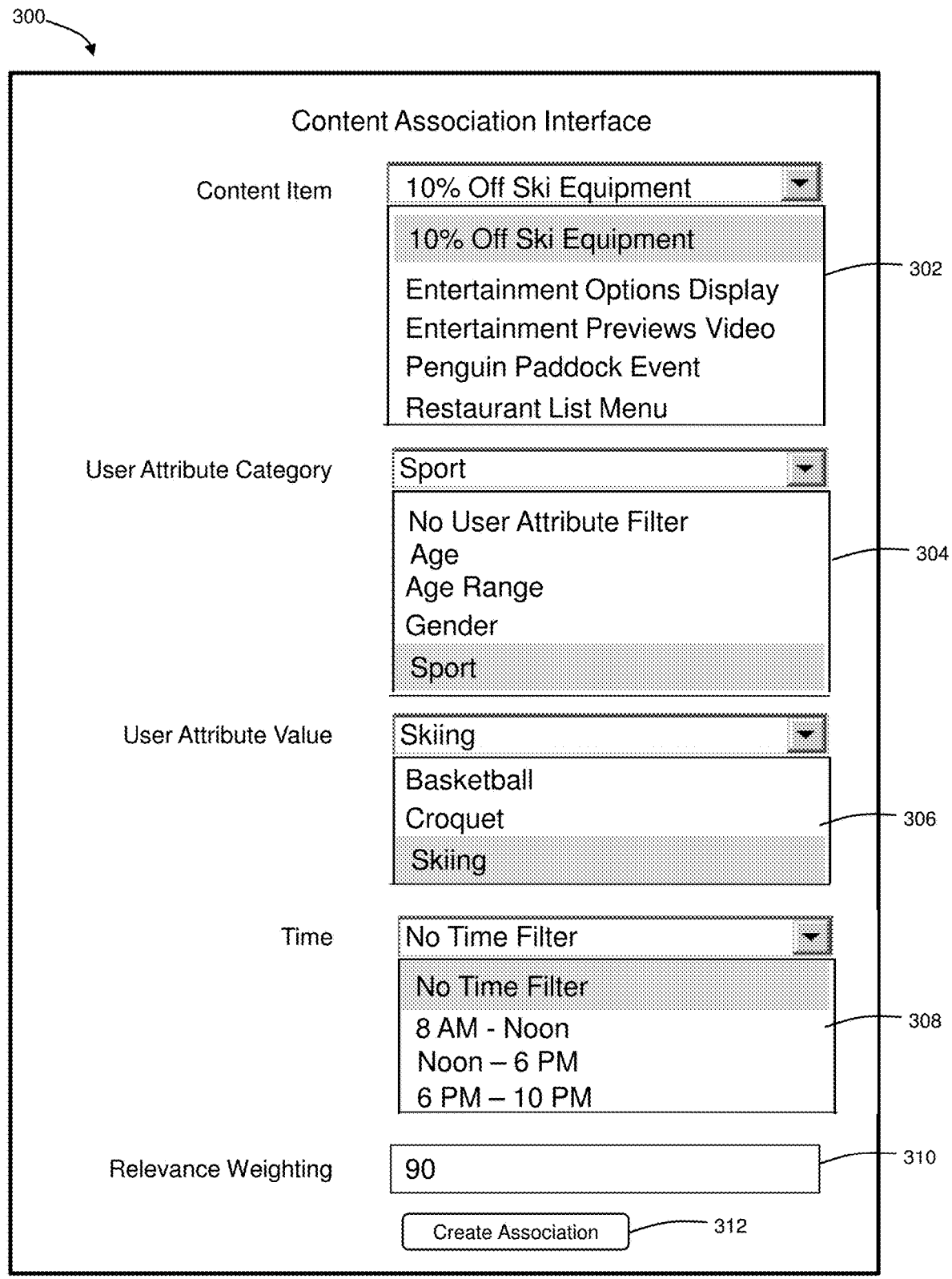
FIG. 3 shows an illustrative content association interface.

Content administration interface 110 comprises content module 116. The content association module allows the content administrator to generate content items and define associations between content items and various parameters. For example, the content association module may be used to create an association between a content item and a user attribute as defined in a user profile. An illustrative content item editor interface and content association interface of the content module are shown in FIGS. 2 and 3, respectively.

Figure 4:
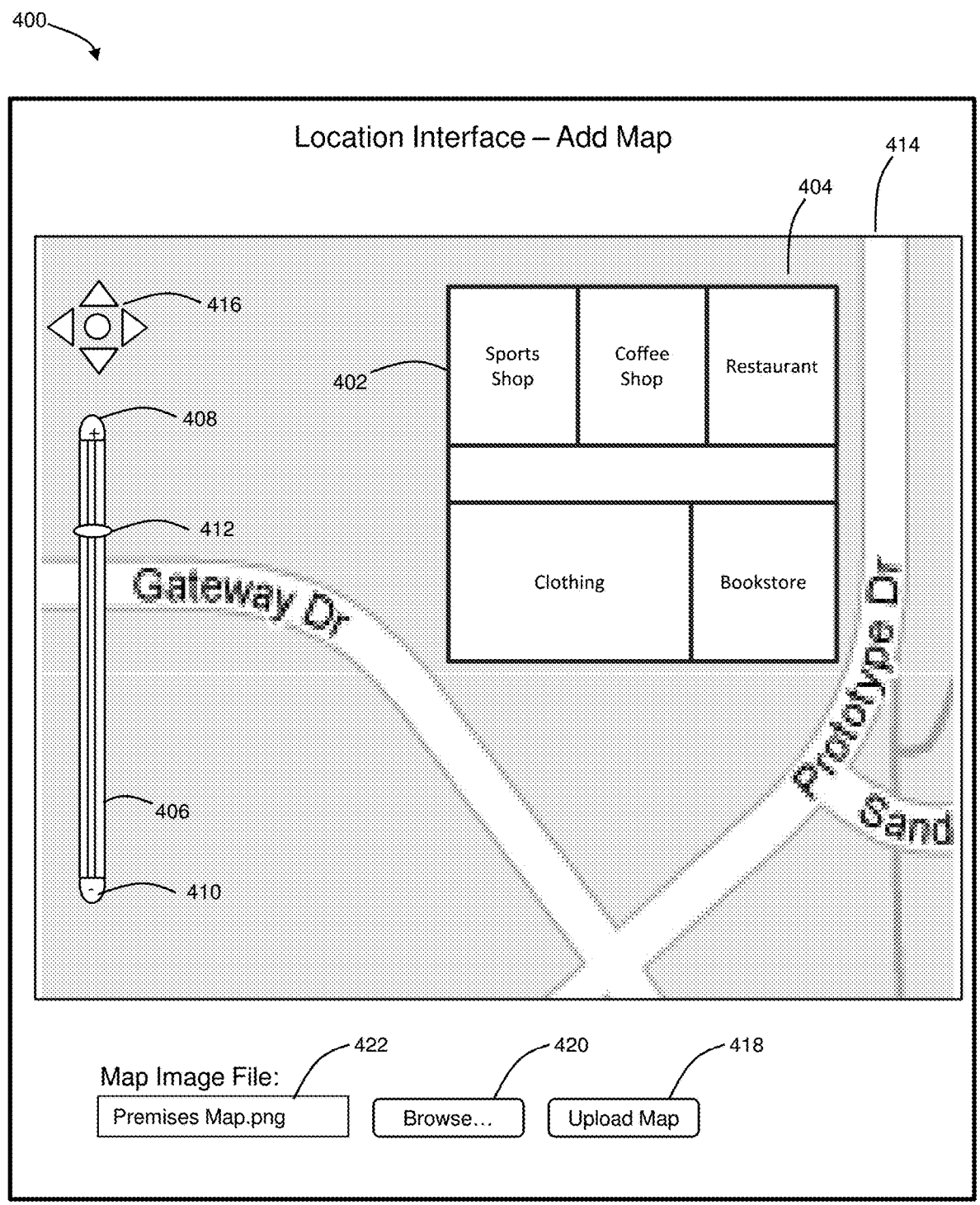
FIG. 4 shows an illustrative location interface.

Content administration interface 110 may further comprise location module 118. The location module of the content interface allows the content administrator to indicate information required for determination of the position of the wireless handset. For example, the location module may be a Geographic Information System (GIS) interface that allows the content administrator to indicate the geographic location of a premises map. In one embodiment, the location module is a GIS interface allowing the content administrator to indicate the location of network objects, such as Wi-Fi beacons, relative to a premises map. In another embodiment, the location module is a GIS interface allowing the content administrator to indicate the location of Wi-Fi beacons and Wi-Fi sensors relative to a premises map. The location of the wireless handset relative to the premises may be determined based on the known location of the beacons as indicated with the GIS interface and information derived from beacon signals received by the wireless handset. An illustrative location interface of the location module is shown in FIG. 4.

Figure 6:
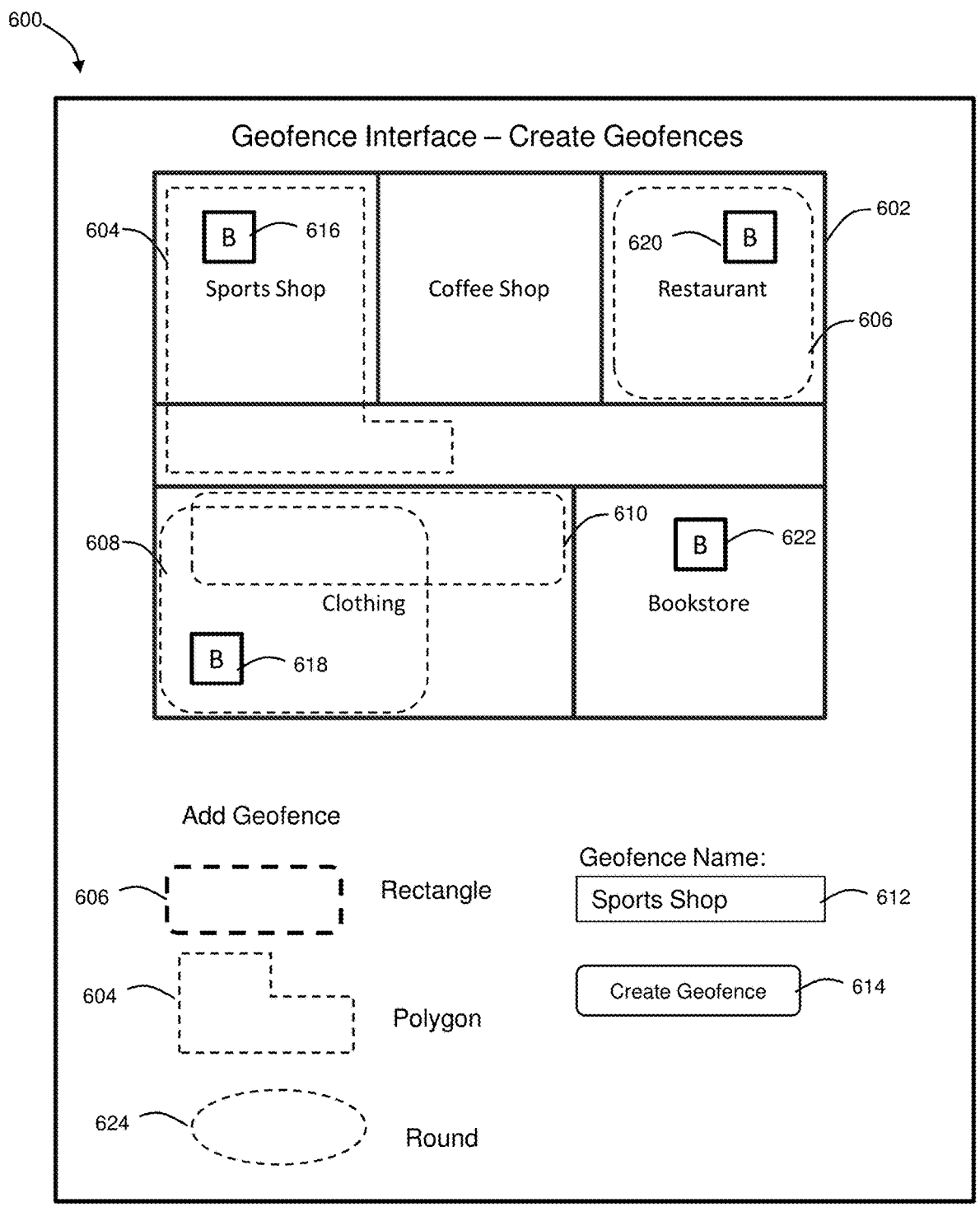
FIG. 6 shows an illustrative geofence creation interface.
Figure 7:
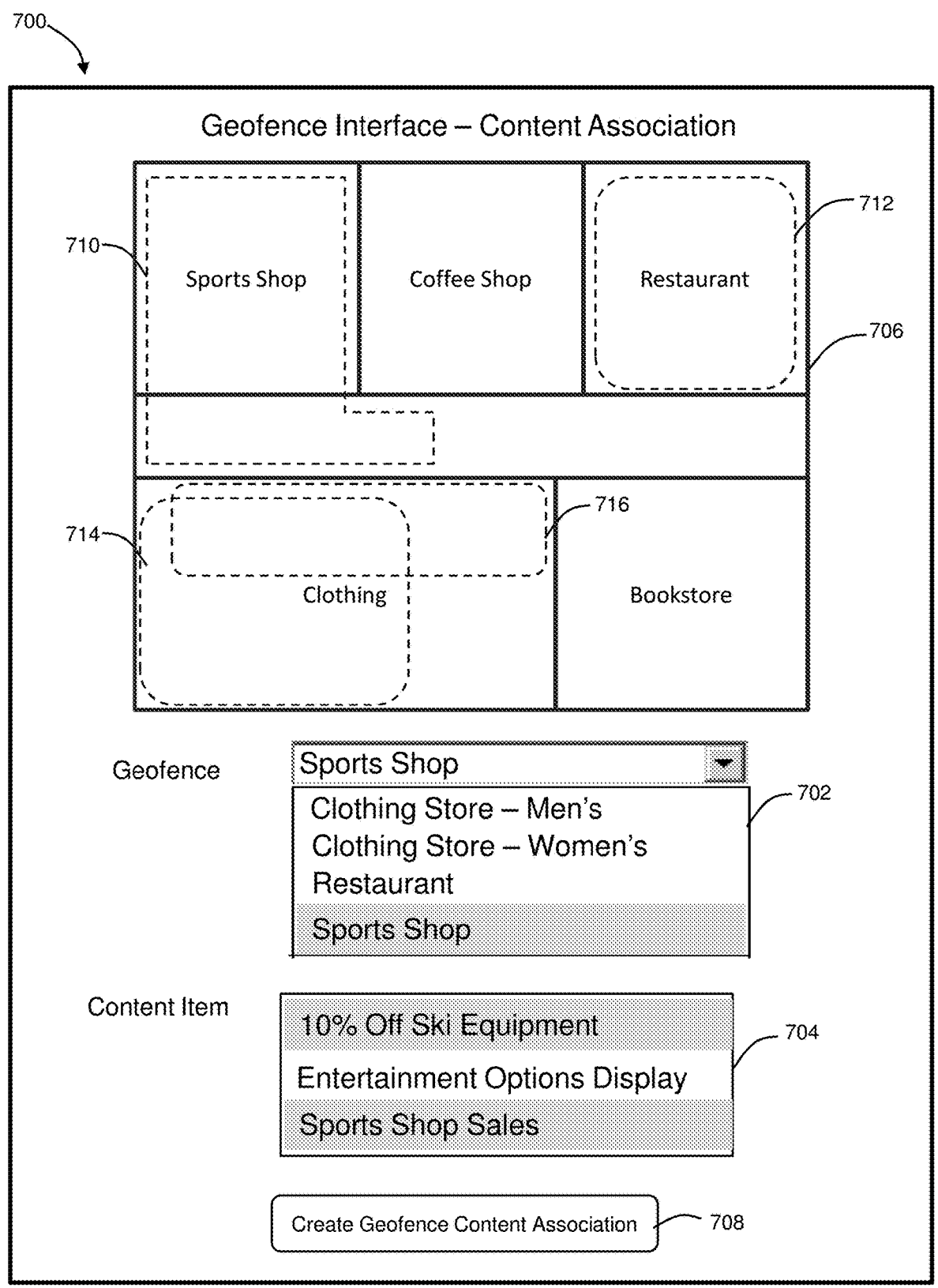
FIG. 7 shows an illustrative geofence content association interface.

The content administration interface may further comprise geofence module 120. The geofence module allows the content administrator to indicate the location of a geofence relative to a map, such as a premises map. A geofence, also referred to as a "content bubble," is a virtual geographic boundary line delineating a geographic area. An illustrative geofence creation interface of the geofence module is shown in FIG. 6. In some embodiments, the content administrator uses the content association module to create associations between content items and geofences. An illustrative geofence content association interface of the geofence module is shown in FIG. 7. The location of the wireless handset is determined by location determination module 126 using information transmitted from wireless handset 102. In some embodiments, if the wireless handset is located within a geofence, content delivery module 124 transmits content associated with the geofence to wireless handset 102.

Figure 19:
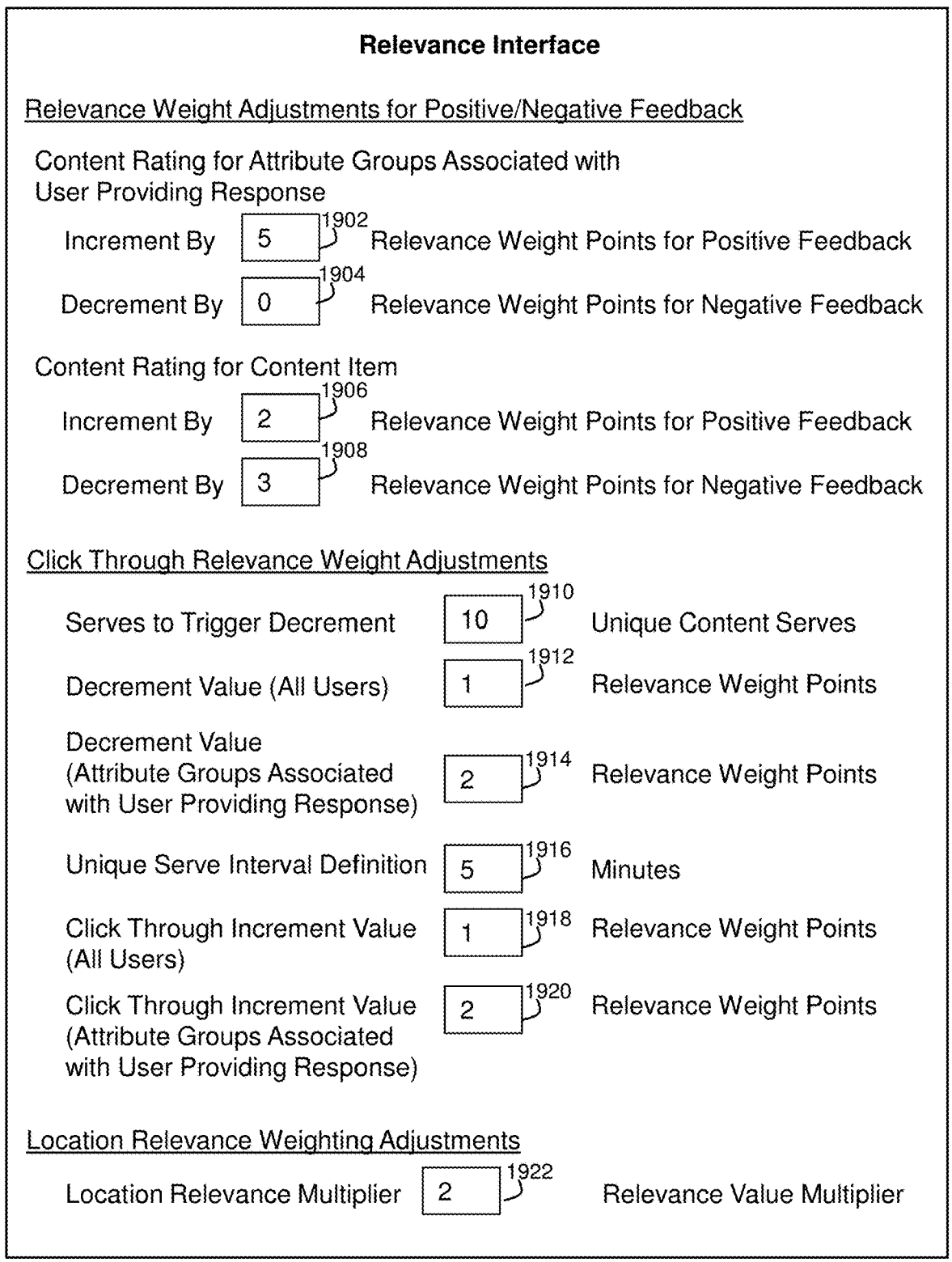
FIG. 19 shows an illustrative relevance interface.

The content administration interface may further comprise relevance module 122. In some embodiments, a relevance weight value is associated with a content item. The relevance weight value may be adjusted based on user response to the content item, for example, feedback provided for the content item, selection of the content item, or lack of response to the content item. The relevance module allows the content administrator to adjust parameters affecting how the relevance weight is adjusted. Typically, the relevance module allows the content administrator to enter or change numerical point values by which a relevance weight is to be incremented or decremented in response to user behavior. An illustrative relevance interface of the relevance module is shown in FIG. 19.

Data storage module 108 stores content items and information used for targeted delivery of content items. The data storage module may store, for example, user profile data, map data, geofence definition data, locations of network objects, relevance weight parameters, and associations between content items and parameters used for content targeting. In an illustrative embodiment, data storage module 108 comprises one or more databases communicatively coupled to network 106.

Data processing module 104 comprises one or more applications used for targeted delivery of content. In some embodiments, data processing module 104 runs on a processor of a server or other computing device communicatively coupled to network 106.

Content delivery module 124 of data processing module 104 determines one or more content items to transmit to wireless handset 102. In some embodiments, content is targeted based on one or more of user profile, location, time, date, and relevance weight. The content delivery module may transmit content to the wireless handset on a periodic basis, such as one second intervals to one minute intervals, e.g. five second intervals. Alternatively or additionally, content delivery module 124 transmits content items to the wireless handset when the handset content interface 112 is initiated, in response to a request for content placed via handset content interface 112, or when the determined location of the wireless handset is updated by location determination module 126.

Location determination module 126 of data processing module 104 determines a location of the wireless handset based on information received from or regarding wireless handset 102. The location determination module may further determine whether the wireless handset is located within a geofence. The determined location may be used by content delivery module 124 to determine which content items to transmit to wireless handset 102.

In some embodiments, the wireless handset transmits a location message comprising the signal strength, e.g., a received signal strength indicator (RSSI), and identification, e.g., a Media Access Control address (MAC address) of each beacon signal detected theandset. The beacon is any device communicatively coupled to a network and capable of transmitting a signal that can be received by the wireless handset using Wi-Fi, Bluetooth, or other wireless standards such as an access point or femtocell. Location determination module 126 uses the information in the location message to determine the location of the wireless handset based on known locations of the beacons. In other embodiments, the location message comprises location information such as a zip code, city, Global Positioning System (GPS) or other geographical coordinates. In a further alternative embodiment, the user indicates the location of the wireless handset, for example, by using the wireless handset to capture an image of the environment or of a code such as a QR code. The image is compared to a database of images to determine the location of the handset. The user may alternatively select a location indicator from a menu displayed on the wireless handset. It will be recognized that other methods may be used to communicate information regarding the location of the wireless handset.

The wireless handset may transmit location messages at predefined intervals, such as one second intervals to one minute intervals, e.g. five second intervals. The content delivery module 124 may transmit new content item data each time the location message is received. In this manner, the content item data displayed on the wireless handset is updated as the location of the user changes, such that some or all of the content item data displayed to the user is relevant to the user's location. In some embodiments, content item data is not updated until the content item has been displayed on the handset for a predetermined period of time.

In an alternative embodiment, the remote server may interpret the location message to determine whether the wireless handset is located within a predefined distance of an access point. The distance between the access point and the wireless handset may be determined on the basis of a threshold signal strength. When the signal strength exceeds a predefined threshold, the remote server transmits at least one content item associated with the location indicated by the signal identifier of the access point.

Relevance and analytics module 128 of data processing module 104 adjusts the relevance weight value associated with a content item based on user response to the content item. The relevance and analytics module may further log changes in the relevance weight value for a content item in association with one or more parameters such as time, location, and user profile information to allow analysis of user response to content items.

Figure 1B:
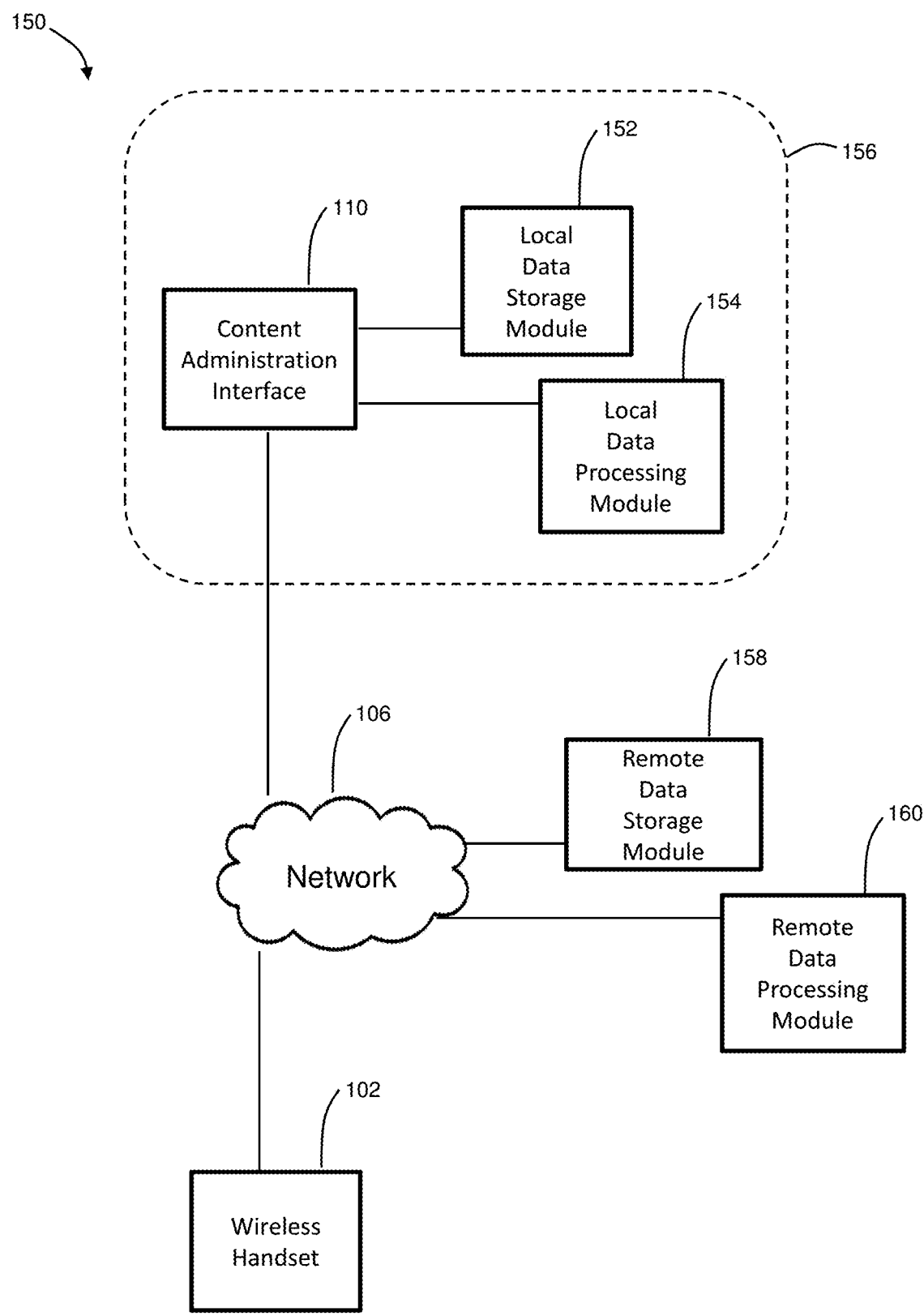
FIG. 1B shows a diagram of an illustrative targeted content delivery system according to a second embodiment

Referring now to FIG. 1B, a diagram of an illustrative targeted content delivery system 150 according to a second embodiment is shown. In the second embodiment, local data storage module 152 and local data processing module 154 are communicatively coupled to content administration interface 110. For example, a local server may comprise memory for local data storage, the memory communicatively coupled to a processor for running applications of the local data processing module and content administration interface. In other embodiments, the content administration interface, local data processing module, and local data storage module are located on one or more computing devices communicatively coupled by a network, such as a local area network. In some embodiments, the local server or local area network are located behind a firewall 156. "Local" as used herein indicates an association with a particular premises or service.

Remote data storage may be used in addition to or as an alternative to local data storage 152. Remote data processing module 160 may be used in addition to or as an alternative to remote data processing. Local data storage module 152 and remote data storage module 158 perform one or more of the functions of data storage module 108 described with reference to FIG. 1A. Similarly, local data processing module 154 and remote processing module 160 perform one or more of the functions of data processing module 104 described with reference to FIG. 1A. In one embodiment, when local data processing module 154 is overwhelmed, remote data processing module 160 is used for overflow data processing.

In some embodiments, local data storage module 152 and local data processing module 154 are communicatively coupled to an anonymizing server. Data transmitted from the local data storage module and the local data processing module pass through the anonymizing server en route to network 106. Similarly, remote data storage module 158 and remote data processing module 160 may be communicatively coupled to an anonymizing server. Data transmitted from the remote data storage module and the remote data processing module pass through the anonymizing server en route to network 106.

Referring to FIG. 2, an illustrative content item editor of the content administration interface is shown. The content item editor is a graphical user interface that allows the content administrator to create and edit content items. A content item is information transmitted to a wireless handset and shown on a display of the handset. A content item may be, for example, text, video, audio, one or more images, a menu, an application, a link to a uniform resource locator (URL), a link to another content item, or information to be shown on a display in proximity to the wireless handset. The content item editor comprises content item description entry field 202. In the illustrative example shown in FIG. 2, the content administrator has entered the description "10% Off Ski Equipment" for the content item.

In some embodiments, a parent content item may link to one or more child content items. When the parent content item is selected from the wireless handset content interface, the child content items of the parent content item may be displayed. In the illustrative content editor, the content item "Sports Shop Sales" has been selected from drop down menu 204 as the parent content item for the content item "10% off Ski Equipment."

The content item type may be specified, as indicated at drop down menu 206. In the illustrative example, content item type "Text" has been selected for content item "10% Off Ski Equipment." The text "Today's Deals at the Sports Shop" has been entered in content item text input box 208. This is the text that will be displayed in the handset content interface when content item "Sport Shop Sales" is transmitted to the wireless handset. In other embodiments, the text in the content item description is used as the content item text. The content item file text box 210, browse button 212, and content item URL input box 214 are shown in grey text to indicate that these entry fields are not available when the selected content item type is "Text." When the content item type as selected in content item type drop down menu 206 is "Display," the file to be shown on the display may be selected for upload using browse button 212. Similarly, when the content item type is "Image/Audio/Video," the file to be shown on the display may be selected for upload using browse button 212. The file name of the selected file is shown in content item file text box 210. When the content item type is "URL," the URL may be entered in content item URL input box 214.

When the content administrator has completed the content item entry, the content administrator may select save changes button 216 to record the entry. If the content item is new, the new content item will be saved in memory. In some embodiments, a new entry is created in a database table of one or more of data storage module 108, local data storage module 152 and remote data storage module 158. If the content item has been changed, the database table is updated to reflect the change.

Referring now to FIG. 3, an illustrative content association interface 300 is shown. The content association interface is a graphical user interface used to create associations between content items and one or more parameters such as time, user attributes, and relevance weighting. "Association" indicates a connection between data stored in computer memory. Typically, the connection exists in a database table. For example, when a content item is associated with a user attribute, an entry may be created in a database table comprising fields for user identification and user attribute identification. Content items transmitted to the wireless handset may be filtered in accordance with the content associations such that the content items displayed on the handset are targeted at the user of the wireless handset. For example, when an association between a content item and a user attribute has been created, the content item may be delivered to wireless handsets of a user described by the user attribute. The user attribute is information about a user that is provided by a user (e.g., through user profile interface 114) or collected about the user.

In the illustrative content item editor shown in FIG. 3, the content administrator creates an association between a content item and a user attribute. To create an association between the content item and the user attribute, the content administrator selects a content item, a user attribute category, and a user attribute value. In some embodiments, a content association may be created by selecting a content item and a user attribute value. The content administrator has selected the content item "10% Off Ski Equipment" from content item drop down menu 302. User attribute category "Sport" has been selected from drop down menu 304. Drop down menu 306 may be populated with user attribute values associated with the user attribute category selected from drop down menu 304. When attribute category "Sport" is selected from the user attribute category drop down menu, the user attribute value drop down menu is populated with user attribute values describing different sports. The content administrator has selected user attribute value "Skiing" from the user attribute value drop down menu 306.

If the content administrator does not wish to create an association between a content item and a user attribute, the content administrator may use the contetnt association interface to indicate that content is not to be filtered by user attribute. For example, the content administrator may select "No User Attribute Filter" from user attribute category drop down menu 304.

The content association interface may allow a content administrator to associate a time with the content item. The time may be a time, date, time range, date range, day of the week, or other indication of time. In the illustrative example shown in FIG. 3, the content administrator has selected "No Time Filter" from time drop down menu 308. When a time option other than "No Time Filter" is selected, an association is created between the content item and the time selection. In this manner, content items transmitted to the wireless handset may be filtered according to time. For example, if the time range "8 AM-Noon" is selected, the content item may be transmitted to a wireless handset only during the indicated time range.

In some embodiments, when an association between a content item and a user attribute value is created, a relevance weighting may be applied to the association. Typically, when a content association having a relevance weighting is created, an entry is made in a database table comprising fields for a content identification, a user attribute identification, and a relevance weight value. An illustrative database table in which an association between a content item and a user attribute is made is shown in FIG. 23. Similarly, when an association between a content item and a time is created, a relevance weighting may be applied to the association. A relevance weight value of 90 has been entered in relevance weighting input box 310. In some embodiments, only content items having a relevance weight exceeding a preset value are transmitted to the wireless handset. The relevance weight value may be adjusted by relevance and analytics module 128 based on user response to the content item.

Referring now to FIG. 4, an illustrative location interface 400 is shown. A content administrator may indicate the location of premises map 402 relative to a street map 404 using a GIS interface. Magnification bar 406 allows adjustment of the magnification of street map 404 to the appropriate scale for placement of the premises map. Magnification bar 406 comprises increase magnification indicator 408, decrease magnification indicator 410, and sliding magnification control 412. The content administrator may slide the sliding magnification control 412 in the direction of the increase magnification indicator 408 to increase the level of magnification of the map and may slide the sliding magnification control 412 in the direction of the decrease magnification indicator 410 to reduce the level of magnification of the map. To change the position of the street map 404 within map window 414, navigation control 416 is used. Navigation control 416 comprises an up arrow, a down arrow, a left arrow and a right arrow. To move the street map in the desired direction, the arrow pointing in the desired direction is selected. Navigation may additionally or alternatively be accomplished by mouse clicking on street map 404, holding down the mouse button, and moving the mouse to slide the map in the desired direction. It will be recognized that other methods for adjusting street map magnification and street map position within the map window may be used.

To indicate the location of the premises, premises map image 402 is placed on the street map and positioned relative to the street map. The content administrator selects a map image file to insert over the street map. For example, the content administrator may select browse button 420 to open a dialog box allowing the content administrator to choose a map image file from a file directory. When an image file has been selected, the name of the image file may appear in a text box as shown at 422. The content administrator may then upload the selected map, for example, by selecting upload map button 418. After the map is uploaded, it appears within map window 414. The premises map image 402 may be resized and rotated with mouse controls or other interface controls. The content administrator places the premises map image 402 in the appropriate position relative to street map 404. For example, the content administrator may place the premises map image by mouse clicking on the premises map image, holding down the mouse button, and dragging the premises map image to the desired position. It will be recognized that other methods for selecting a map image and positioning it at a desired location on a street map may be used. The position of premises map 402 is stored in computer memory. For example, a set of coordinates representing the longitude and latitude of the corners of the premises map may be derived from the placement location of the premises map relative to the street map. The set of coordinates may be stored in a database table, such as a database table of data storage module 108. The level of magnification and position of street map 404 within map window 414 may also be stored in computer memory to allow the view shown in map window 414 to be reproduced at a later time. The image file or a string representing a path to the image file may also be stored in computer memory.

In an alternative embodiment, in lieu of a GIS interface, geographical coordinates (e.g., latitude and longitude) or other location information defining the boundaries of the premises are entered at a text prompt and stored in computer memory.

Figure 5:
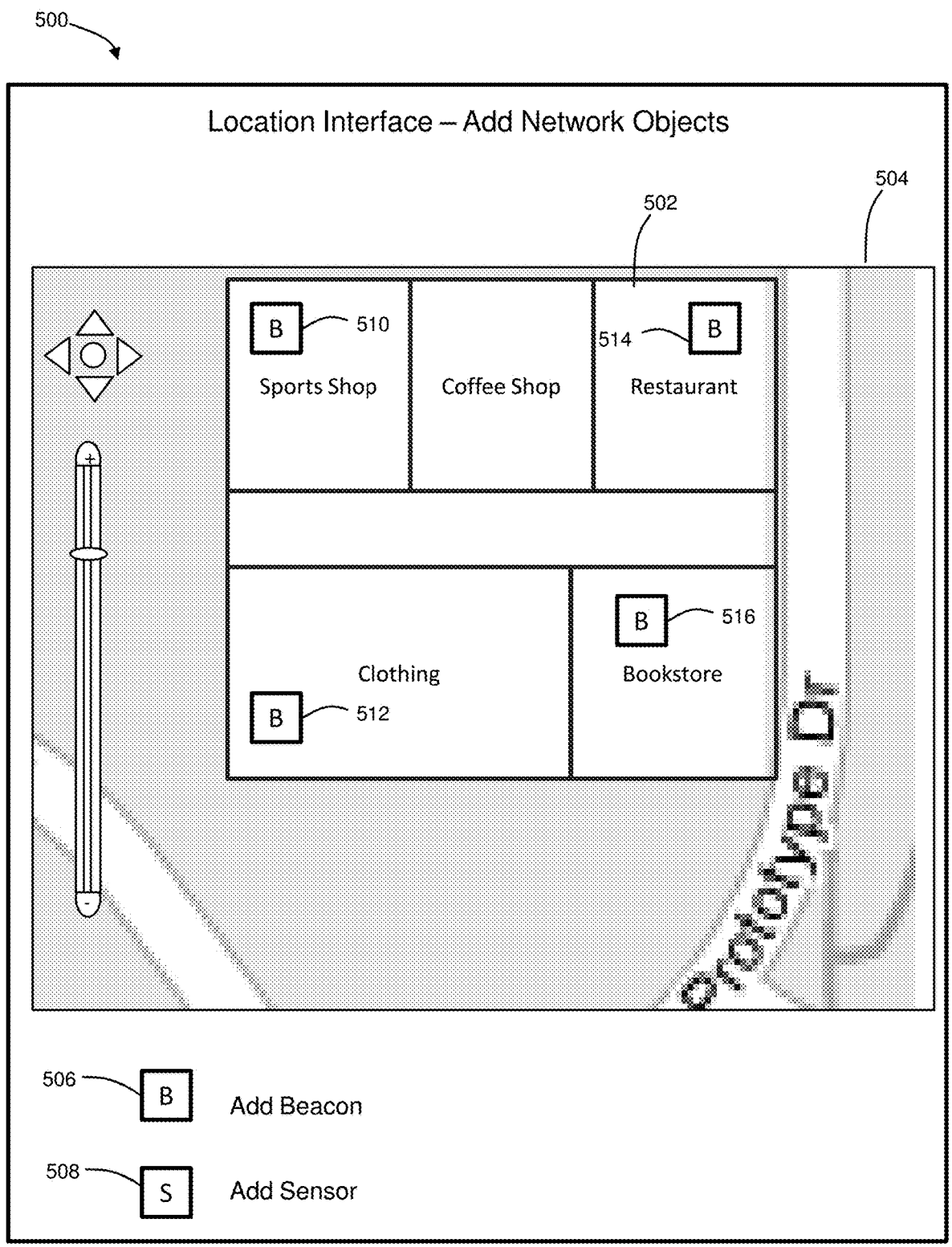
FIG. 5 shows an illustrative network object placement interface.

Referring to FIG. 5, an illustrative network object placement interface 500 is shown. The network object placement interface allows the content administrator to place network object icons on the premises map to indicate the location of the network objects on the premises. The network objects that may be placed on the map include beacons and sensors. In some embodiments, sensors capable of detecting beacon signals are used by location determination module in determining the location of the wireless handset. When beacon icon 506 is selected, a beacon icon appears in map window 504. The beacon icon may then be placed in a position on the premises map corresponding to the location of the beacon on the physical premises content administrator then drags the beacon icon to the desired location on merchant premises map 502. For example, the beacon icon may be mouse dragged into place on the premises map. It will be recognized that alternative interface tools may be used to indicate the position of beacons on a premises by placing beacon icons on a premises map. In the illustrative example shown in FIG. 5, beacons 510, 512, 514 and 516 have been placed on premises map 502 using the interface. To add a sensor icon to the premises map, the content administrator selects sensor icon 508 and moves the sensor icon to the position on premises map 502 corresponding to the location of the sensor on the premises. It will be recognized that a variety of other methods for indicating the location of network objects on a premises map may be used. The geographical coordinates of network objects placed on the premises map are stored in computer memory, for example, in data storage module 108.

In some embodiments, the interface allows the content administrator to assign an identifier to each network object placed on the premises map using the interface. The network object identifier is stored in association with the location of the network object.

In an alternative embodiment, in lieu of a GIS interface, geographical coordinates or other location information defining the locations of network objects are entered at a text prompt and stored in computer memory.

In another embodiment, a local positioning system is be used in lieu of a geographical positioning system, and stored location coordinates for network objects, geofences, premises maps, virtual reference points, displays, and other system components are defined with respect to an arbitrary point on a premises.

Referring now to FIG. 6, an illustrative geofence creation interface 600 is shown. A shape drawing tool allows the content administrator to define variously shaped geofences relative to the premises map. When the wireless handset location is determined to be within one of the geofences, content associated with the geofence is transmitted to the wireless handset to define a content bubble. The content administrator may create a geofence having a rectangular shape by selecting rectangle geofence shape 606. When the rectangle geofence shape is selected, a rectangular geofence appears on premises map 602. The rectangle geofence shape may be resized and repositioned as desired. Similarly, the content administrator may create a polygon shaped geofence by selecting polygon geofence shape 604 and the content administrator may create a round shaped geofence by selecting round geofence shape 606. When a geofence shape is selected, the content administrator may be prompted to enter a geofence identifier in text input box 612. After the geofence has been sized and positioned as desired, the content administrator selects the create geofence button 614 to save the location of the created geofence to computer memory such as data storage module 108. For example, coordinates indicating the locations of the corners of a rectangle geofence shape or polygon geofence shape or the central point and radius of a circle geofence shape may be stored. In the illustrative example shown in FIG. 6, polygon geofence shape 604 and rectangle shape geofences 606, 608 and 610 have been created. In some embodiments, the geofence interface shows the locations where beacons have been placed for reference. Beacons 616, 618, 620 and 622 are shown in the illustrative example of FIG. 6.

Referring to FIG. 7, an illustrative geofence content association interface 700 is shown. The content administrator may use the geofence content association interface to create an association between a geofence and one or more content items. To create the association, the content administrator selects a geofence identifier from geofence drop down menu 702 and one or more content items from content item list 704. Premises map 706 showing the locations of geofences created with the geofence creation interface may be displayed for reference. After creating the geofence content association, the content administrator selects Create Geofence Content Association button 708 to save the association. The geofence identifier is stored in association with the selected content items in computer memory, for example, in data storage module 108. In FIG. 7, geofences 710, 712, 714 and 716 have been defined, corresponding to the Sports Shop, Restaurant, Clothing-Women's and Clothing-Men's Clothing, respectively. In the illustrative example shown in FIG. 7, the content administrator has created an association between the "Sports Shop" geofence, as indicated at 702, and the content items "10% Off Ski Equipment" and "Sports Shop Sales" content items, as indicated at 704.

Figure 8:
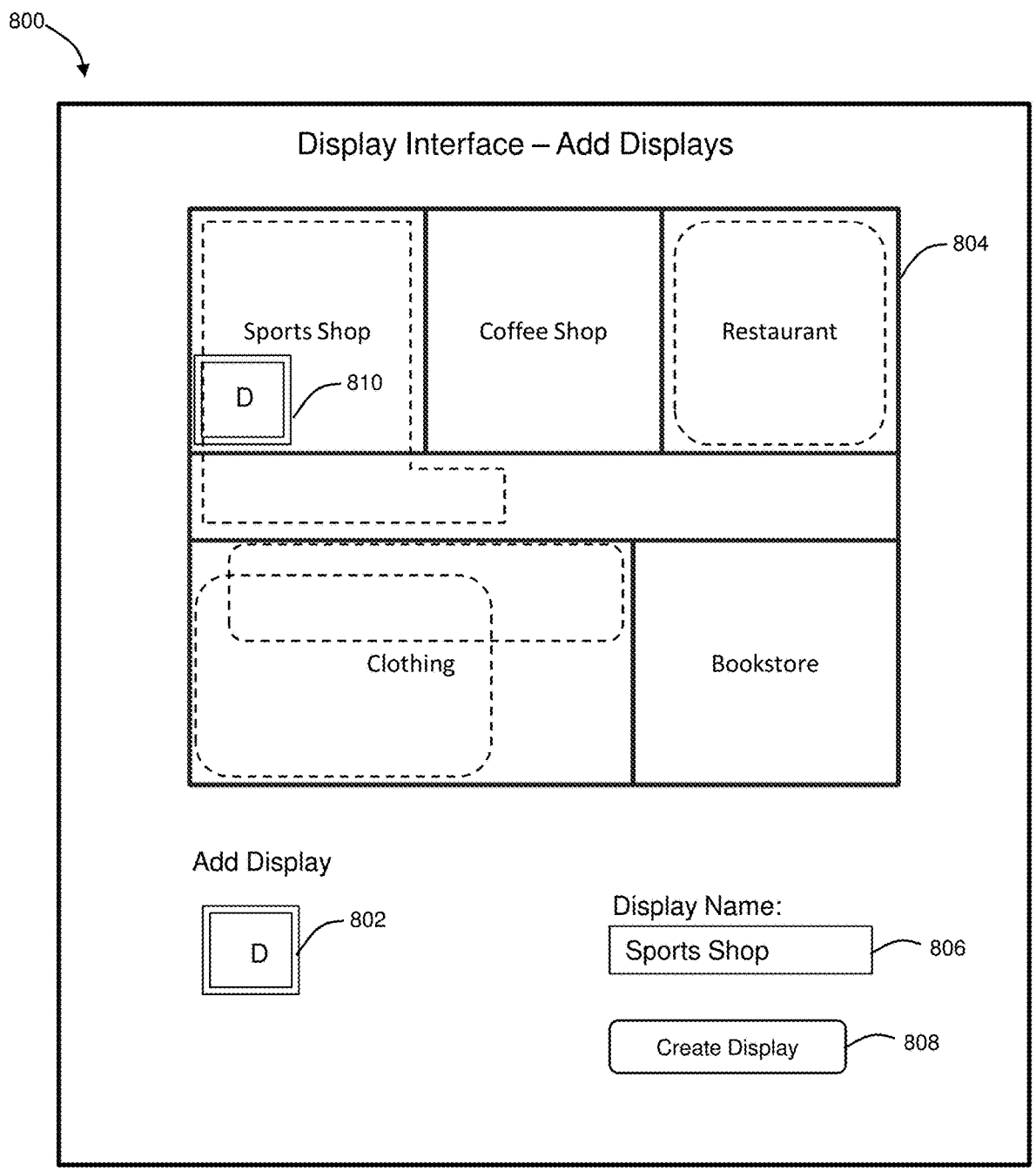
FIG. 8 shows an illustrative display placement interface.

Referring to FIG. 8, an illustrative display placement interface 800 is shown. Content items include display content items having video, images, text, or other display content to be shown on a display in proximity to the wireless handset. In some embodiments, the display is associated with a geofence in which the display is located. When the wireless handset is located within the geofence, display content items may be transmitted to the wireless handset and shown on the display associated with the geofence. When the content administrator selects display icon 802, a display icon appears overlaid on premises map 804. The display icon is moved to the location on the premises map corresponding to the location of the display on the premises. When a display is selected, the content administrator may be prompted to enter a display identifier in text input box 806. After the display has been placed, the content administrator selects the create display button 808 to save the location of the created display to computer memory such as data storage module 108. For example, coordinates indicating the location of the display may be stored. In the illustrative example shown in FIG. 8, display 810 having display identifier "Sports Shop" has been created. In some embodiments, the display interface shows the locations where geofences have been placed for reference.

Figure 9:
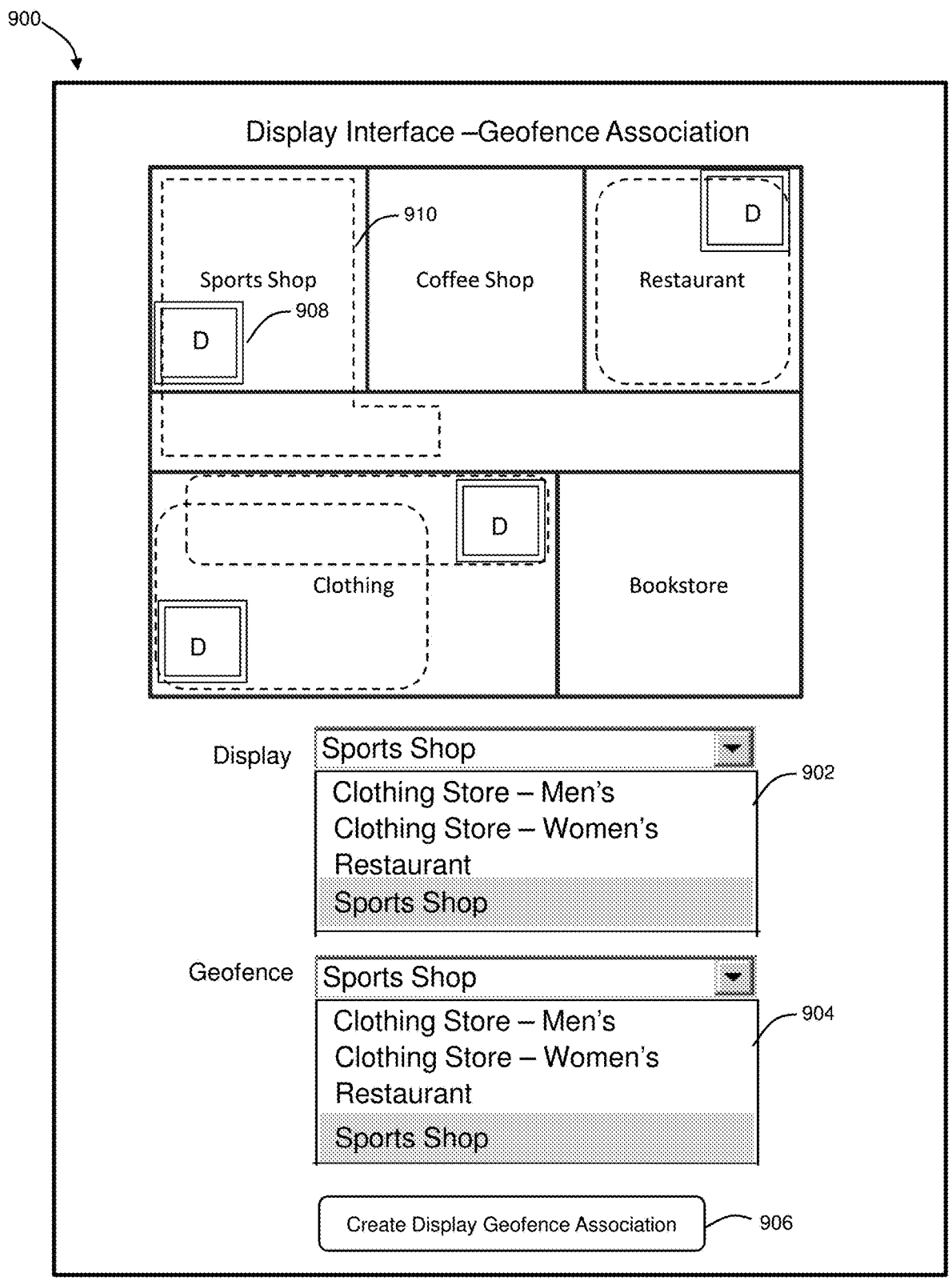
FIG. 9 shows an illustrative display geofence association interface.

Referring to FIG. 9, an illustrative display geofence association interface 900 is shown. To create a display geofence association, a display is selected from display menu 902 and a geofence is selected from drop down menu 904. Create Display Geofence Association button 906 is selected to store the display geofence association in computer memory. In the illustrative example shown in FIG. 9, display 908 having display identifier "Sports Shop" has been associated with geofence 910 having geofence identifier "Sports Shop."

Storing the location of the display allows the content administrator to view the locations of the displays on the premises map. However, it will be realized that creation of displays and display geofence associations may be performed without storing display locations.

In some embodiments, a content item is associated with a display. For example, a content item list similar to the content item list 704 of FIG. 7 is used in lieu of geofence drop down menu 904 of FIG. 9. When a wireless handset is located within a predefined distance of the display, as determined by location determination module 126, content items associated with the display may be transmitted to the wireless handset.

Figure 10:
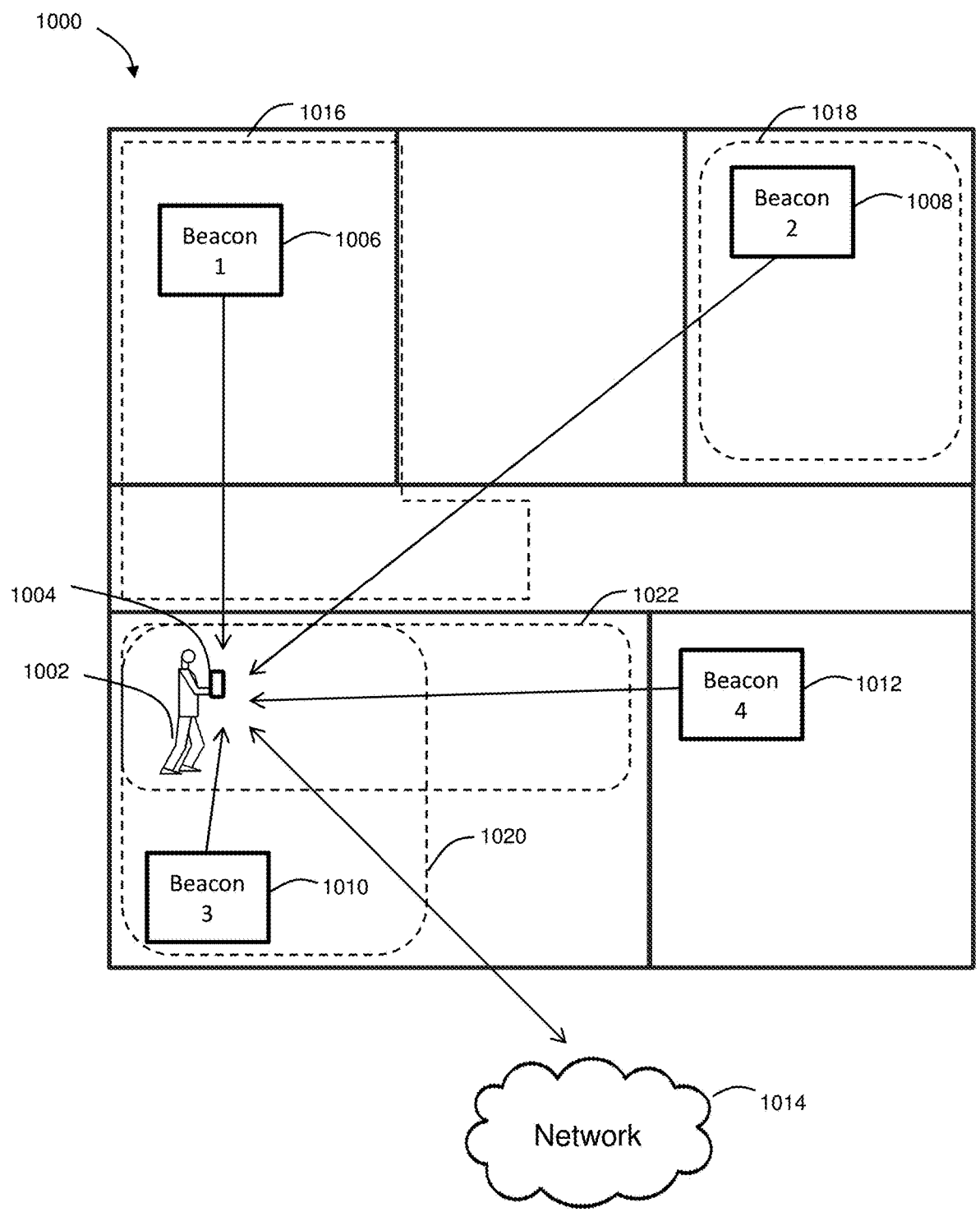
FIG. 10 shows an illustrative system diagram of a beacon network based location detection system for a wireless handset.

Referring now to FIG. 10, a system diagram 1000 of a beacon network based location detection system for a wireless handset is shown. User 1002 carries wireless handset 1004. The wireless handset receives signals from one or more beacons in its vicinity. In the illustrative example, wireless handset 1004 receives signals from beacons 1006, 1008, 1010 and 1012. The wireless handset sends a location message to data processing module 104 via network 1014 indicating the signal strength and signal identifier of each beacon signal detected by the wireless handset. Location determination module 126 uses the location message to determine the location of the wireless handset. Using the information contained in the location message, the location determination module determines whether the wireless handset is located in one or more of geofences 1016, 1018, 1020 and 1022. If the wireless handset is located within a geofence, the wireless handset may receive content associated with the geofence via network 1014.

Referring now to FIGS. 11A-11D, illustrative examples of wireless handset locations as determined from received beacon signals are shown. The tables of FIGS. 11A-11D indicate the determined location of a wireless handset relative to the geofences shown in FIG. 10.

In FIGS. 11A-11B, the location of the wireless handset is determined according to the maximum signal strength received from the beacons detected by the wireless handset. In FIG. 11A, the wireless handset has received signals from Beacons 1, 2, 3 and 4 having signal strengths of −50 dB, −60 dB, −40 dB and −55 dB respectively. Because Beacon 3, shown at 1010 in FIG. 10, has the greatest signal strength as received at the wireless handset and Beacon 3 is located within geofence 1020, location determination module 126 determines the wireless handset to be within geofence 1020 as indicated in FIG. 10. The wireless handset may receive content associated with the bounded areas indicated by geofence 1020.

To determine the location of the wireless handset based on beacon signal strength, the location determination module compares the geographical coordinates of the beacon to the geographical coordinates of the extent of the geofence. In an alternative embodiment, associations between the beacons and geofences may be stored in computer memory.

In FIG. 11B, the wireless handset has received signals from Beacons 1, 2, 3 and 4 having signal strengths of −45 dB, −55 dB, −45 dB and −60 dB respectively. Because the wireless handset has received the same signal strength from both Beacon 1 and Beacon 3, none of the beacons has a highest signal strength. In this case, the wireless handset is determined to be at a location which is an average distance between the two beacons having the greatest signal strength. The wireless handset will be determined to be at a location which is the arithmetical average of the geographical coordinates of Beacon 1 and Beacon 3. The wireless handset is thus determined to be located within geofence 1016, as geofence 1016 includes a position located halfway between Beacons 1 and 3.

In FIGS. 11C-11D, the location of the wireless handset is determined by comparing the strength of beacon signals received at the wireless handset to a threshold signal level, such as −50 dB. In FIG. 11C, the wireless handset has received signals from Beacons 1, 2, 3 and 4 having signal strengths of −45 dB, −60 dB, −55 dB and −65 dB respectively. Assuming a threshold signal level of −50 dB, only the signal from Beacon 1 exceeds the threshold. Because Beacon 1, shown at 1006 in FIG. 10, has the only signal exceeding the threshold level, the wireless handset is determined to be within geofence 1016. If more than one signal level exceeds the threshold level, the handset may be determined to be located within the geofence in which the beacon having the highest detected signal strength is located.

In FIG. 11D, the wireless handset has received signals from Beacons 1, 2, 3 and 4 having signal strengths of −55 dB, −55 dB, −60 dB and −55 dB respectively. Assuming a threshold signal level of −50 dB, none of the signals received from Beacons 1, 2, 3 and 4 exceed the threshold signal level. Thus, the location of the wireless handset relative to the geofences shown in FIG. 10 cannot be determined and the wireless handset is determined to be located within none of the geofences.

Figure 12:
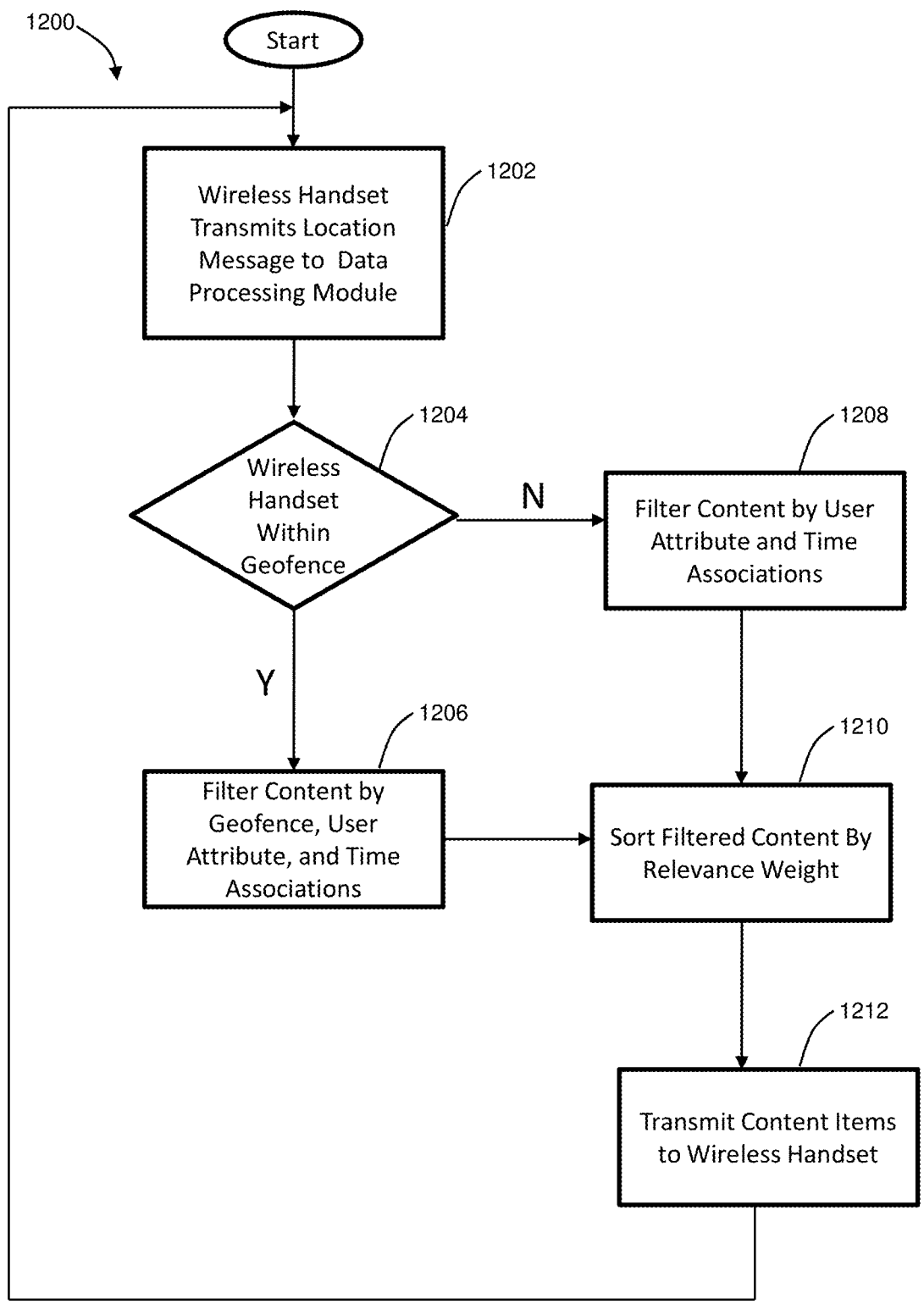
FIG. 12 shows an illustrative flow chart of a method for delivering targeted content to a user.

Referring now to FIG. 12, an illustrative flow chart 1200 of a method for delivering targeted content to a user is shown. The method begins at bock 1202, in which the wireless handset 102 transmits a location message to data processing module 104 via network 106. The method proceeds to decision diamond 1204, at which location determination module 126 determines whether the wireless handset is located within a geofence. If the wireless handset is within a geofence, the method proceeds to block 1206, at which content delivery module 124 filters content items stored in data storage module 108 according to geofence, user attribute and time associations created with the interfaces shown in FIGS. 3 and 7. If the wireless handset is not within a geofence, the content delivery module filters content items according to user attribute and time associations, as indicated at block 1208. The filtered content is then sorted by relevance weight, as indicated at block 1210. In some embodiments, only content items having a relevance weight exceeding a threshold value are transmitted to the wireless handset. In other embodiments, a preset number of highest ranking content items are transmitted to the wireless handset. If the number of content items resulting from the filtering process is fewer than a preset number of content items to be transmitted to the wireless handset, unfiltered content items may be sorted by relevance weight and added to the content items to be transmitted to the wireless handset. The method then proceeds to block 1212, at which content delivery module 124 transmits the selected content items to the wireless handset 102 via network 106.

Figure 13:
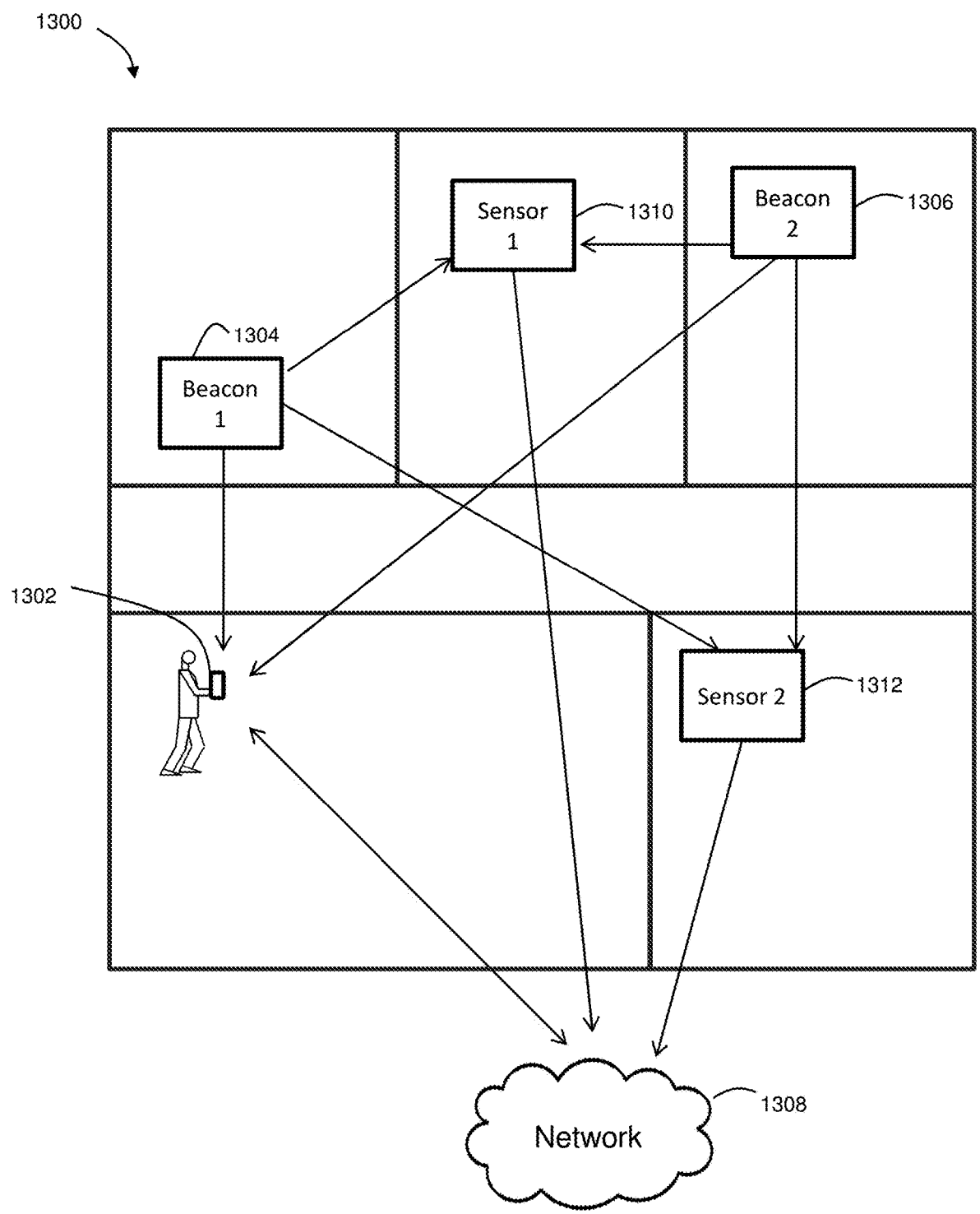
FIG. 13 shows an illustrative system diagram of a beacon and sensor network based location detection system for a wireless handset.

Referring now to FIG. 13, a system diagram 1300 of an illustrative beacon and sensor network based location detection system for a wireless handset is shown. The beacon and sensor network comprises a plurality of beacons and one or more sensors. Wireless handset 1302 receives signals from one or more of beacons 1304 and 1306. The wireless handset sends a location message to data processing module 104 via network 1308 indicating the signal strength and signal identifier of each beacon signal detected by the wireless handset. Sensors 1310 and 1312 also receive signals from one or more of beacons 1304 and 1306. Each sensor transmits a message comprising a signal strength and signal identifier of each beacon signal detected by the sensor to data processing module 104 via network 1308. The presence of the sensors in the beacon and sensor based location detection system allows the location determination module to take into account changes in the beacon network. Sensors may be able to detect when a beacon is no longer functioning or when a beacon has changed location. The location module may change the stored location of the beacon based on a change in signal strength received from the beacon at one or more sensors. A report to the content administrator may be issued by the data processing module when a change in beacon status is detected. In some embodiments, the sensors are used in building a system of virtual reference points to provide increased accuracy in detection of the location of the wireless handset, as described in more detail below with reference to FIGS. 15-18. In this way, sensors may allow the location detection module to take into account changes in the RF environment resulting from temperature, humidity, number of people, number of RF radiators, obstructions and other such variables affecting or causing changes to the RF environment.

Figure 14:
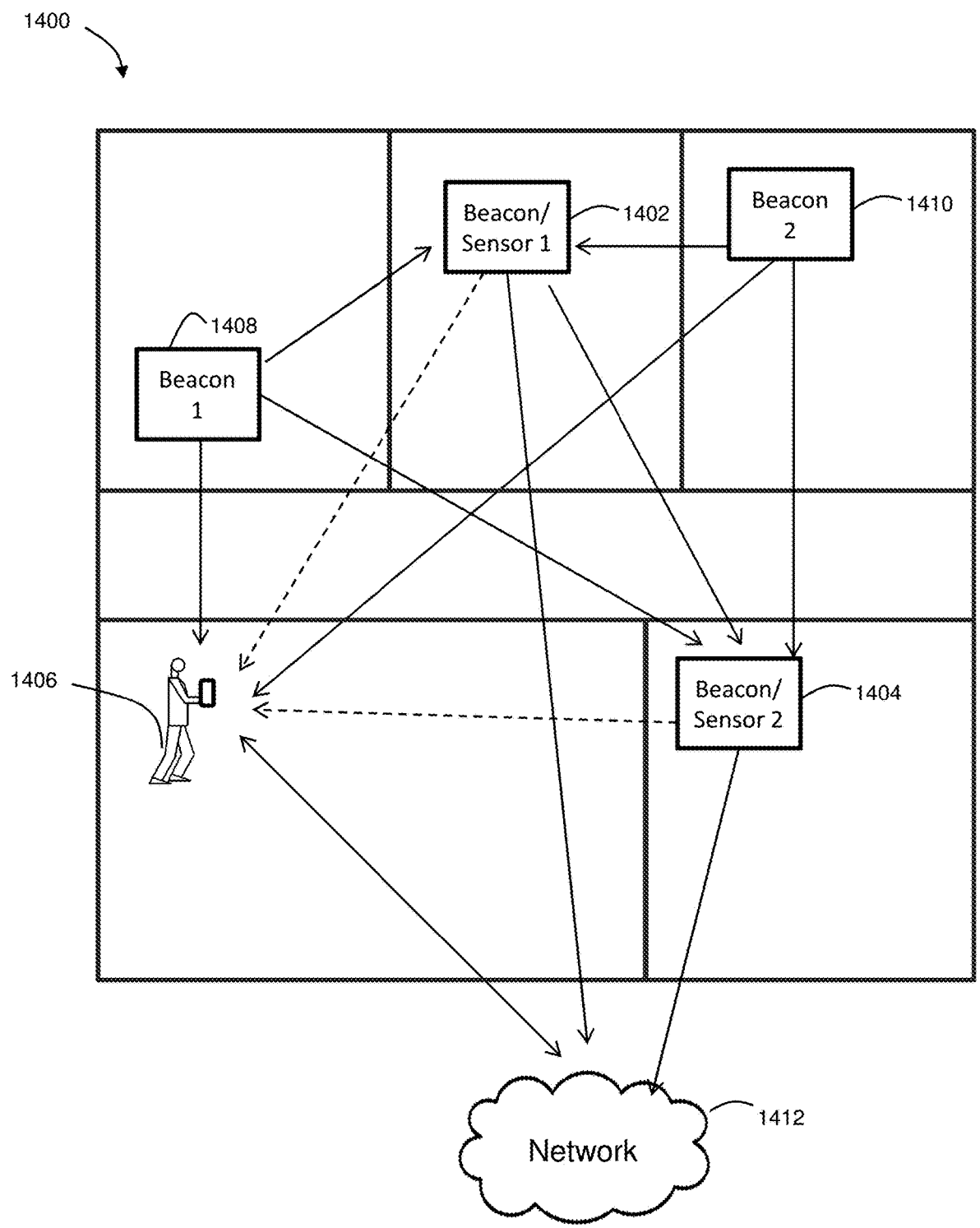
FIG. 14 shows an illustrative system diagram of a beacon and beacon-enabled-sensor network based location detection system for a wireless handset

Referring now to FIG. 14, a system diagram 1400 of a beacon and beacon-enabled-sensor network based location detection system for a wireless handset is shown. The beacon and beacon-enabled-sensor network comprises a plurality of beacons and one or more beacon-enabled-sensors. Illustrative network objects 1402 and 1404 are beacon-enabled-sensors that are able to transmit and receive signals. The beacon-enabled-sensors may operate in sensing mode and beacon mode simultaneously, or may alternate between modes. In some embodiments, the sensors are configured to periodically switch between sensing mode and beacon mode. The sensors may switch between sensing mode and beacon mode in response to a command provided via the network from a user interface. In some embodiments, the switch between sensing mode and beacon mode may be triggered by information received by sensors capable of detecting, for example, temperature, humidity, number of people, number of RF radiators, and other such variables affecting or causing changes to the RF environment. Wireless handset 1406 receives signals from one or more of beacons 1408 and 1410 and beacon-enabled-sensors 1402 and 1404. The wireless handset sends a location message to data processing module 104 via network 1412 indicating the signal strength and signal identifier of the signal from each beacon and beacon-enabled-sensor detected by the wireless handset. Beacon-enabled-sensor 1402 receives a signals from one or more of beacons 1408 or 1410 and beacon-enabled-sensor 1404. Beacon-enabled-sensor 1404 receives a signals from one or more of beacons 1408 or 1410 and beacon-enabled-sensor 1402. Each beacon-enabled-sensor transmits a message comprising a signal strength and signal identifier of each beacon signal detected by the sensor to data processing module 104 via network 1412.

Figure 15:
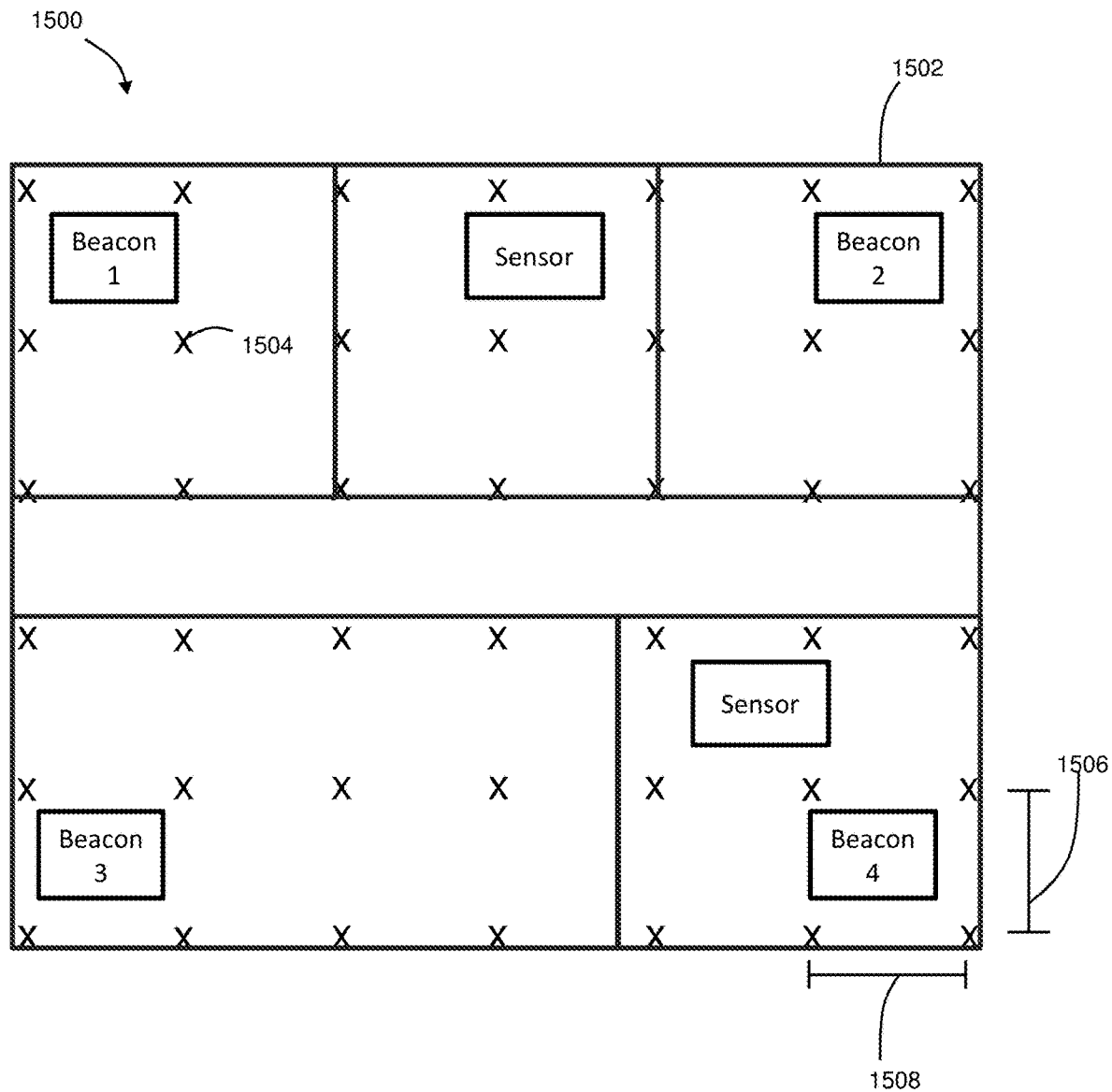
FIG. 15 shows an illustrative virtual reference point grid.

Referring now to FIG. 15, an illustrative VRP grid 1500 overlaid on a premises map is shown. The location of the wireless handset relative to the premises is determined based on the relationship between the beacon signal profile received at the wireless handset and beacon signal profiles calculated at virtual reference points (VRPs). A beacon signal profile, also referred to as a fingerprint, is a set of data comprising the signal strength of each beacon signal received by the wireless handset. VRPs are theoretical signal profiles calculated at intervals throughout the premises. Typically, the VRPs are calculated for points in a grid spanning the premises as shown in FIG. 15. VRPs may also be calculated for the area surrounding or proximate to premises 1502. The VRP locations for premises 1502 are represented by Xs, such as the X shown at 1504. Each VRP comprises a theoretical signal strength for each beacon associated with the premises and data indicating a location, such as geographical coordinates. The distance between VRPs in the grid is the interval distance. In some embodiments, a first interval distance is a y-axis interval distance 1506 and a second interval distance is a x-axis interval distance 1508. In other embodiments, the x-axis interval distance is equivalent to the y-axis interval distance and a single interval distance is used.

If a beacon stops emitting a signal, is moved, an obstruction is placed in the vicinity of the beacon, or other changes to the RF environment occur such that the signal profile for the beacon changes on the premises, the sensors are capable of detecting the change. The VRPs may be updated, periodically or in response to a change in a beacon sensor profile received at one or more sensors.

In some embodiments, the VRPs may be shown as a layer in an interface such as the network object placement interface 500. A VRP layer in the network object placement interface would provide feedback to the content administrator on the accuracy of the location detection system. The user could use the feedback to, for example, reposition sensors and beacons to optimize the location detection system. The VRP layer may also allow the user to indicate VRP locations.

Referring to FIG. 16, an illustrative VRP 1600 is shown. The VRP comprises location coordinates, such as a longitude value and a latitude value indicating the location of the VRP. The VRP further comprises a signal identifier and an RSSI for each beacon associated with the premises. For example, in the illustrative VRP shown, the signal identifier is "Beacon 1" and the RSSI corresponding to Beacon 1 is −33 dB.

Figure 17:
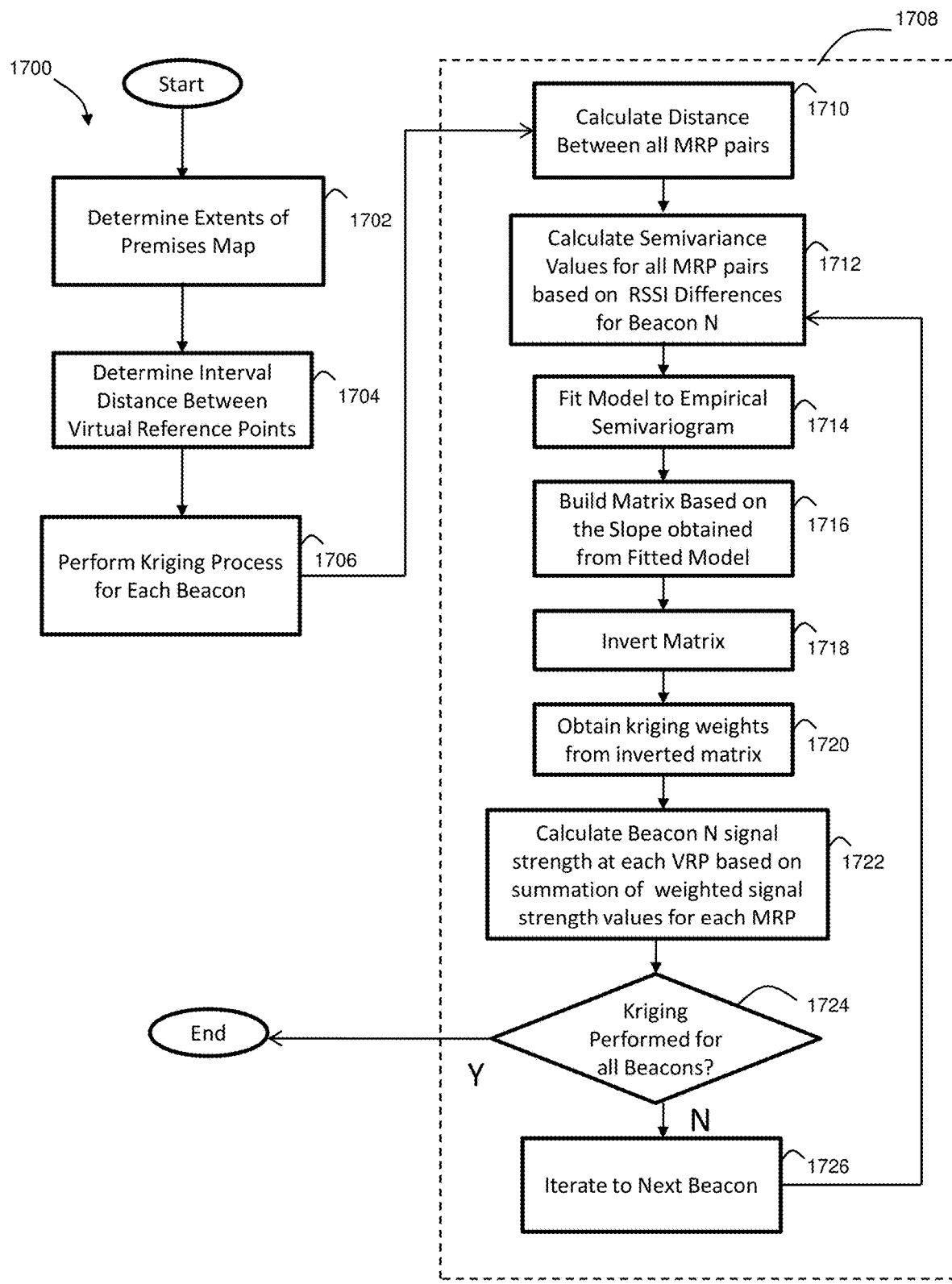
FIG. 17 shows an illustrative flow chart of a method for generating virtual reference points.

Referring to FIG. 17, an illustrative flow chart of a method for generating VRPs is shown. VRPs are typically calculated by location determination module 126. VRPs may be calculated periodically, for example, once a second, once a minute, hourly, daily, weekly or monthly. In some embodiments, the VRPs are calculated in response to user activity, such as a user request to calculate VRPs placed via content administration interface 110. The method starts at block 1702, at which the extents of the premises map are obtained from data storage module 108. The extents of the premises map may be determined from the placement of the map image via the location interface as illustrated in FIG. 4. The method then proceeds to block 1704, at which the interval distance between VRPs is determined. The interval distance is the distance between adjacent VRPs, such as the horizontal or vertical distance between adjacent Xs as shown in FIG. 15. In some embodiments, a first interval distance and a second interval distance are used, wherein a first interval distance is an x-axis interval distance and a second interval distance is a y-axis interval distance. The locations of all VRPs for the premises are generated in a grid similar to the VRPs shown in FIG. 15 based on the specified interval distance(s). The user is able to set the interval distance(s) via content administration interface 110. In some embodiments, VRPs may be individually placed by the user, for example, using the GIS interface.

The method continues to block 1706, at which a kriging process is performed for each beacon associated with the premesis. Kriging is an interpolation method based on the spatial correlation of data. The kriging process as shown within the box indicated at 1708 is performed iteratively for each beacon until it has been performed for all of the beacons associated with the premises. At block 1710, the Euclidian distances between every pair of measured reference points associated with the premises are determined. In other words, the distance between every measured reference point and every other measured reference point is calculated. A measured reference point (MRP) may be a sensor fingerprint or a fingerprint obtained by other measurement means. The calculated distances are stored in system database 108. The kriging process continues at block 1712, where semivariance values for all MRP pairs are calculated based on the difference in RSSI values the MRPs received from Beacon N. For example, in the first iteration of the kriging process, N=1, so the RSSI value for beacon 1 at the first MRP is compared to the RSSI value for beacon 1 at a second MRP, and the calculation is repeated for each pair of MRPs associated with the premises. At block 1714, an empirical semivariogram based on the values calculated in blocks 1710 and 1712 is fit to a model such as a linear least squares regression (LLSR). At block 1716, a matrix is created based on the slope obtained from the fitted model and the distances calculated in block 1710. The matrix is then inverted as indicated at block 1718. The weights to be used for predicting signal strength values at the VRPs are obtained from the inverted matrix, as indicated at block 1720. The signal strength for beacon N is then calculated at each VRP based on the summation of weighted signal strength values for each MRP, as indicated at block 1722. The method proceeds to decision diamond 1724, at which it is determined whether steps 1712-1722 have been performed for all beacons. If not, the method iterates to the next beacon as indicated at block 1726. When steps 1712-1722 have been performed for all beacons, the method ends.

Figure 18:
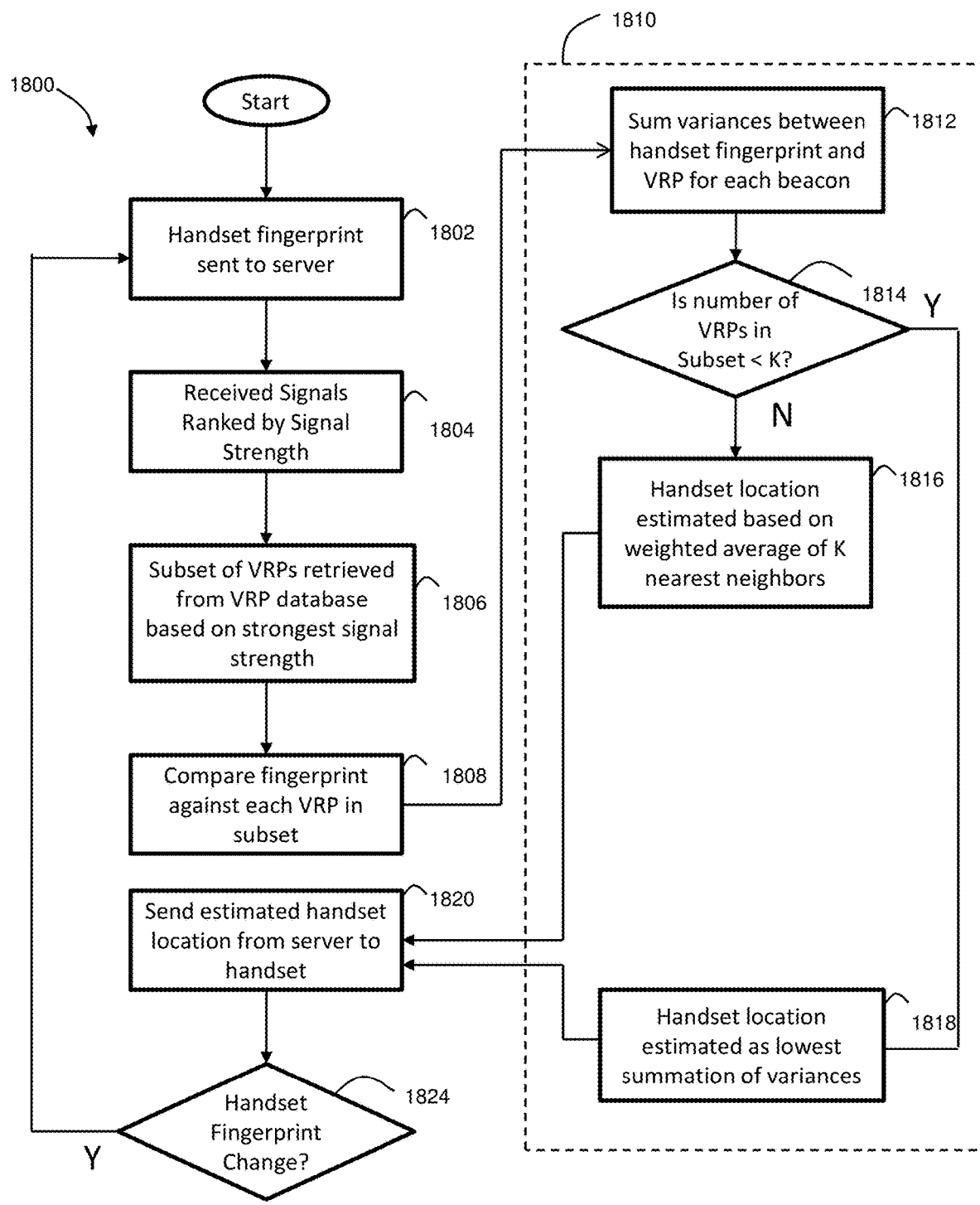
FIG. 18 shows an illustrative flow chart of a method for determining the location of a wireless handset using virtual reference points.

Referring to FIG. 18, an illustrative method for determining the location of a wireless handset using VRPs is shown. The location of the wireless handset is determined by location determination module 126. The method begins at block 1802, at which a handset fingerprint comprising the signal identification and signal strength of each beacon in range of the handset is sent from the wireless handset to data processing module 104. The method continues to block 1804, at which the signals received by the handset are ranked by signal strength. The method continues to block 1806, at which a subset of the VRPs are selected from the set of VRPs associated with the premises. The subset of VRPs are those VRPs with a greatest received signal strength from a beacon matching the beacon from which the handset received the greatest signal strength. The method continues to block 1808, at which the signals of the handset fingerprint are compared to the signals of the subset of VRPs. A K-nearest neighbor algorithm as illustrated at 1810 may be used to determine the outcome of the comparison.

At bock 1812, for each VRP in the subset of VRPs, the variance between the signal level received at the handset and the estimated signal level at the VRP is determined for each beacon. At decision diamond 1814, it is determined whether the number of VRPs in the subset is less than an integer value K. If the number of VRPs in the subset is greater than or equal to K, the handset location may be estimated to be at a location between the K nearest VRPs. For example, the location of the handset may be determined to be at a location that is a weighted average of the nearest neighbors, such that the neighbors having a lower summation of variances contribute more to the average, as indicated at block 1816. If the number of VRPs in the subset is less than K, the handset location is estimated to be the location of the VRP having the lowest summation of variances between beacon levels as received at the wireless handset and beacon levels estimated at the VRP, as indicated at block 1818. Once the wireless handset location has been estimated, the method proceeds to block 1820, at which the estimated location is used to filter content items according to location. For example, the location determination module 126 may determine whether the wireless handset is located within a geofence. If the wireless handset is located in a geofence, content items are filtered to return content items associated with the geofence. If the wireless handset fingerprint changes, indicating a change in handset location, the method begins again at block 1802.

Referring now to FIG. 19, an illustrative relevance interface 1900 is shown. A relevance weight value may be stored in association with a user attribute and a content item, for example, in a database table of data storage module 108. Additionally, a relevance weight value may be stored in association with a location and a content item. Relevance weight values may be applied to other parameters in association with a content item, for example, a time value or time range. The relevance weight value may be adjusted according to user response to the content item. Relevance interface 1900 allows a content administrator to change the amount by which a relevance value is changed as a result of particular user responses to content items.

In some embodiments, a content administrator may modify a relevance weight value stored in association with a content item and an attribute group for all attribute groups associated with a user. Attribute groups for a user may include information provided by the user, such as a location of the user, a user interest, an age of the user or an age group to which the user belongs. In some embodiments, the attribute groups include information collected about a user, for example, information from the user's transaction history with a merchant. An attribute group is stored in computer memory in association with a user identification, for example, in a database table. A user may provide a response to a content item, for example, by selecting a thumbs up or thumbs down icon displayed in proximity to the content item on the wireless handset, giving the content item a rating on a scale, providing a ranking or score for the content item, or selecting or not selecting the content item. When the user provides a user response to a content item, relevance and analytics module 128 searches data storage module 108, for example, by performing a database search, to determine each attribute group associated with the user. The relevance and analytics module may then locate the database record in which the content item that received the user response is associated with an attribute group of the user. The relevance and analytics module alters the relevance weight value stored in association with the content item and the attribute group. The process is repeated for each attribute group associated with the user. Although attribute groups are used in the illustrative example, it will be recognized that the relevance weight value may be adjusted for a location or other parameter stored in association with the content item in response to user feedback.

At text input box 1902, the content administrator may enter a number by which the relevance weight value is to be increased when positive feedback is received for a content item. For example, the number entered in 1902 may be applied when a "thumbs up" input is received by handset content interface 112. In the illustrative example shown in FIG. 19, the content administrator has entered the number 5 at text input box 1902, which will result in the relevance weight value associated with the content item and each attribute group associated with a user being increased by 5 when the user provides positive feedback for the content item. Similarly, at text input box 1904, a content administrator may enter a number by which the relevance weight value is to be decreased when negative feedback is received for a content item. For example, the number entered in 1904 may be applied when a "thumbs down" input is received by handset content interface 112. In the illustrative example shown in FIG. 19, the content administrator has entered the number 0 at text input box 1902, indicating that no changes are to be made to the relevance weight value associated with the content item and each attribute group associated with a user when the user provides negative feedback for the content item.

It will be recognized that the numbers shown in the text boxes of FIG. 19 are merely illustrative. Number input in the text box may include numbers consuming up to the maximum storage size allowed for a numeric data type of the database used. In some embodiments, negative numbers may be entered in the text input boxes. Floating point numbers may also be used. The numerical input may be limited to a preset numerical range enforced by the application. The text input boxes may be populated with default values before being altered by a content administrator. The numbers indicated in the text input boxes are stored in computer memory.

In some embodiments, the content administrator may indicate a number by which a relevance weight value is to be adjusted for the content item. For example, in every database record in which a relevance weight value is associated with the content item, the relevance weight value is adjusted. In another embodiment, the relevance weight value is adjusted for all attribute groups stored in association with the content item. In an alternative embodiment, the relevance weight value is adjusted for all locations stored in association with the content item. In a further embodiment, the relevance weight value is adjusted for another parameter stored in association with the content item. At text input box 1906, the content administrator has indicated that in all records in which a content item is associated with a relevance weight value, the relevance weight value is to be increased by 2 points when positive feedback is received. At text input box 1908, the content administrator has indicated that in all records in which a content item is associated with a relevance weight value, the relevance weight value is to be decreased by 3 points when negative feedback is received.

The relevance interface may further allow the content administrator to adjust the relevance weight value associated with content items based on whether or not a content item was selected by a user. Selection of a content item may occur when a user clicks a content item button or otherwise indicates interest in a content item displayed on the handset content interface. For example, if a content item is transmitted by content delivery module 124 in excess of a predetermined number of times without being selected, the relevance weight value may be decremented. At text input box 1910, the content administrator may enter a number of serves required before a decrement occurs. At text input boxes 1912-1914, the content administrator may enter a number of relevance weight points by which the relevance weight value is decremented when then number of serves occurs without the content item being selected. In some embodiments, the decrement occurs regardless of whether the content item has been selected.

Text input box 1912 indicates a decrement value for all users. For every database record associating a relevance weight value with the content item, the relevance weight value is decremented by the number indicated in box 1912 when the content item is served the number of times indicated in box 1910 without being selected. Text input box 1914 indicates a decrement value for attribute groups associated with the user who provided a response to a content item. When the number of serves indicated in box 1910 is reached, all attribute groups associated with the user are identified, then the relevance weight value stored in association with the content item and each of the attribute groups is adjusted by the value indicated in box 1914. Although not indicated in FIG. 19, the relevance weight value stored in association with other parameters, such as location, may be adjusted in response to the number of times a content item is served.

In some embodiments, when counting up to the number specified in box 1910 to determine when "Serves to Trigger Decrement" has been reached, serves are counted at an interval indicated in input in box 1916. In the illustrative example, the content administrator has indicated that a serve of a content item is only to be counted once in each five-minute interval. If a serve has been counted during a five-minute interval, a serve is not counted again until the next five-minute interval begins. In this manner, processing associated with counting serves of content items can be reduced. In some embodiments, the unique serve interval definition 1916 indicates a period of seconds or other time interval.

At 1918, the content administrator may specify the number of relevance weight points by which the relevance weight value is to be increased when a user selects a content item. When a user "clicks through" or otherwise selects or indicates interest in a content item using the handset content interface, for every database record in which a relevance weight value is associated with a content item, the relevance weight value is increased by the amount specified in text input box 1918. At 1920, the content administrator may specify the number of relevance weight points by which the relevance weight value is to be increased for all attribute groups associated with the user that selected the content item. When a user selects a content item using the handset content interface, for every database record in which an attribute group of the user is associated with a content item, the relevance weight value of the association is increased by the amount specified in text input box 1920.

The content administrator may use text input box 1922 to indicate a value by which a relevance weight value for an association between a location and a content item is to be adjusted when a content item is transmitted to a wireless handset at the location. For example, a content item is transmitted to a wireless handset located within a geofence because the content item is associated with the geofence, as described with reference to FIG. 7. When the content item is transmitted, the relevance weight value for the association between the content item and the geofence is multiplied by the value indicated in text input box 1922. In another embodiment, when the content item is selected, the relevance weight value for the association between the content item and the geofence is multiplied by the value indicated in 1922. In a further alternative embodiment, an incremental relevance weight point adjustment is used in lieu of a multiplicative adjustment for content item-location associations.

Figure 20:
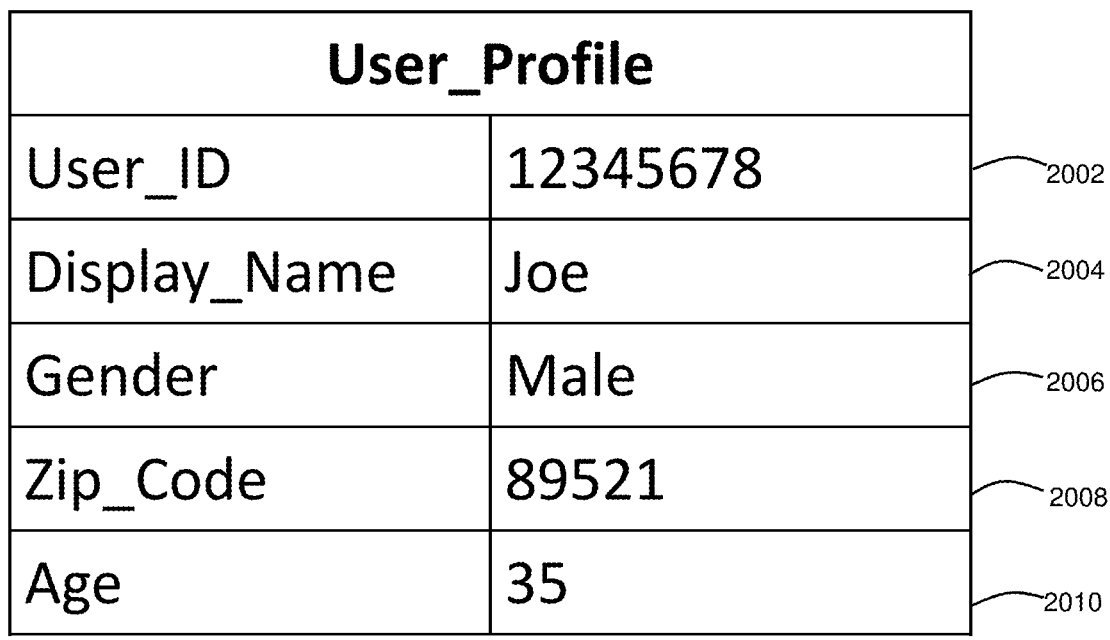
FIG. 20 shows an illustrative database table entry for a user profile.

Referring now to FIG. 20, an illustrative database table entry 2000 for a user profile is shown. The terms "database table entry," "entry," "database record" and "record" are used interchangeably herein. The table may be populated by the user with information provided via a user profile interface 114 on the wireless handset 102. In some embodiments, the user enters user profile information using an interface on a home computer or other device having access to network 106. User profile information may alternatively or additionally be generated based on information collected about the user by a third party, such as a merchant's transaction history with the user. User profile information is transmitted via network 106 to a database, such as a database of data storage module 108. The user profile information may be stored in the database in a database table, such as the User_Profile database table 2000. The User_Profile table comprises the field user_ID 2002. User_Profile table 2000 may comprise additional fields such as Display_Name 2004, Gender 2006, Zip_Code 2008 and Age 2010. In some embodiments, a birthday or an age range is stored for the user rather than an age of the user.

Figure 21:
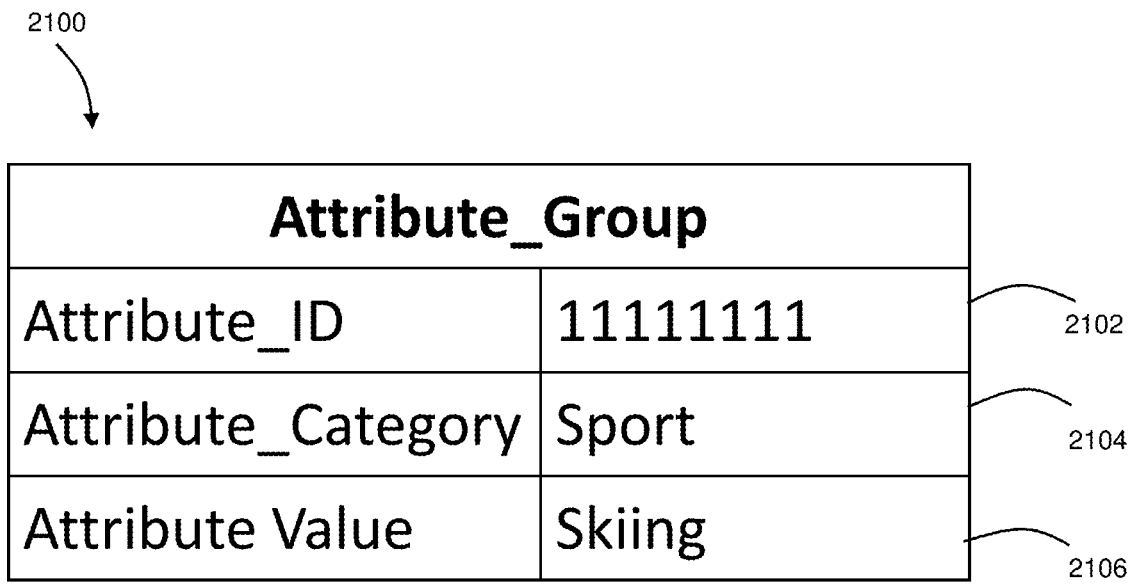
FIG. 21 shows an illustrative database table entry for an attribute group.

Referring to FIG. 21, an illustrative database table entry 2100 for an attribute group is shown. The Attribute_Group table stores a unique identifier for each attribute group available to be associated with a user. The Attribute_Group table is stored in a database, such as a database of data storage module 108. The Attribute_Group table comprises fields Attribute_ID 2102 and Attribute_Value 2106. The illustrative Attribute_Group table additionally comprises field Attribute_Category 2104. According to the illustrative entry in the Attribute_Group table, the attribute with the Attribute_ID number 11111111 is an attribute with attribute category "sport" and attribute value "skiing." If the user indicates skiing as an interest, the attribute ID for skiing may be associated with the user ID in a User_Attribute_Group database table as indicated in FIG. 22.

Figure 22:
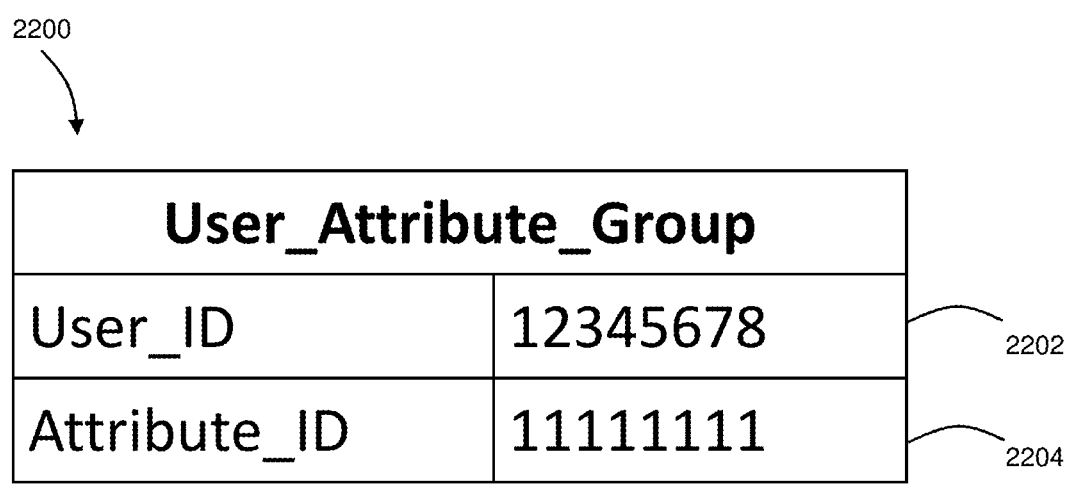
FIG. 22 shows an illustrative database table entry associating a user identification with an attribute group.

Referring to FIG. 22, an illustrative database table entry 2200 associating a user identification with an attribute group is shown. The User_Attribute_Group table comprises fields User_ID 2202 and Attribute_ID 2204. The illustrative entry in the User_Attribute_Group table associates user ID "12345678" with attribute id "11111111," indicating that user "Joe" having user ID 12345678 (as indicated in FIG. 20) is associated with the attribute skiing, identified by attribute ID 11111111. The table entry may have been created with Joe indicated an interest in skiing using a user profile interface or other user interface. Alternatively, a merchant or other content administrator may have determined that Joe is interested in skiing based on, for example, Joe's purchases of skiing equipment from the merchant, and created the User_Attribute_Group table entry shown accordingly.

Referring to FIG. 23, an illustrative database table entry 2300 for associating a content item with an attribute group and storing a relevance weight value for the association is shown. The Group_Content_Rating table comprises fields Content_ID 2302, Attribute_ID 2304 and Relevance_Weight 2306. Content_ID has value "00000001," indicating a unique identification for a content item. In an illustrative example, content item 00000001 is text advertising a sale on ski equipment. In the illustrative entry, content 00000001 in association with attribute 11111111 (skiing) has a relevance weight value of 105.

By way of illustration, user Joe (having user ID 12345678) has indicated an interest in skiing, resulting in the User_Attribute_Group entry shown in FIG. 22. In the illustrative example, content item 00000001 is the content item "10% Off Ski Equipment" indicated at 202 in FIG. 2. When Joe provides positive feedback for content item 00000001, all attribute groups associated with Joe and the content item may receive an adjustment to the relevance weight value according to preset adjustment values or relevance weight adjustment values set in Relevance Interface 1900. If, for example, an initial relevance weight value of 100 is used for the association between Content_ID 00000001 (e.g., the skiing advertisement content item) and Attribute_ID 11111111 (e.g., skiing), the positive feedback results in a point increase, for example, a five point increase, resulting in an adjusted relevance weight value of 105.

Referring to FIG. 24, an illustrative database table entry 2400 for associating a content item with a location identifier and storing a relevance weight value for the association is shown. The Location_Content_Rating table comprises fields Content_ID 2402, Location_ID 2404 and Relevance_Weight 2406. Location_ID has value "22222222," indicating a unique identification for a location.

In some embodiments, the Location_ID is a unique identification associated with a geofence. For example, a database in data processing module 104 may store a set of coordinates corresponding to the area bounded by a geofence is association with a unique Location_ID.

In alternative embodiments, Location_ID may be associated with a zip code, city, GPS coordinates, or a distance range surrounding any of the preceding (e.g., a 300 foot radius surrounding a set of GPS coordinates). Location_ID may alternatively indicate a location determined by scanning a code, such as a QR code, with the wireless handset. In a further alternative embodiment, Location_ID corresponds to a location determined using a photograph of the environment taken with the wireless handset and an image recognition application.

By way of illustration, content item 00000001 is the content item "10% Off Ski Equipment." In one example, the wireless handset displaying the content item is located in geofence 710 encompassing the Sports Shop as shown in FIG. 7. Content item "10% Off Ski Equipment" has been associated with the Sports Shop geofence, as indicated in FIG. 7. When the content item "10% Off Ski Equipment" is transmitted to a wireless handset located within the Sports Shop geofence, the relevance weight value associated with the location and the content item is multiplied by the point value indicated at location relevance multiplier text input box 1922 of FIG. 19. If, for example, an initial relevance weight value of 100 is used for the association between Content_ID 00000001 ("10% Off Ski Equipment") and Location_ID 22222222 (the Sports Shop geofence), the relevance weight value is multiplied by the location relevance multiplier 5, resulting in an adjusted relevance weight value of 500.

Figures 25A, 25B:
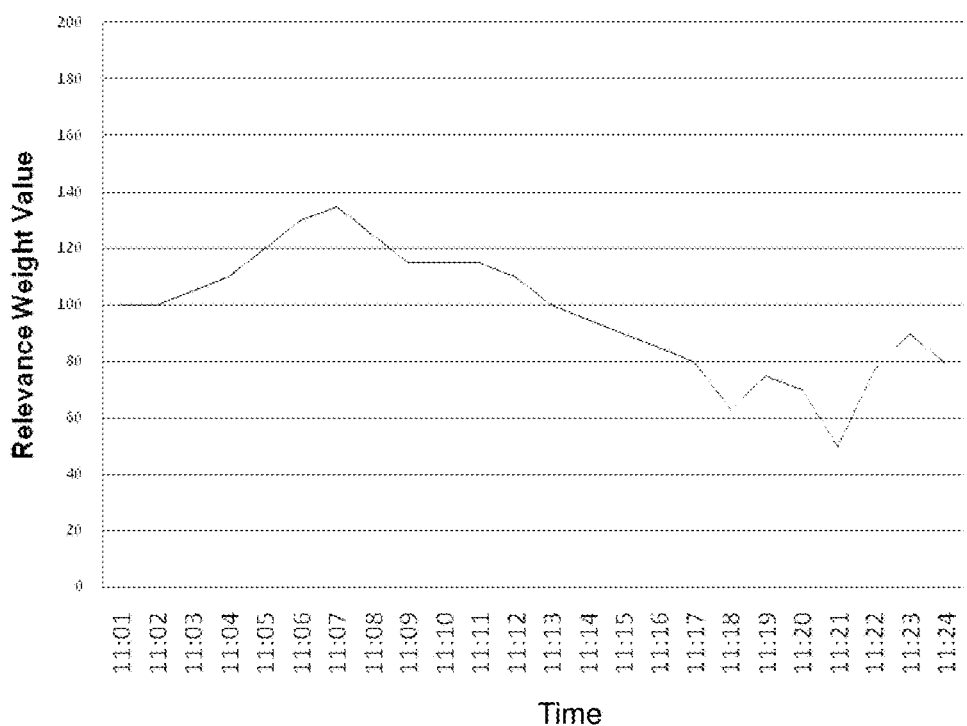
FIG. 25A shows an illustrative database table entry associating a time item with an attribute group and storing a relevance weight value for the association.
FIG. 25B shows an illustrative graph showing a change in relevance weight value for a content item over time.

Referring now to FIG. 25A, an illustrative database table entry 2500 associating a time item with an attribute group and storing a relevance weight value for the association. The Content_Rating_Time table comprises fields Content_ID 2502, Time 2504 and Relevance_Weight 2506. Each time the relevance weight for a content item changes, the relevance weight value and time may be logged such that a record of the change in relevance weight for the content item over time as shown in FIG. 25B may be created. The Content_Rating_Time table may further comprise an Attribute_ID or Location_ID field to allow the change in relevance weight value over time to be analyzed for a particular attribute group or location.

Referring to FIG. 25B, a graph showing a change in relevance weight value for a content item over time is shown. The graph shown in FIG. 25B may be created from the entries in the Content_Rating_Time table 2500. The change in relevance weight value over time may be useful to content administrators in assessing the success of content items.

The flow charts of FIGS. 26-29 indicate illustrative methods performed by relevance and analytics module 128 to adjust the relevance weight values associated with content items.

Figure 26:
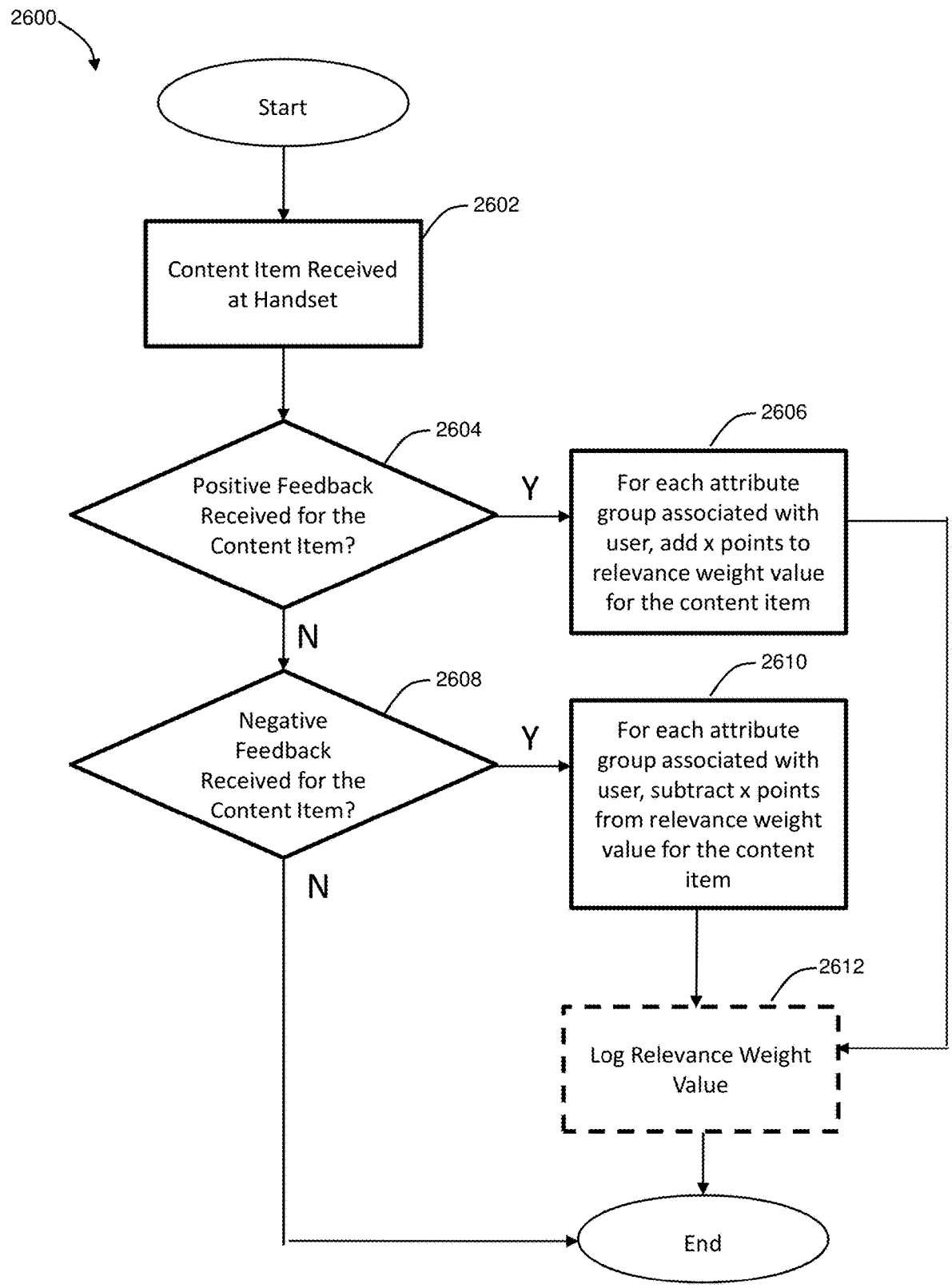
FIG. 26 shows an illustrative flow chart of a method for adjusting relevance weighting according to a first embodiment is shown.

Referring now to FIG. 26, an illustrative flow chart of a method for adjusting relevance weighting according to a first embodiment is shown. The method begins at block 2602, at which a content item is received at the wireless handset 102. The content item may be one of a plurality of content items displayed on the handset. At decision diamond 2604, relevance and analytics module 128 determines whether positive feedback has been received from the wireless handset. If positive feedback has been received for a content item, the method proceeds to block 2606. At block 2606, for each attribute group associated with the user who provided the positive feedback, a point value x, such as the point value indicated at text input box 1902 of FIG. 19, is added to the value of the Relevance_Weight field of the Group_Content_Rating entry having a Content_ID value matching the content item identifier and an Attribute_ID value matching the attribute identifier.

For example, if user 12345678 (display name "Joe") provides positive feedback for the content item having content identifier 00000001, all attribute groups associated with user 12345678 are located. Accordingly, the User_Attribute_Group table is queried to return all entries for user 12345678. Since the attribute having attribute identifier 11111111 is associated with user 12345678 in the User_Attribute_Group table, the relevance weight associated with Attribute_ID 11111111 will be modified for the selected content item. In the Group_Content_Rating table, the value of Relevance_Weight is adjusted for the entry having Content_ID 00000001 and Attribute_ID 11111111. Because positive feedback was provided, a point value is added to the current value of Relevance_Weight. For example, using the relevance point value entered in text input box 1902, when positive feedback is provided, 5 points are be added to the current value of Relevance_Weight.

If no entry exists in Group_Content_Rating table having an Attribute_ID matching an attribute of the user providing feedback and a Content_ID of the content item for which feedback was received, a new entry is created in Group_Content Rating when the feedback is received. The new entry has a Content_ID matching the identifier of the content item for which feedback was received and an Attribute_ID matching the identifier of an attribute of the user providing feedback. When a new entry is created, the new entry may have a Relevance_Weight value that is a default value. Alternatively, the new entry may have a Relevance_Weight value that is the sum of a default value and the point value modification resulting from the user feedback.

If additional attribute entries were located for user 12345678 in the User_Attribute_Group table, the Relevance_Weight value is adjusted for the additional attributes. The process of creating new records (where necessary) and modifying the Relevance_Weight value is continued until the relevance weight has been adjusted for each attribute group associated with the user.

In some embodiments, the method proceeds to optional block 2612, at which the adjusted relevance weight value is logged. For example, an entry in a database table such as Content_Rating_Time may be made.

If no positive feedback is received for a content item, the method proceeds to decision diamond 2608, at which it is determined whether negative feedback has been received for the content item. If negative feedback has been received, the method proceeds to block 2610. At block 2610, for each attribute group associated with the user who provided the negative feedback, a point value is subtracted from the value of the Relevance_Weight field of the Group_Content_Rating entry having a Content_ID value matching the content item identifier and an Attribute_ID value matching the attribute identifier. If no entry in the Group_Content_Rating table exists for the Content_ID and Attribute_ID, a new entry is created as described above. The method then proceeds to optional step 2612 at which the relevance weight value is logged.

In some embodiments, the addition operation described at 2606 is applied to adjust the relevance weight value of a content item in association with a location in which a wireless handset is located. In lieu of adding x points to the relevance weight value for the content item for each attribute group, x points are added to the relevance weight value for the association of content item with the location of the wireless handset. Similarly, the subtraction operation described at 2610 may be applied to adjust the relevance weight value of a content item in association with a location in which a wireless handset is located. The addition and subtraction operations described in 2606 and 2610 may be similarly applied to adjust the relevance weight value of a time or other parameter stored in association with a content item.

Figure 27:
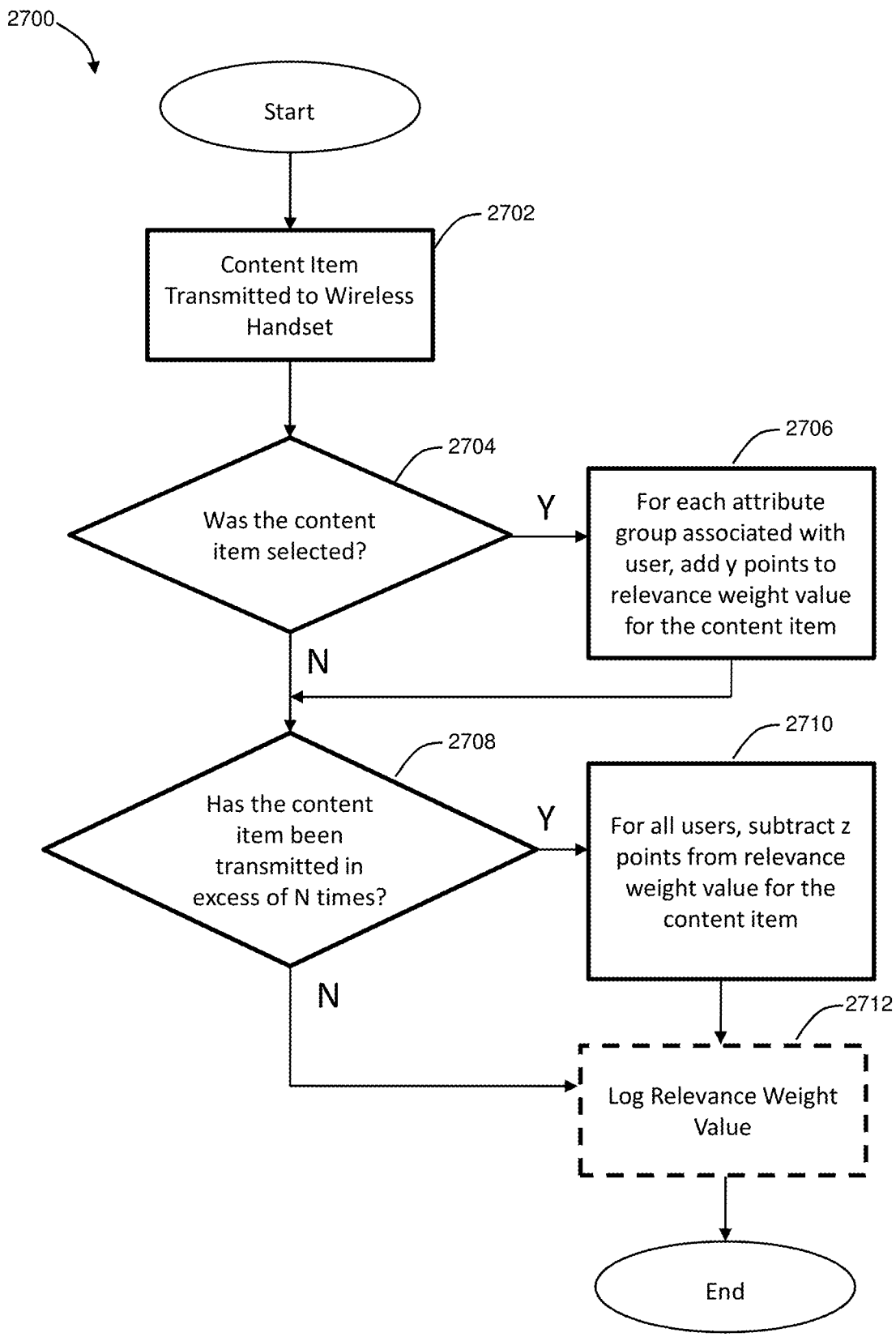
FIG. 27 shows an illustrative flow chart of a method for adjusting relevance weighting according to a second embodiment.

Referring now to FIG. 27, an illustrative flow chart of a method for adjusting relevance weighting according to a second embodiment is shown. The method begins at block 2702, at which a content item is transmitted to the wireless handset 102. The content item may be one of a plurality of content items displayed on the handset. At decision diamond 2704, relevance and analytics module 128 determines whether the content item was selected. A user may select a content item by, for example, clicking a content item button. If the content item is selected, the method proceeds to block

2706. At block 2706, for each attribute group associated with the user who provided the positive feedback, a point value y, such as the point value indicated at text input box 1920 of FIG. 19, is added to the value of the Relevance_Weight field of the Group_Content_Rating entry having a Content_ID value matching the content item identifier and an Attribute_ID value matching the attribute identifier. Point value y may be any point value, for example, 2 points. If no entry in the Group_Content_Rating table exists for the Content_ID and Attribute_ID, a new entry is created as described above The method proceeds to block 2708, at which the relevance weight adjustment module determines whether a content item has been transmitted by content delivery module 124 in excess of N times. N may be, for example, a number of times a content item is delivered from content delivery module 124 to a particular wireless handset or to all wireless handsets capable of receiving the content. N may be a preset value or a value entered into a relevance interface, such as the unique content serves value indicated at text input box 1910 of FIG. 19. If the content item has been transmitted in excess of N times, z points are subtracted from the value of the Relevance_Weight field of the Group_Content_Rating entry having a Content_ID value matching the content item for all users. Point value z may be any point value, such as the decrement value indicated at text input box 1912 of FIG. 19.

To adjust the Relevance_Weight field for all users, an attribute group having a predetermined Attribute_ID, for example, Attribute_ID 00000000, may be associated with every contact ID. For example, each time a new User_ID is created, User_Attribute_Group may receive an entry associating the new User_ID with Attribute_ID 00000000. The Relevance_Weight value may be adjusted for the Group_Content_Rating entry having a Content_ID value matching the delivered content item and Attribute_ID 00000000. In this manner, the relevance weight is adjusted for all users when a content item has been transmitted in excess of N times.

The method proceeds to optional step 2712 at which the relevance weight value is logged.

In some embodiments, the addition operation described at 2706 is applied to adjust the relevance weight value of a content item in association with a location in which a wireless handset is located. In lieu of adding y points to the relevance weight value for the content item for each attribute group, y points are added to the relevance weight value for the association of content item with the location of the wireless handset. Similarly, the subtraction operation described at 2710 may be applied to adjust the relevance weight value of a content item in association with a location in which a wireless handset is located. The addition and subtraction operations described in 2706 and 2710 may be similarly applied to adjust the relevance weight value of a time or other parameter stored in association with a content item.

Figure 28:
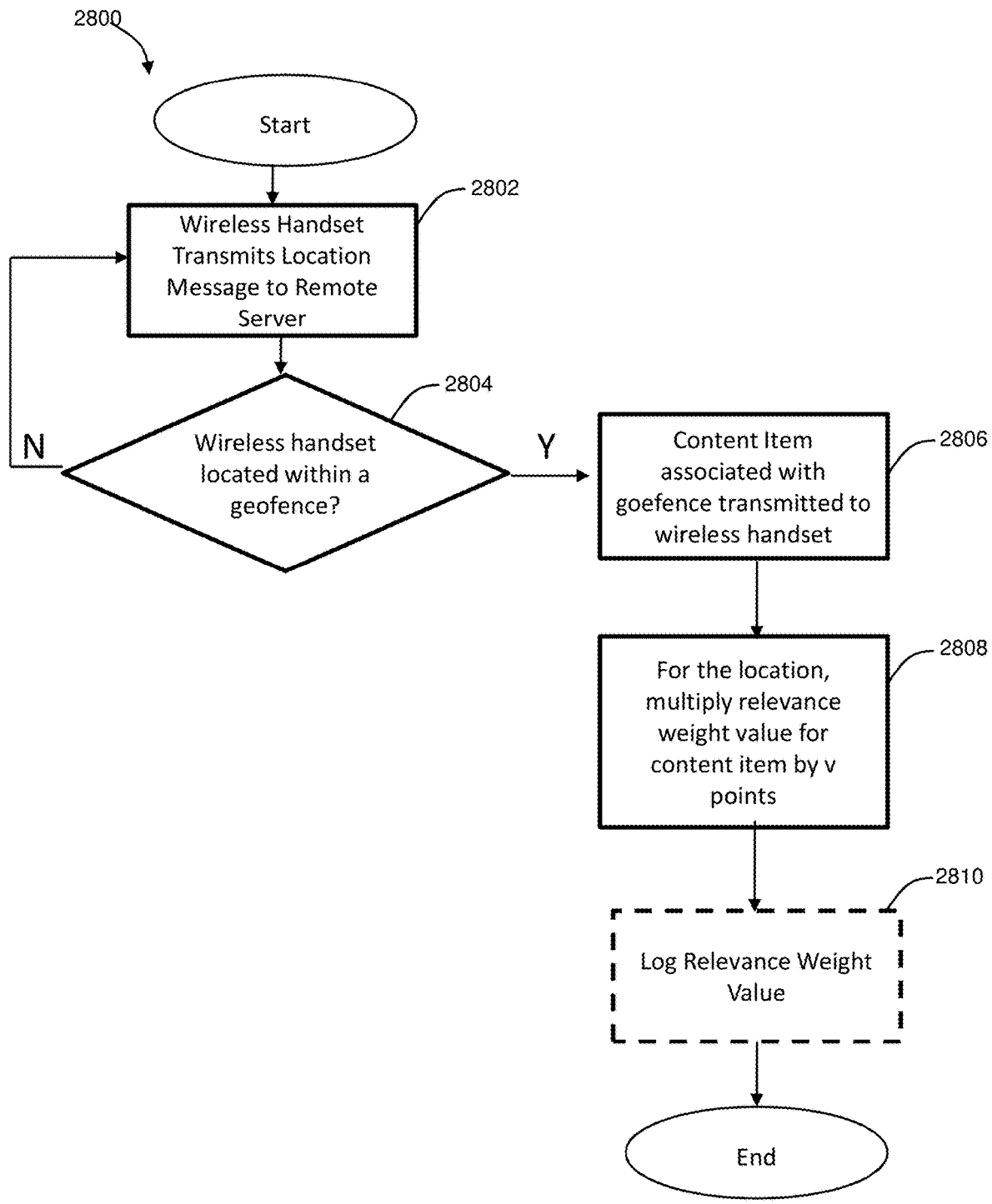
FIG. 28 shows an illustrative flow chart of a method for adjusting relevance weighting according to a third embodiment

Referring now to FIG. 28, an illustrative flow chart indicating a method for adjusting relevance weighting according to a third embodiment is shown. The method begins at block 2802, at which a wireless handset transmits a location message to data processing module 104. The location message comprises information about the location of the wireless handset. The location is identified by unique identifier Location_ID. At decision diamond 2804, location determination module 126 uses the location message to determine if wireless handset 102 is within a geofence. If the wirless handset is located within a geofence, one or more content items associated with the geofence are displayed on the handset content interface, as indicated at block 2806. The method proceeds to block 2808, at which at which a point value v is multiplied by the value of the Relevance_Weight field of the Location_Content_Rating entry having a Content_ID value matching the content item identifier and an Location_ID value matching the location identifier. Point value v may be any point value, for example, such as the point value indicated at text input box 1922 of FIG. 19.

In some embodiments, the relevance weight associated with the content item and the location is reset to a default value or an initial value stored prior to a multiplication of the relevance weight by point value v. For example, when the Relevance_Weight field of the Location_Content_Rating is changed, the initial value of Relevance_Weight prior to the change and the time of the change is logged. When a time period such as 5 minutes, a half hour, an hour or a day has elapsed since the change, the Relevance_Weight is reset to the initial value. In another embodiment, if location determination module 126 determines that no wireless handsets are located within a geofence, all entries in which the relevance weight is associated with the location are reset to an initial or default value.

If no entry exists in Location_Content_Rating table having an Attribute_ID matching an attribute of the user providing feedback and a Content_ID of the content item for which feedback was received, a new entry is created in Location_Content_Rating when the feedback is received. The new entry has a Content_ID matching the identifier of the content item for which feedback was received and a Location_ID matching the identifier of an attribute of the user providing feedback. When a new entry is created, the new entry may have a Relevance_Weight value that is a default value. Alternatively, the new entry may have a Relevance_Weight value that is the sum of a default value and the point value modification resulting from the user feedback.

In some embodiments, the method proceeds to optional block 2808, at which the adjusted relevance weight value is logged. For example, an entry in a database table such as Content_Rating_Time may be made.

Figure 29:
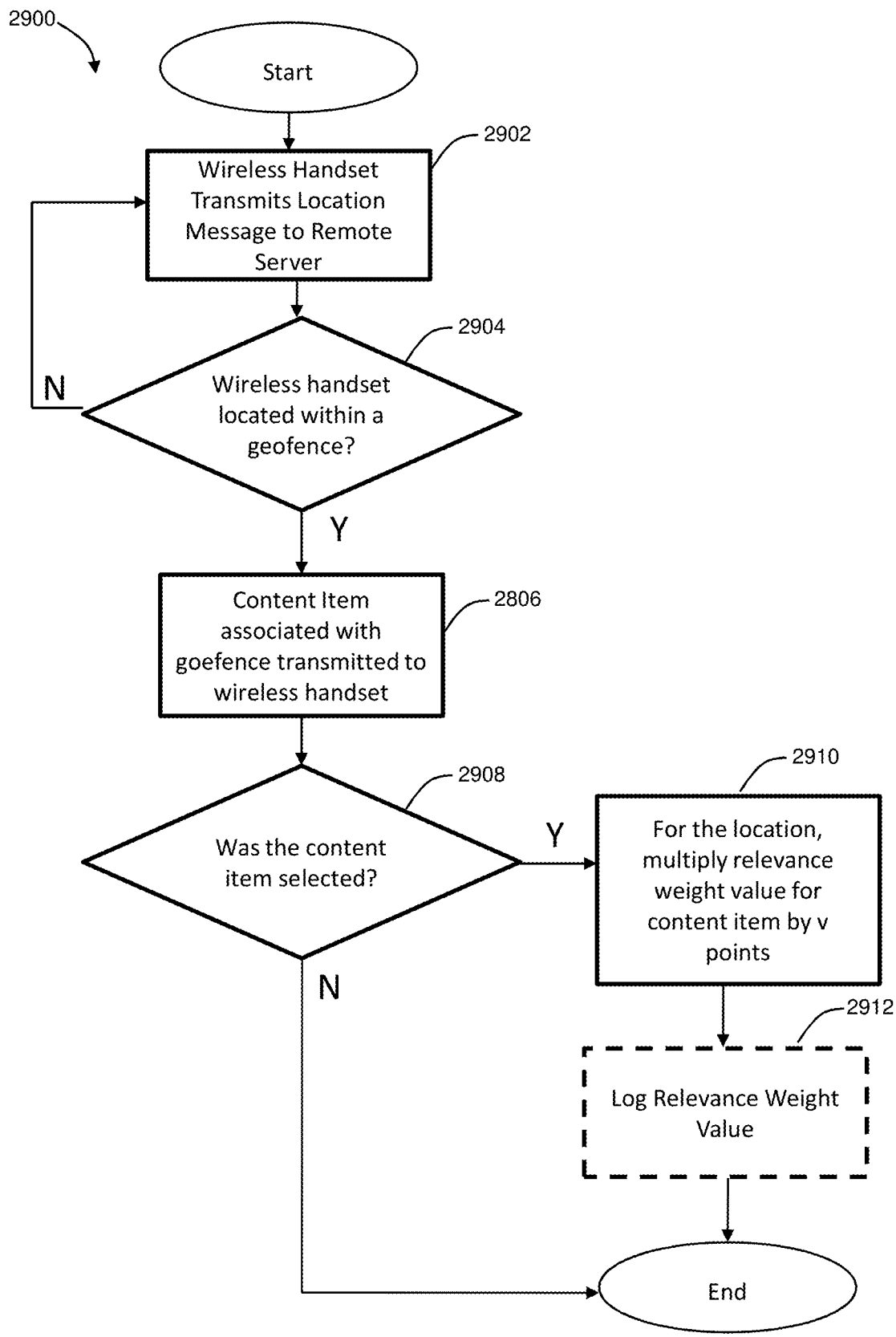
FIG. 29 shows an illustrative flow chart of a method for adjusting relevance weighting according to a fourth embodiment

Referring now to FIG. 29, an illustrative flow chart indicating a method for adjusting relevance weighting according to a fourth embodiment is shown. The method begins at block 2902, at which a wireless handset transmits a location message to data processing module 104. The location message comprises information about the location of the wireless handset. The location is identified by unique identifier Location_ID. The location message comprises information about the location of the wireless handset. The location is identified by unique identifier Location_ID. At decision diamond 2904, location determination module 126 uses the location message to determine if wireless handset 102 is within a geofence. If the wirless handset is located within a geofence, one or more content items associated with the geofence are displayed on the handset content interface, as indicated at block 2906. The method proceeds to decision diamond 2908, at which the relevance and analytics module determines if a content item transmitted to the wireless handset was selected. If a content item was selected, a point value v is multiplied by the value of the Relevance_Weight field of the Location_Content_Rating entry having a Content_ID value matching the content item identifier and an Location_ID value matching the location identifier, as indicated at block 2910. Point value v may be any point value, for example, such as the point value indicated at text input box 1922 of FIG. 19.

In some embodiments, the method then proceeds to optional step 2912 at which the relevance weight value is logged.

In some embodiments, the relevance weight associated with the content item and the location is reset to a default value or an initial value stored prior to a multiplication of the relevance weight by point value v. For example, when the Relevance_Weight field of the Location_Content_Rating is changed, the initial value of Relevance_Weight prior to the change and the time of the change is logged. When a time period such as 5 minutes, a half hour, an hour or a day has elapsed since the change, the Relevance_Weight is reset to the initial value. In another embodiment, if location determination module 126 determines that no wireless handsets are located within a geofence, all entries in which the relevance weight is associated with the location are reset to an initial or default value.

The multiplication operation described at 2808 and 2910 may be applied to adjust a relevance weight value for a content item stored in association with a time, all users or each attribute group associated with a user. Similarly, the reset operation described above may be applied to adjust a relevance weight value for a content item stored in association with a time, all users or each attribute group associated with a user.

FIGS. 30-34 show an illustrative handset content interface 112 of wireless handset 102. The handset content interface may comprise one or more pages to organize content items and other interface features. FIG. 35 shows an illustrative user profile interface 114 of wireless handset 102.

Figure 30:
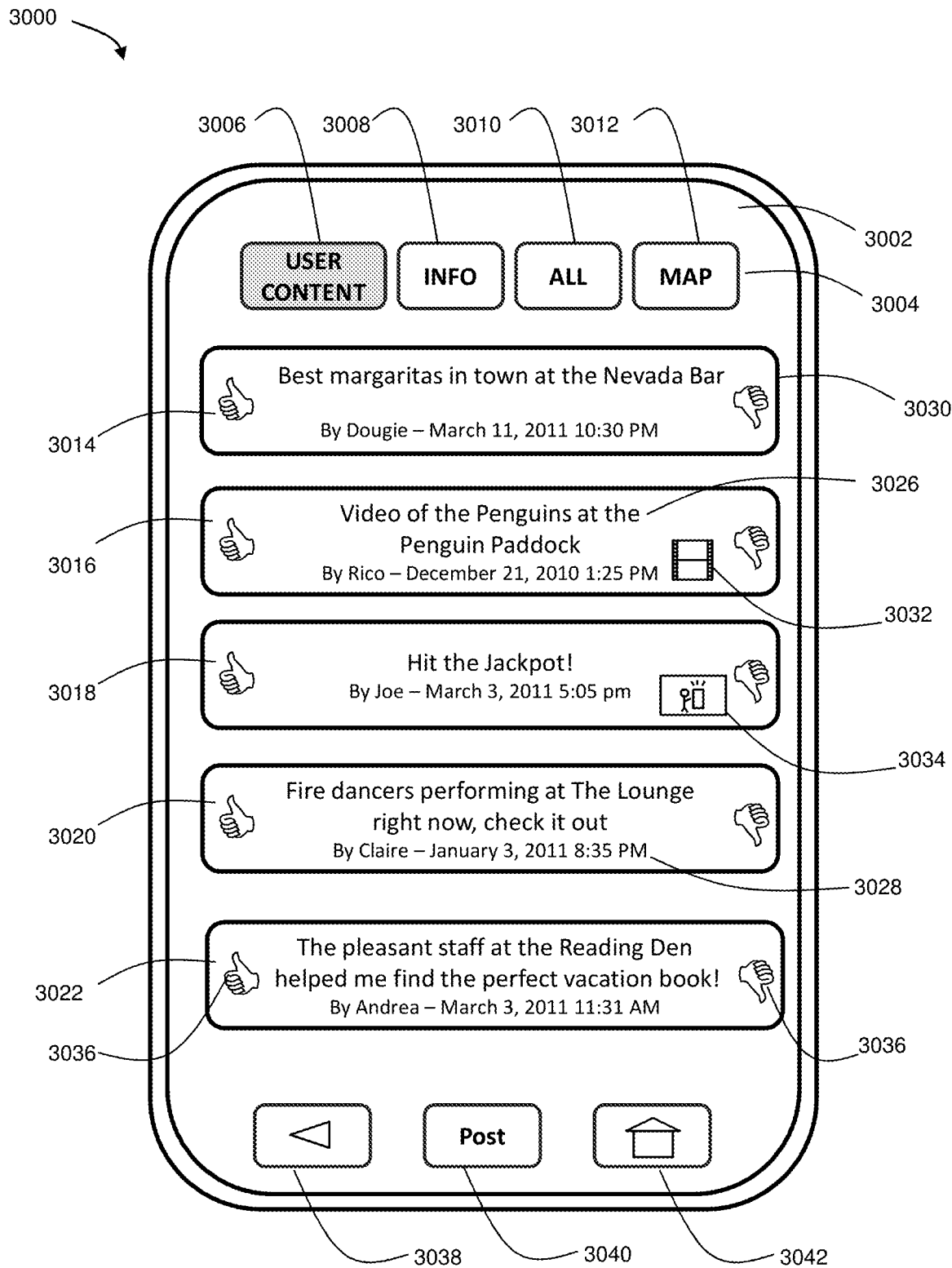
FIG. 30 shows an illustrative "User Content" page of the handset content interface.

Referring now to FIG. 30, an illustrative "User Content" page of the handset content interface is shown. Illustrative user interface 3000 is shown displayed a wireless handset having a touchscreen-type interface 3002, however, it will be appreciated that the user interface may be displayed on any handheld wireless device having a display and a user input means (such as keypad, touchscreen interface, or stylus). Top menu bar 3004 comprises top menu items "User Content" 3006, "Info" 3008, "All" 3010, and "Map" 3012. In the illustrative user interface, the top menu items are selectable items such as virtual buttons that are activated when the user touches the button on a touchscreen or selects the button with a pointing device. In FIG. 30, user content button 3006 is highlighted, indicating that user content is the selected item from the top menu. When the user content menu item is selected, the user interface displays the user content page. The user content page comprises one or more user-created content items. Illustrative user-created content items 3014-3022 are displayed on the illustrative user content page.

The user-created content item comprises user input text, such as the text shown at 3026. The user-created content item may also comprise a timestamp 3028. Timestamp 3028 comprises information about when the user-created content item was posted. The timestamp may be displayed as a time, date, or combination of time and date. The timestamp may further comprise the username of the user that posted the user-created content item.

In some embodiments, the user-created content items are displayed in the user interface as clickable buttons. When the user-created content item button 3030 is selected, the display may show additional content associated with the user-created content item, such as a child content item of a selected parent content item. The user-created content item may link to content such as video, audio, images, and external website links. In some embodiments, an icon is shown proximate to the user-created content item to indicate a type of additional content associated with the user-created content item. For example, icon 3032 is a video icon indicating that the user may access video by clicking user-content item 3016. When the additional content is graphical content such as an image or video, a thumbnail of the image or video may be shown. The additional content of content item 3018 is an image, as indicated by thumbnail 3034. Typically, when a parent content item is selected, the wireless handset transmits a request to data processing module 104 for all child content items of the parent content item. The child content items are then displayed in the user interface.

A feedback input may be displayed proximate to or in conjunction with each user-created content item. The feedback input allows a user to react to the content items displayed. The feedback input may be displayed, for example, as "thumbs up" and "thumbs down" symbols displayed on a user-created content item button, as shown at 3036. The thumbs up and thumbs down input prompts are operable separately from the content item button. When a user selects a feedback input prompt, the wireless handset transmits a feedback message to data processing module 104 indicating that a positive feedback response ("thumbs up") or negative feedback response ("thumbs down") was selected. The feedback message may also comprise information about the user, such as a username or user identification. Alternative feedback input means, such as a system that allows a user to ranks the content, score the content or rate a content item on a scale, such as a scale of one to ten or a scale of one to five, may be used.

The feedback input may be stored in data storage module 108. Typically, the feedback input is used to modify a relevance weight value stored in association with the content item. The relevance weight may be used to rank content to be displayed in the user interface. The content items transmitted from the remote server to the wireless handset may be filtered by relevance weight value such that a predetermined number of highest ranked content items are returned or such that only those content items exceeding a predetermined threshold are returned. The content administrator may set the relevance weight threshold using the content administration interface.

User interface controls 3038-3042 may be displayed on one or more pages of the user interface. When back control 3038 is selected, the page displayed prior to the current page is displayed. When home control 3042 is selected, the main page of the user interface is displayed. For example, if the all content page (selected with button 3010 and shown in FIG. 33) is the main page of the user interface, the all content page will be shown when the home control is selected. When post control 3040 is selected, the user content input page is shown.

Figure 31:
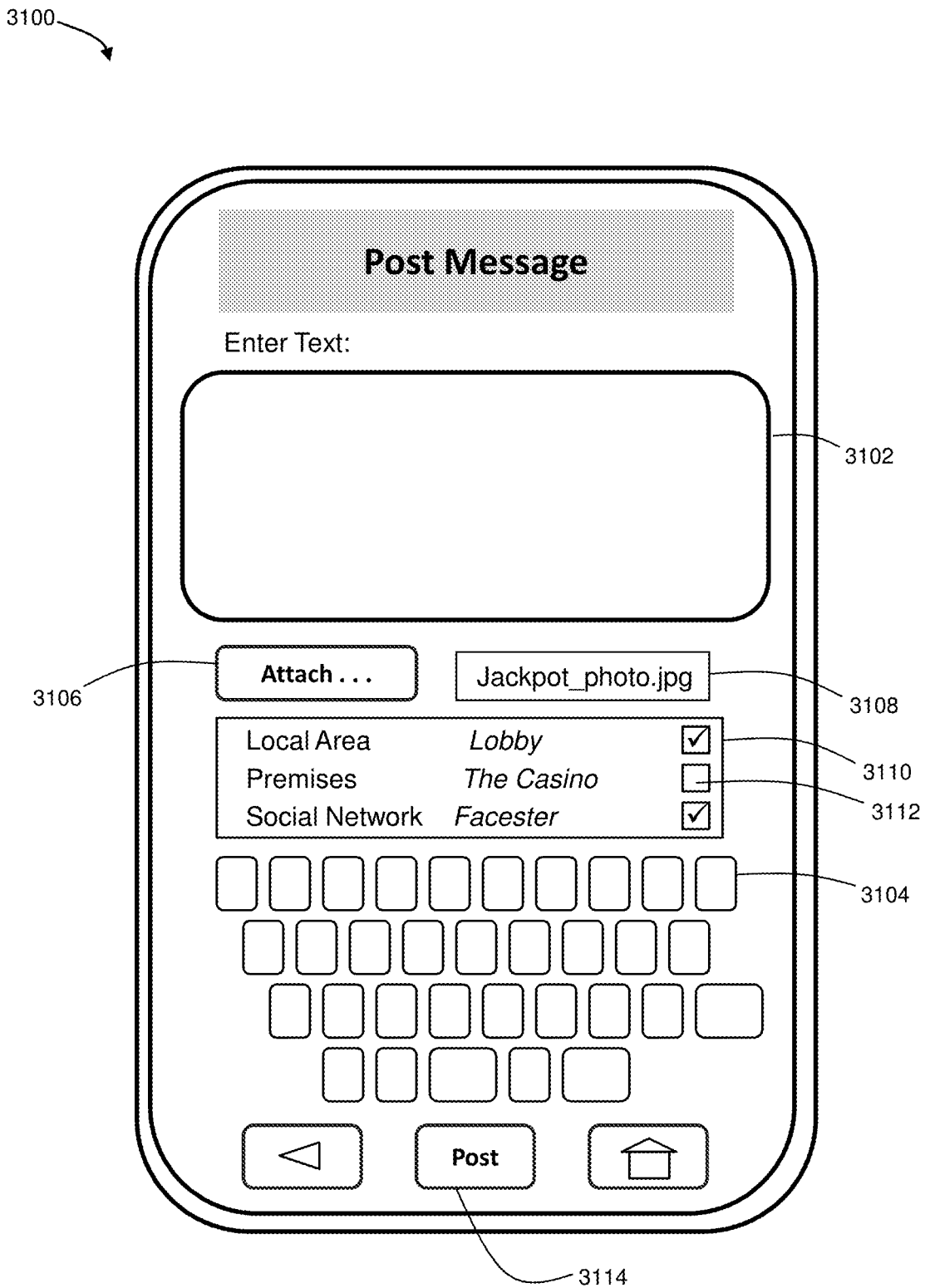
FIG. 31 shows an illustrative user content input page of the handset content interface.

Referring now to FIG. 31, an illustrative user content input page 3100 of the handset content interface is shown. User content input page comprises input window 3102. The user may enter text in the input window using an alphanumeric input, such as a keyboard, keypad, or the touchscreen alphanumeric interface shown at 3104. The user content input page may further comprise an attachment prompt such as the attach button shown at 3106. When the user activates the attach button, the user is prompted to enter the additional content, for example, by selecting a file or entering a URL. The file may be, for example, an image, video, audio, or other media supported by the user interface application. After the additional content is selected, the URL or name of the content file may be displayed, for example, in an additional content box as shown at 3108. The additional content is stored as a child content item of the user-created content item.

In some embodiments, one or more additional content items may be attached to a content item. The additional content box may display a list of items when more than one additional content items are attached to a content item.

When the user selects post button 3114, the user-created content item and additional content are transmitted to and stored in data storage module 108. The user identification may be stored in association with the user-created content item. The user-created content item may be automatically stored in association with the geofence in which the handset is located. Alternatively, the user may designate one or more destinations with which the user content item is to be associated. At 3110, the user is presented with the option of posting the user-created content item to 1) the geofence or "Local Area" in which the handset is located, identified as "Lobby," 2) the entire premises, identified as "The Casino" or 3) a social network, identified as "Facester." The premises may comprise one or more geofences. In some embodiments, the user is presented with the option to designate one or more social networks to which the user-created content item is to be posted. The user may select posting destinations by selecting the checkbox 3112 located adjacent to the desired posting destination. When the user has finished entering content and designating posting destinations, the user may post the content by activating post button 3114.

Figure 32:
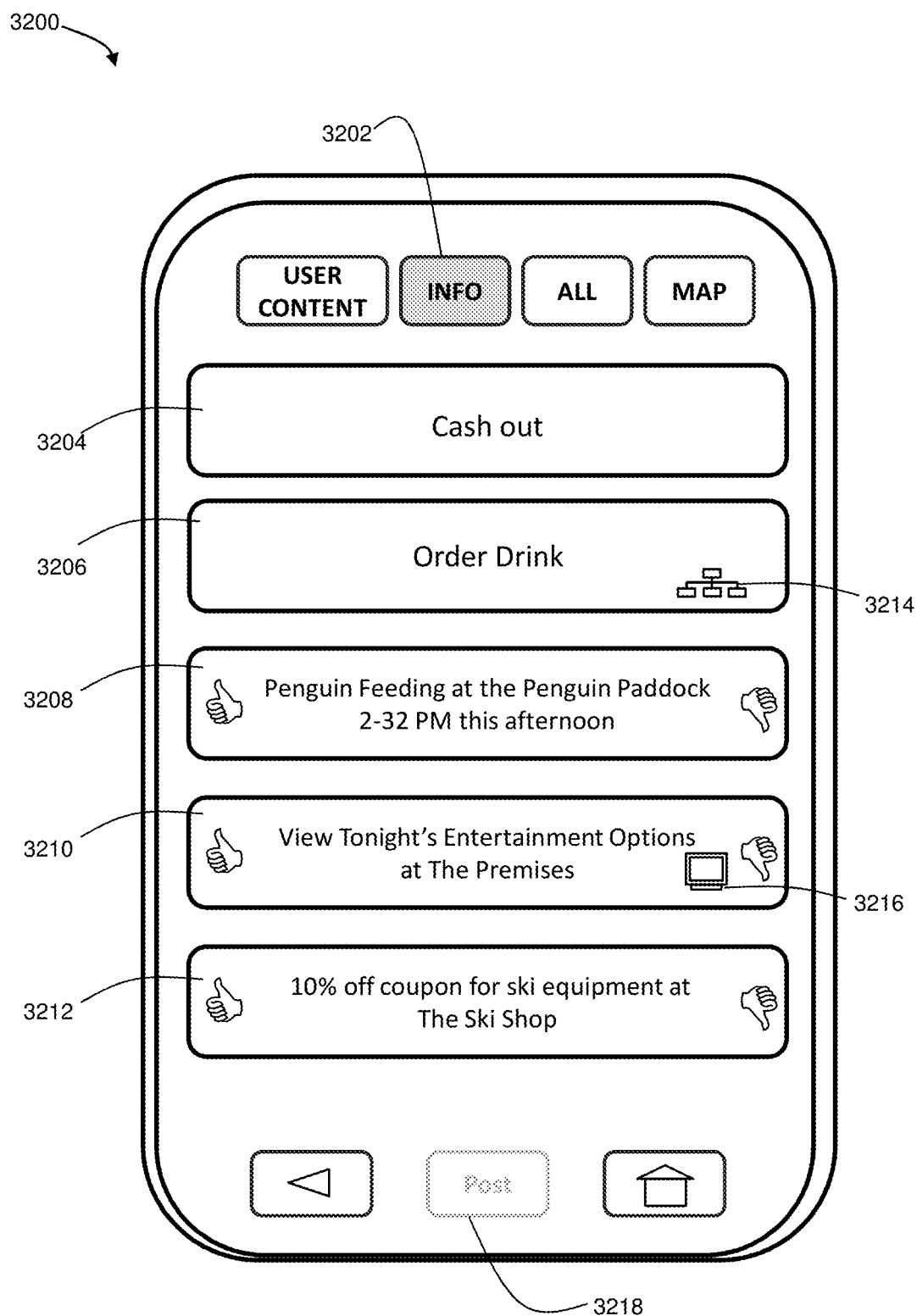
FIG. 32 shows an illustrative "Info" page of the handset content interface.

Referring now to FIG. 32, an illustrative "Info" page 3200 of the handset content interface is shown. The info page displays premises content items that provide information about the premises, such as information about events, services, and promotions available on the premises. Unlike user content items, the content items on the info page are typically created by a content administrator affiliated with the premises. In FIG. 32, info button 3202 is highlighted, indicating that info is the selected item from the top menu. When the info menu item is selected, the user interface displays the info page. The info page comprises one or more premises content items. Illustrative premises content items 3204-3212 are displayed on the illustrative user content page. Premises content items may comprise timestamps and feedback input prompts.

Illustrative premises content item 3204 indicates a "Cash Out" service offered by the premises. If a user has been gambling and wishes to cash out, the user may select the content item 3204. When content item 3204 is selected, the application sends a message to data processing module 104, the message comprising an identifier for the content item and a location message indicating the location of the wireless handset. The data processing module interprets the identifier for the content item and alerts the premises of the cash out request and user location so that the user may be provided with the cash out service.

Premises content items may comprise additional content such as video, audio, images, external website links, maps, menus, and content to be shown on a display. In some embodiments, an icon is shown proximate to the premises content item to indicate a type of additional content associated with the premises content item. For example, icon 3214 is a parent link icon indicating that content item 3206 is a parent content item having a link to more than one child content item. Multiple child content items may be linked to a parent content item to create a menu. When the user selects premises content item 3206, the user is presented with a user interface page comprising a list of drink options. Each drink option may be a premises content item that is a child content item of the Order Drink parent content item. Icon 3216 is a display icon indicating that the additional content associated with content item 3210 will be shown on a display proximate to the wireless handset when the content item is selected. When a user selects content item 3210, the wireless handset sends a message to data processing module 104, the message comprising an identifier for the content item and a location message indicating the location of the wireless handset. The remote server interprets the identifier for the content item and sends the child content associated with the content item to a display proximate to the wireless handset. Typically, the display is located in the same geofence within which the wireless handset is located.

Because content items 3204 and 3206 indicate services offered by the premises that are always to be shown at the top of the menu, feedback inputs are not displayed in conjunction with these content items.

In FIG. 32, post control 3218 is shown grayed out to indicate that it cannot be selected by the user. Typically, the user is not enabled to post user content when the user interface is displaying the info page because the info page displays premises content items but not user-created content items.

Figure 33:
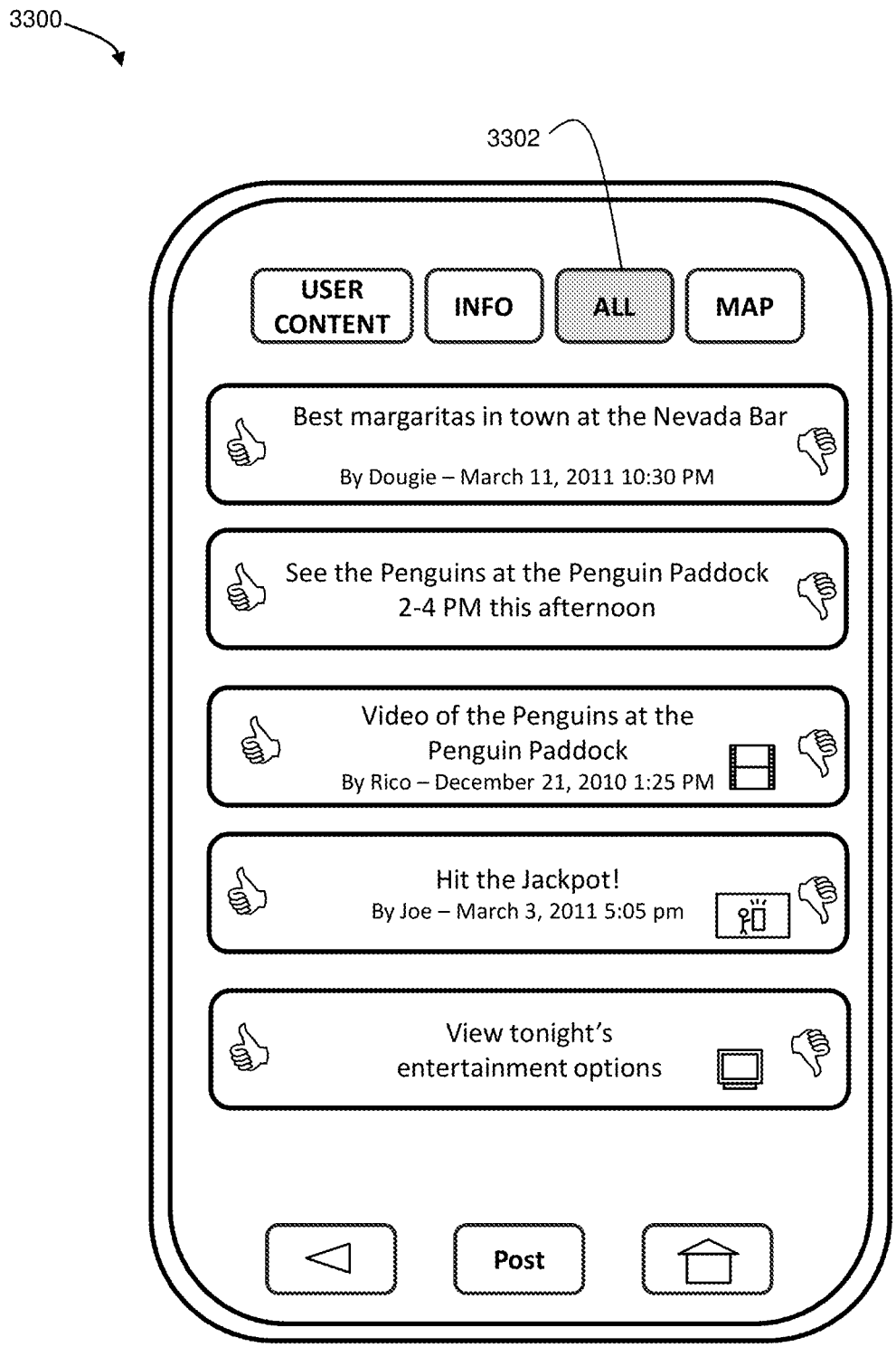
FIG. 33 shows an illustrative "All" page of the handset content interface.

Referring to FIG. 33, an illustrative "All" page 3300 of the handset content interface is shown. The all page displays premises content items and user-created content items. The content items shown are typically the highest ranked content items as determined from the relevance weight value of content items filtered by one or more of attribute group, location and time. Alternatively, the content items shown may be a preset number of content items exceeding a predetermined threshold relevance weight value or all content items exceeding a predetermined threshold relevance weight value. Accordingly, the all page allows the user to view the most highly ranked content items from both the user content page and the info page. In FIG. 33, all button 3302 is highlighted, indicating that all is the selected item from the top menu. When the all menu item is selected, the user interface displays the all page.

Figure 34:
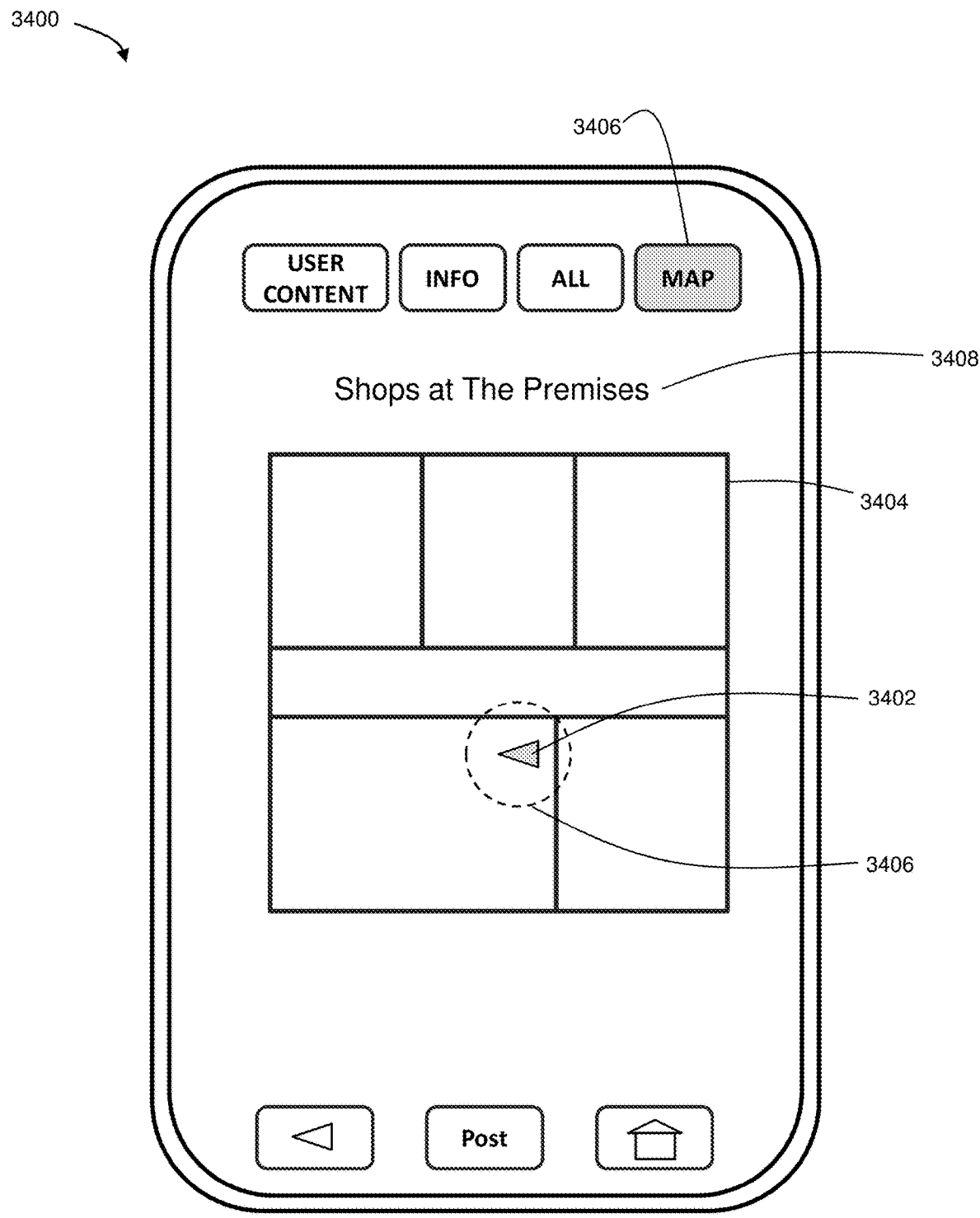
FIG. 34 shows an illustrative map page of the handset content interface.
Figure 35:
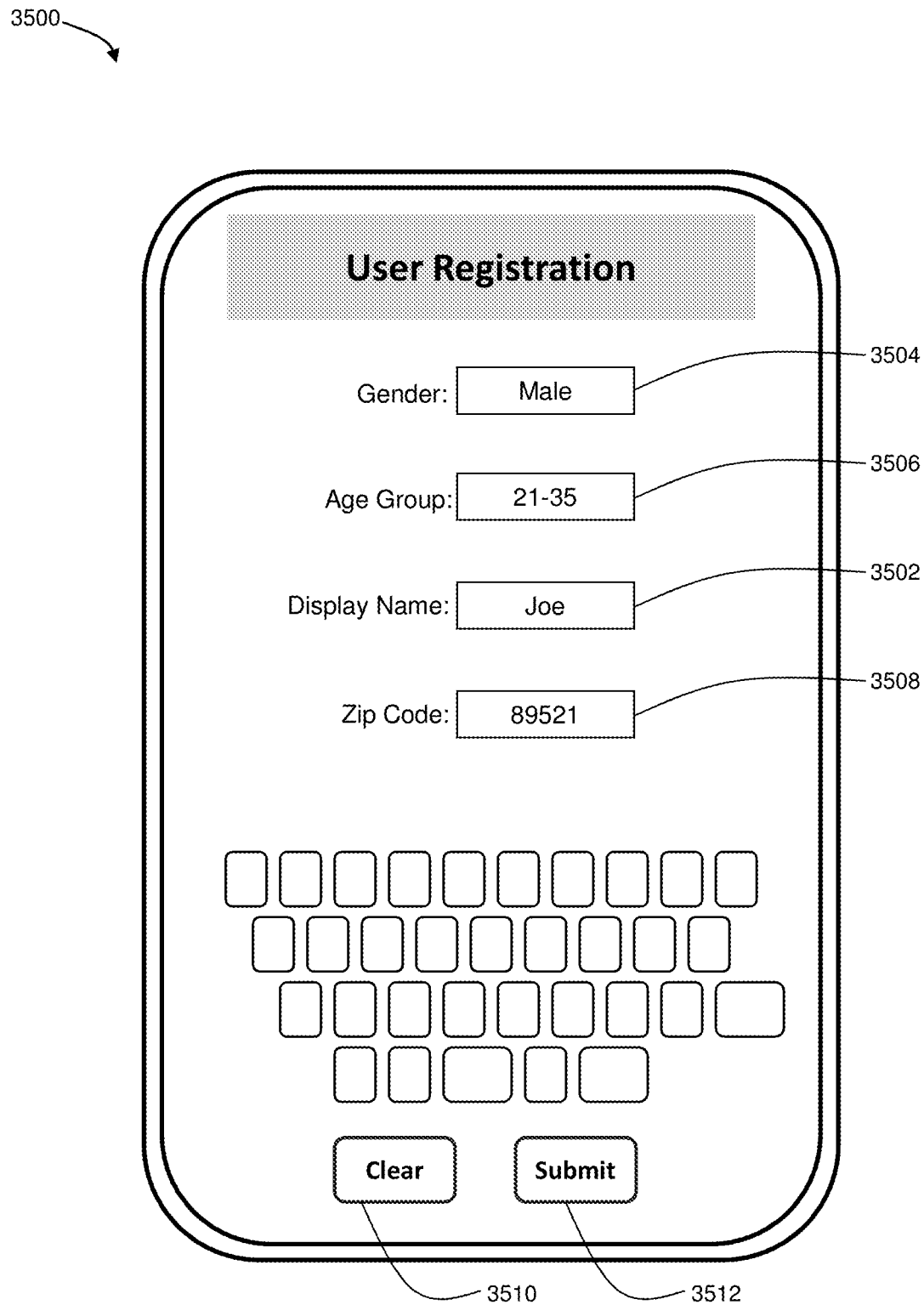
FIG. 35 shows an illustrative user profile interface.

Referring now to FIG. 34, an illustrative map page 3400 of the handset content interface is shown. The map page displays the user location 3402 on a premises map 3404. In FIG. 34, map button 3406 is highlighted, indicating that map is the selected item from the top menu. When the map menu item is selected, the user interface displays the map page.

The user location icon may be an arrow icon with the arrow indicating the direction of travel of the user, as shown at 3402. In some embodiments, the map shows radius 3406 that indicates a radius around the estimated location of the wireless handset indicating the potential actual location of the wireless handset. The radius may be based on a calculated margin of error for the calculated location of the wireless handset. The map page may also comprise map title 3408.

In some embodiments, the interval at which a location message is sent from the wireless handset to the remote server when the map page is shown is different from the interval at which the location message is sent when the other pages of the user interface are shown. Typically, a faster interval is required for updating the location on the map than is required for updating content items.

Referring now to FIG. 35, an illustrative user profile interface page 3500 is shown. In some embodiments, the user is prompted to register. The user may be prompted to register prior to viewing the handset content interface for the first time, when attempting to post a comment for the first time, or at another time. The user is shown the user profile interface page, where the user is prompted to enter a display name in display name field 3502. The user may be prompted to enter additional information such as gender in gender field 3504, age group in age group field 3506, zip code in zip code field 3508 or other information including contact or demographic information and information about the user's interests. One or more fields may be required for the user registration submission to be accepted. If the user wishes to erase entered information, the user selects clear button 3510 will clear all entered information. When all of the required information is entered, the user selects submit button 3512 to submit the information. When the submit button is selected, the user profile information entered is transmitted to data storage module 108 and stored, for example, in a table having a structure illustrated in FIG. 20.

In some embodiments, the content items transmitted from the data processing module 104 to the wireless handset are filtered according to one or more fields of the user profile. For example, if the user entered "Female" in the gender field of the user profile, the remote server may filter the content items to select only those content items associated with the user attribute group gender female. The remote server then transmits the selected content items to the wireless handset. The content items transmitted from the remote server to the wireless handset may be further filtered by relevance weight value such that a predetermined number of highest ranked content items are returned or such that all content items exceeding a predetermined threshold are returned or a predetermined number of content items exceeding a predetermined threshold are returned.

In an alternative embodiment, the content items transmitted from data processing module 104 to the wireless handset are filtered according to both geofence and one or more user attribute groups. For example, the remote server may filter the content items to select only those content items associated with the gender female and also associated with the geofence in which the wireless handset is located. Relevance weight filtering may also be applied.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for delivering targeted content to a wireless handset, comprising:
   a plurality of beacons communicatively coupled to a network, each of the plurality of beacons configured to emit a signal;
   the wireless handset communicatively coupled to the network, the wireless handset configured to receive the signal from at least one of the plurality of beacons, and configured to associate a signal strength with the signal;
   a user profile associated with the wireless handset, the user profile comprising at least one user attribute;
   a content administration interface configured to:
      receive an entry of a content item;
      receive an association between a user attribute and the content item;
      receive an association between an indoor location and the content item;
      store the association between the indoor location and the content item;
      filter stored content items to retrieve content items associated with a user attribute;
      filter stored content items based on the user attribute and the indoor location; and
      transmit at least one retrieved content item associated with the user attribute and the indoor location on the wireless handset;
   a location determination module configured to determine when the wireless handset is located at the indoor location; and
   a handset content interface configured to display the at least one transmitted content item on the wireless handset when the wireless handset is located at the indoor location.

2. The system of claim 1, wherein the content administration interface is further configured to:
   receive an association between a time range and the content item; and
   store the association between the time range and the content item in computer memory; and
   the content delivery module further configured to:
      determine a current time; and
      filter stored content items to retrieve content items associated with the time range including the current time.

3. The system of claim 1, wherein the wireless handset is configured to periodically transmit a location message;
   the location determination module configured to interpret the location message and determine if the wireless handset is located at the indoor location in response to the periodic transmission; and
   the content delivery module configured to filter stored content items and transmit at least one retrieved content item in response to the periodic transmission.

4. The system of claim 1, wherein
   the content administration interface is further configured to:
      receive a set of coordinates indicating the location of a display;
      receive an association between the display and the display location; and
      store the association between the display and the display location in computer memory; and
   the display configured to display a child content item having display content when a parent content item of the child content item is selected from the handset content interface.

5. The system of claim 1, wherein
   the handset content interface is further configured to:
      receive a positive feedback input for a content item; and
      receive a negative feedback input for a content item;
   the content administration interface further configured to:
      store relevance weight value in association with a user attribute and a content item in computer memory;
      receive an increment value by which the relevance weight is to be increased when positive feedback input is received by the handset content interface; and
      receive a decrement value by which the relevance weight is to be decreased when negative feedback input is received by the handset content interface.

6. The system of claim 5, further comprising a relevance and analytics module, the relevance and analytics module configured to:
- receive a message indicating that positive feedback was received for a content item;
- retrieve all user attributes of the user profile associated with the wireless handset on which the positive feedback was received;
- for each retrieved user attribute, increase the relevance weight value stored in association with the user attribute and the content item by the increment value;
- receive a message indicating that negative feedback was received for a content item;
- retrieve all user attributes of the user profile associated with the wireless handset on which the negative feedback was received; and
- for each retrieved user attribute, decrease the relevance weight value stored in association with the user attribute and the content item by the decrement value.

7. A system for delivering targeted content to a wireless handset, comprising:
- a plurality of beacons communicatively coupled to a network, each of the plurality of beacons configured to emit a signal;
- the wireless handset communicatively coupled to the network, the wireless handset configured to receive the signal from at least one of the plurality of beacons, and configured to associate a signal strength with the signal;
- a user profile associated with the wireless handset, the user profile comprising at least one user attribute;
- a content administration interface configured to:
  - receive an entry of a content item;
  - receive an association between a user attribute and the content item;
  - receive an association between an indoor location and the content item; and
  - store the association between the indoor location and the content item;
- a content delivery module configured to periodically:
  - filter stored content items to retrieve content items associated with a user attribute;
  - filter stored content items based on the user attribute and the indoor location; and
  - transmit at least one retrieved content item associated with the user attribute and the indoor location on the wireless handset;
- a location determination module configured to determine when the wireless handset is located at the indoor location; and
- a handset content interface configured to display the at least one transmitted content item on the wireless handset when the wireless handset is located at the indoor location.

8. The system of claim 7, wherein the content administration interface is further configured to:
- receive an association between a time range and the content item; and
- store the association between the time range and the content item in computer memory; and
- the content delivery module further configured to periodically:
  - determine a current time; and
  - filter stored content items to retrieve content items associated with the time range including the current time.

9. The system of claim 7, wherein the wireless handset is configured to periodically transmit a location message;

the location determination module configured to interpret the location message and determine if the wireless handset is located at the indoor location in response to the periodic transmission; and
the content delivery module configured to filter stored content items and transmit at least one retrieved content item in response to the periodic location message transmission.

10. The system of claim 7, wherein
the handset content interface is further configured to:
- receive a positive feedback input for a content item; and
- receive a negative feedback input for a content item;
the content administration interface further configured to:
- store a relevance weight value in association with a user attribute and a content item
- receive an increment value by which the relevance weight is to be increased when positive feedback input is received by the handset content interface; and
- receive a decrement value by which the relevance weight is to be decreased when negative feedback input is received by the handset content interface.

11. The system of claim 10, further comprising a relevance and analytics module, the relevance and analytics module configured to:
- receive a message indicating that positive feedback was received for a content item;
- retrieve all user attributes of the user profile associated with the wireless handset on which the positive feedback was received;
- for each retrieved user attribute, increase the relevance weight value stored in association with the user attribute and the content item by the increment value;
- receive a message indicating that negative feedback was received for a content item;
- retrieve all user attributes of the user profile associated with the wireless handset on which the negative feedback was received; and
- for each retrieved user attribute, decrease the relevance weight value stored in association with the user attribute and the content item by the decrement value.

12. A method for delivering targeted content to a wireless handset, comprising:
- receiving an entry of a content item with a content administration interface;
- receiving an association between the content item and a user attribute of a user profile with the content administration interface;
- receiving an association between the indoor location and the content item with the content administration interface;
- storing the association between the indoor location and the content item;
- emitting, from at least one of a plurality of beacons, a signal;
- receiving, by the wireless handset, the signal;
- associating, by the wireless handset, a signal strength with the signal;
- transmitting, by the wireless handset, a location message including the received signal strength
- determining, by a location determination module, when the wireless handset is located at the indoor location;
- filtering stored content items to retrieve content items associated with a user attribute;
- filtering stored content items based on the user attribute and indoor location;

transmitting at least one retrieved content item associated with the user attribute and the indoor location to the wireless handset; and displaying, by a handset content interface, the at least one transmitted content items on the wireless handset when the wireless handset is located at the indoor location.

13. The method of claim 12, further comprising:

receiving an association between a time range and the content item with the content administration interface;

storing the association between the time range and the content item in computer memory;

determine a current time with the content delivery module; and filtering stored content items to retrieve content items associated with the time range including the current time.

14. The method of claim 12, further comprising:

receive a set of coordinates indicating the location of a display with the content administration interface;

receive an association between the display and the display location with the content administration interface;

storing the association between the display and the display location in computer memory;

displaying a child content item having display content when a parent content item of the child content item is selected from the handset content interface.

15. The method of claim 14, further comprising:

receiving a positive feedback input for a content item with the handset content interface; and receiving a negative feedback input for a content item with the handset content interface;

storing a relevance weight value in association with a user attribute and a content item in computer memory;

receiving with the content administration interface an increment value by which the relevance weight is to be increased when positive feedback input is received by the handset content interface; and receiving with the content administration interface a decrement value with the by which the relevance weight is to be decreased when negative feedback input is received by the handset content interface.

16. The method of claim 15, further comprising:

receiving with a relevance and analytics module a message indicating that positive feedback was received for a content item;

retrieving from computer memory all user attributes of the user profile associated with the wireless handset on which the positive feedback was received;

for each retrieved user attribute, increasing the relevance weight value stored in association with the user attribute and the content item by the increment value;

receiving a relevance and analytics module a message indicating that negative feedback was received for a content item;

retrieving from computer memory all user attributes of the user profile associated with the wireless handset on which the negative feedback was received; and for each retrieved user attribute, decreasing the relevance weight value stored in association with the user attribute and the content item by the decrement value.

* * * * *